(12) United States Patent
Nathan et al.

(10) Patent No.: US 11,237,667 B2
(45) Date of Patent: Feb. 1, 2022

(54) PRESSURE-SENSITIVE TOUCH PANEL

(71) Applicant: Cambridge Touch Technologies Ltd., Cambridge (GB)

(72) Inventors: Arokia Nathan, Cambridge (GB); Jackson Chi-Sun Lai, Markham (CA); Corbin Church, Westmount (CA); Suk-Bae Cha, Tokyo (JP)

(73) Assignee: Cambridge Touch Technologies Ltd., Cambridge (GB)

( * ) Notice: Subject to any disclaimer, the term of this patent is extended or adjusted under 35 U.S.C. 154(b) by 0 days.

(21) Appl. No.: 16/385,213

(22) Filed: Apr. 16, 2019

(65) Prior Publication Data

US 2019/0243502 A1 Aug. 8, 2019

Related U.S. Application Data

(63) Continuation of application No. 15/539,038, filed as application No. PCT/GB2015/054157 on Dec. 23, 2015, now Pat. No. 10,318,038.

(Continued)

(30) Foreign Application Priority Data

Jul. 17, 2015 (GB) .................................... 1512621
Dec. 18, 2015 (WO) ................ PCT/GB2015/054087

(51) Int. Cl.
*G06F 3/044* (2006.01)
*G06F 3/041* (2006.01)

(52) U.S. Cl.
CPC ........ *G06F 3/04164* (2019.05); *G06F 3/0445* (2019.05); *G06F 3/0446* (2019.05);
(Continued)

(58) Field of Classification Search
CPC ...... G06F 3/0414; G06F 3/0416; G06F 3/044; G06F 2203/04106; G06F 2203/04103;
(Continued)

(56) References Cited

U.S. PATENT DOCUMENTS 5,543,588 A 8/1996 Bisset et al.
8,633,916 B2 1/2014 Bernstein et al.
(Continued)

FOREIGN PATENT DOCUMENTS

EP 0574213 A1 12/1993
EP 2899615 A1 7/2015
(Continued)

OTHER PUBLICATIONS

Notice of Allowance, U.S. Appl. No. 16/356,538 dated May 15, 2019, 9 pages.
(Continued)

*Primary Examiner* — Stephen G Sherman

(57) ABSTRACT

An apparatus for combined capacitance and pressure sensing is described. The apparatus includes a multiplexer (75) having a plurality of inputs (76) and an output (F), a touch panel (29), and a front end module (3). The touch panel includes a layer structure (5; FIG. 15) comprising one or more layers, each extending perpendicularly to a thickness direction, the one or more layers including a layer of piezoelectric material (10; FIG. 15), the layer structure having first (6) and second (7; FIG. 15) opposite faces, and the layer(s) arranged between the first and second faces such that the thickness direction of each layer is perpendicular to the first and second faces. The touch panel also includes a plurality of first electrodes (8) disposed on the first face, each first electrode connected to a respective input of the multiplexer. The touch panel also includes at least one second electrode (9) disposed on the second face. The front
(Continued)

end module is configured to receive an input signal (11) from the multiplexer output. The front end module includes a first stage (12) configured to provide an amplified signal based on the input signal, and a second stage comprising first (13) and second (14) frequency-dependent filters configured to receive the amplified signal and to provide respective first (16) and second (17) filtered signals. The first filtered signal has a first frequency bandwidth, and the second filtered signal has a second frequency bandwidth which has a relatively higher start-frequency than the first frequency bandwidth.

18 Claims, 35 Drawing Sheets

Related U.S. Application Data

(60) Provisional application No. 62/095,853, filed on Dec. 23, 2014.

(52) U.S. Cl.
CPC ........ *G06F 3/0447* (2019.05); *G06F 3/04166* (2019.05); *G06F 2203/04103* (2013.01); *G06F 2203/04105* (2013.01); *G06F 2203/04106* (2013.01)

(58) Field of Classification Search
CPC ....... G06F 2203/04105; G06F 3/04166; G06F 3/0445; G06F 3/0446; G06F 3/04164; G06F 3/0447; G06F 2203/04107
See application file for complete search history.

(56) References Cited

U.S. PATENT DOCUMENTS

| | | | |
|---|---|---|---|
| 10,254,894 B2 | 4/2019 | Nathan et al. | |
| 10,282,046 B2 | 5/2019 | Nathan et al. | |
| 10,310,659 B2 | 6/2019 | Nathan et al. | |
| 10,318,038 B2 | 6/2019 | Nathan et al. | |
| 10,430,009 B2 | 10/2019 | Nathan et al. | |
| 10,739,926 B2 | 8/2020 | Nathan et al. | |
| 2010/0013785 A1 | 1/2010 | Murai et al. | |
| 2012/0120017 A1 | 5/2012 | Worfolk et al. | |
| 2012/0268416 A1 | 10/2012 | Pirogov | |
| 2013/0076646 A1 | 3/2013 | Krah | |
| 2013/0127776 A1* | 5/2013 | Guard | G06F 3/0412 345/174 |
| 2013/0265256 A1 | 10/2013 | Nathan et al. | |
| 2013/0278544 A1* | 10/2013 | Cok | G06F 3/044 345/174 |
| 2014/0008203 A1 | 1/2014 | Nathan et al. | |
| 2014/0062934 A1* | 3/2014 | Coulson | G06F 3/044 345/174 |
| 2014/0139444 A1 | 5/2014 | Kauhanen | |
| 2014/0341446 A1 | 11/2014 | Hare et al. | |
| 2014/0354585 A1 | 12/2014 | Cok et al. | |
| 2015/0153900 A1 | 6/2015 | Chang et al. | |
| 2015/0185955 A1 | 7/2015 | Ando | |
| 2015/0331517 A1* | 11/2015 | Filiz | G06F 3/0414 345/173 |
| 2016/0011666 A1* | 1/2016 | Evreinov | G06F 3/016 345/173 |
| 2016/0034089 A1 | 2/2016 | Kano et al. | |
| 2016/0062505 A1* | 3/2016 | Hwang | G06F 3/0414 345/174 |
| 2016/0306481 A1 | 10/2016 | Filiz et al. | |
| 2017/0199624 A1 | 7/2017 | Nathan et al. | |
| 2017/0228072 A1 | 8/2017 | Amin et al. | |
| 2018/0183438 A1 | 6/2018 | Shigetaka et al. | |
| 2019/0050080 A1 | 2/2019 | Bagheri et al. | |
| 2019/0212846 A1 | 7/2019 | Nathan et al. | |
| 2019/0243503 A1 | 8/2019 | Nathan et al. | |
| 2019/0253053 A1 | 8/2019 | Nathan et al. | |
| 2019/0361547 A1 | 11/2019 | Nathan et al. | |
| 2020/0293132 A1 | 9/2020 | Nathan et al. | |

FOREIGN PATENT DOCUMENTS

| | | |
|---|---|---|
| EP | 3457263 A1 | 3/2019 |
| JP | H8-44493 A | 2/1996 |
| JP | 2013-513865 | 4/2013 |
| JP | 2013-131110 A | 7/2013 |
| JP | 2014-209297 A | 11/2014 |
| JP | 2014-238267 A | 12/2014 |
| WO | 2014/045847 A1 | 3/2014 |
| WO | 2014042170 A1 | 3/2014 |
| WO | 2014045847 A1 | 3/2014 |
| WO | 2014098946 A1 | 6/2014 |
| WO | 2014/196367 | 12/2014 |
| WO | 2014192710 A1 | 12/2014 |
| WO | 2016102975 A2 | 6/2016 |
| WO | 2017109455 A1 | 6/2017 |
| WO | 2020152464 A2 | 7/2020 |

OTHER PUBLICATIONS

Chinese Office Action dated Oct. 29, 2019, directed to CN Application No. 201580073562.1, 21 pages.
Extended European Search Report in EPO application EP 18204047.7, dated Dec. 13, 2018, 9 pages.
Nathan, et. al. Office Action Response in U.S. Appl. No. 16/356,538, dated May 2, 2019, 10 pages.
Notice of Allowance, U.S. Appl. No. 15/386,612, dated Oct. 31, 2018, 5 pages.
International Search report for related PCT application GB2015054157, dated Jul. 29, 2016, 7 pages.
Written Opinion for related PCT application GB2015054157, dated Jul. 18, 2016, 10 pages.
Notice of Allowance, U.S. Appl. No. 15/596,156, dated Feb. 5, 2019, 5 pages.
Non-final office action relating to U.S. Appl. No. 16/390,094, USPTO, dated Jan. 28, 2020, 12 pages.
Office action relating to Japanese patent application JP 2017-533940, dated Jan. 17, 2020, 10 pages.
European Examination Report/Opinion in EP Application 15817532.3, European Patent Office, dated Feb. 17, 2020, 5 pages.
Notice of Allowance in U.S. Appl. No. 16/534,076, USPTO, dated Mar. 27, 2020, 9 pages.
Notice of Allowance, U.S. Appl. No. 16/390,094, USPTO, dated Sep. 17, 2019, 8 pages.
U.S. Non Final Office Action, U.S. Appl. No. 16/390,094, USPTO, dated May 17, 2019, 12 pages.
U.S. Non Final Office Action, U.S. Appl. No. 16/534,076, USPTO, dated Dec. 10, 2019, 7 pages.
U.S. Non Final Office Action, U.S. Appl. No. 16/385,237, USPTO, dated Jun. 19, 2019, 22 pages.
Notice of Allowance in U.S. Appl. No. 16/057,771 USPTO, dated Sep. 10, 2020, 9 pages.
Notice of Allowance in U.S. Appl. No. 16/891,285 USPTO, dated Sep. 25, 2020, 9 pages.
Final Office Action in U.S. Appl. No. 16/385,237 USPTO, dated Jan. 23, 2020, 27 pages.
Non-Final Office Action in U.S. Appl. No. 15/539,038 USPTO, dated Jul. 18, 2018, 27 pages.
Chinese Office Action dated Sep. 30, 2020, directed to CN Application No. 201580073562.1, 10 pages.
Notice of Allowance in U.S. Appl. No. 16/891,285 USPTO, dated Jan. 13, 2020, 5 pages.
Examination Report in EPO application EP 18204047.7, dated Nov. 3, 2020, 6 pages.
European Examination Report in EP Application 15817532.3, European Patent Office, dated Apr. 26, 2021, 8 pages.
Tsangarides et al., U.S. Appl. No. 17/425,303, filed Jul. 22, 2021, 69 pages.

(56) References Cited

OTHER PUBLICATIONS

Combined Search and Examination Report under Sections 17 and 18(3) for UK application No. GB1901073.5 dated Jun. 21, 2019, 6 pages.
International Search Report and Written Opinion, dated Jul. 28, 2020 directed to International application No. PCT/GB2020/050151, 21 pages.
European Examination Report in EP Application 18204047.7, European Patent Office, dated Dec. 13, 2021, 5 pages.

* cited by examiner

PRESSURE-SENSITIVE TOUCH PANEL

CROSS REFERENCE TO RELATED APPLICATIONS

This application is a continuation of U.S. patent application Ser. No. 15/539,038, filed Jun. 22, 2017, which application is a 35 U.S.C. § 371 application of PCT/GB2015/054157, which was filed on Dec. 23, 2015, and claims the benefit under 35 U.S.C. § 119(e) to U.S. provisional application No. 62/095,853, filed Dec. 23, 2014, and further claims the benefit of priority from United Kingdom Application 1512621.2, filed Jul. 17, 2015, and PCT Application No. PCT/GB2015/054087, filed Dec. 18, 2015, all of which are incorporated by reference as if fully disclosed herein.

FIELD OF THE INVENTION

The present invention relates to a touch panel for combined capacitive and pressure sensing.

BACKGROUND

Resistive and capacitive touch panels are used as input devices for computers and mobile devices. One type of capacitive touch panel, projected capacitance touch panels, is often used for mobile devices because an exterior layer may be made of glass, providing a hard surface which is resistant to scratching. An example of a projected capacitance touch panel is described in US 2010/0079384 A1.

Projected capacitance touch panels operate by detecting changes in electric fields caused by the proximity of a conductive object. The location at which a projected capacitance touch panel is touched is often determined using an array or grid of capacitive sensors. Although projected capacitance touch panels can usually differentiate between single-touch events and multi-touch events, they suffer the drawback of not being able to sense pressure. Thus, projected capacitance touch panels tend to be unable to distinguish between a relatively light tap and a relatively heavy press. A touch panel which can sense pressure can allow a user to interact with a device in new ways by providing additional information to simply position of a touch.

Different approaches have been proposed to allow a touch panel to sense pressure. One approach is to provide capacitive sensors which include a gap whose size can be reduced by applied pressure, so as to produce a measurable difference in the mutual capacitance. For example, US 2014/043289 A describes a pressure sensitive capacitive sensor for a digitizer system which includes an interaction surface, at least one sensing layer operable to sense interaction by mutual capacitive sensing, and an additional layer comprising resilient properties and operable to be locally compressed responsive to pressure locally applied during user interaction with the capacitive sensor. However, the need for a measurable displacement can make it more difficult to use a glass touch surface and can cause problems with material fatigue after repeated straining.

Other pressure sensitive touch panels have proposed using one or more discrete force sensors supporting a capacitive touch panel, such that pressure applied to the capacitive touch panel is transferred to one or more sensors located behind the panel or disposed around the periphery. For example, US 2013/0076646 A1 describes using strain gauges with a force sensor interface which can couple to touch circuitry. WO 2012/031564 A1 describes a touch panel including a first panel, a second panel, and a displacement sensor sandwiched between the first panel and the second panel. The displacement sensors, such as capacitive or piezoresistive sensors, are placed around the edge of the second panel. However, it can be difficult to distinguish the pressure of multiple touches using sensors located behind a touch panel or disposed around the periphery.

Other pressure sensitive touch panels have been proposed which attempt to combine capacitive touch sensing with force sensitive piezoelectric layers. For example, WO 2009/150498 A2 describes a device including a first layer, a second layer, a third layer, a capacitive sensing component coupled to the first layer, and a force sensing component coupled to the first layer and the third layer and configured to detect the amount of force applied to the second layer. WO 2015/046289 A1 describes a touch panel formed by stacking a piezoelectric sensor and an electrostatic sensor. The piezoelectric sensor is connected to a pressing force detection signal generation unit, and the electrostatic sensor is connected to a contact detection signal generation unit. However, systems which use separate electronics to sense changes in capacitance and pressures can make a touch panel more bulky and expensive. Systems in which electrodes are directly applied or patterned onto a piezoelectric film can be more complex and expensive to produce.

SUMMARY

The present invention seeks to provide an improved capacitive touch panel.

According to a first aspect of the invention there is provided apparatus including a multiplexer having a plurality of inputs and an output. The apparatus also includes a touch panel including a layer structure including one or more layers, each layer extending perpendicularly to a thickness direction. The one or more layers include a layer of piezoelectric material. The layer structure has first and second opposite faces. The one or more layer(s) are arranged between the first and second faces such that the thickness direction of each layer is perpendicular to the first and second faces. The layer structure includes a plurality of first electrodes disposed on the first face, each first electrode connected to a respective input of the multiplexer. The layer structure includes at least one second electrode disposed on the second face. The apparatus includes a front end module configured to receive an input signal from the multiplexer output. The front end module includes a first stage configured to provide an amplified signal based on the input signal. The front end module includes a second stage including first and second frequency-dependent filters configured to receive the amplified signal and to provide respective first and second filtered signals. The first filtered signal has a first frequency bandwidth, and the second filtered signal has a second frequency bandwidth which has a relatively higher start-frequency than the first frequency bandwidth.

Thus, pressure and capacitance measurements may be performed using a touch panel without the need for separate pressure and capacitance electrodes. A single input signal is received from an electrode including pressure and capacitance information and the input signal may be amplified and processed using a single front end. This can allow the apparatus to be more readily integrated into existing projected capacitance touch panels and/or to be easily used in conjunction with existing devices such as touch controller ICs.

The apparatus may further include a signal source configured to provide a periodic signal. The front end module may be configured to receive the periodic signal and the first stage may be configured to provide the amplified signal based on the input signal and the periodic signal. The second filtered signal may be based on the periodic signal and the first filtered signal may be not based on the periodic signal.

Providing a periodic signal to the front end module instead of through the touch panel electrodes directly can allow the gain for amplifying signals from the layer of piezoelectric material to be increased without causing saturation of the first stage output. It can allow an analogue-to-digital converter (ADC) to be used in a subsequent stage having a lower dynamic range.

The signal source may provide a periodic signal having a basic frequency of at least 0.5 kHz, optionally at least 1 kHz, optionally at least 10 kHz. The signal source may provide a periodic signal having a basic frequency of at least 20 kHz. The signal source may provide a periodic signal having a basic frequency of at least 50 kHz. The signal source may provide a periodic signal having a basic frequency of at least 100 kHz. The signal source may provide a periodic signal having a sinusoidal, square, triangular or saw-toothed waveform. The signal source may provide a periodic signal comprising a superposition of two or more sinusoidal waveforms having different frequencies. The signal source may be a digital-to-analogue converter (DAC).

The apparatus may include a controller configured to cause the multiplexer to connect each one of the plurality of first electrodes to the front end module according to a sequence determined by the controller. The sequence may be pre-determined. The sequence may be dynamically determined.

The first and second stages may be configured such that the amplitude of the first filtered signal is dependent upon a pressure applied to the layer of piezoelectric material proximate to a given first electrode connected to the front end module by the multiplexer.

The first and second stages may be configured such that the amplitude of the second filtered signal is dependent upon a capacitance of a given first electrode connected to the front end module by the multiplexer. The amplitude of the second filtered signal may depend upon a self-capacitance associated with a given first electrode. The amplitude of the second filtered signal may depend upon a mutual capacitance between the given first electrode and the second electrode(s).

The first frequency-dependent filter may comprise a low-pass filter and the second frequency-dependent filter may comprise at least one band-pass filter. The first frequency-dependent filter may comprise at least one band-stop filter and the second frequency-dependent filter may comprise at least one band-pass filter. The first frequency-dependent filter may comprise a low-pass filter and the second frequency-dependent filter may comprise a high-pass filter. Each band-pass filter may be a notch filter. Each band-stop filter may be a notch filter. Filters may comprise active filter circuits. Filters may comprise passive filter circuits. Filters may comprise a single stage. Filters may comprise multiple stages. Filters may comprise filter circuits selected from the group consisting of Butterworth filters, Chebyshev filters, Gaussian filters and Bessel filters.

The first stage may have a low-frequency cut-off configured to reject a pyroelectric response of the layer of piezoelectric material. The first stage may have a low-frequency cut-off configured to reject a mains power distribution frequency. The low frequency cut-off may be at least 50 Hz. The low frequency cut-off may be 60 Hz. The low frequency cut-off may be at least 100 Hz. The low frequency cut-off may be at least 200 Hz.

The first stage may include one or more integrating amplifiers configured to integrate the input signal.

The first stage may include one or more differential amplifier(s) configured to receive the input signal.

The plurality of first electrodes may include a plurality of conductive pads disposed on the first face in a two dimensional array.

The touch panel may further include a plurality of third electrodes disposed overlying the first face of the layer structure and arranged such that the layer structure is between the plurality of third electrodes and the second electrode(s). Each of the plurality of third electrodes may be connected to a respective input of the multiplexer.

The apparatus may include a controller configured to cause the multiplexer to connect each one of the plurality of first electrodes and each one of the plurality of third electrodes to the front end module according to a sequence determined by the controller.

The apparatus may further include a second multiplexer having a plurality of inputs and an output. The apparatus may further include a second front end module configured to receive an input signal from the output of the second multiplexer. The second front end module may have the same electronic configuration as the front end module. The touch panel may further include a plurality of third electrodes disposed overlying the first face of the layer structure and arranged such that the layer structure lies between the plurality of third electrodes and the second electrode(s). Each third electrode may be connected to a respective input of the second multiplexer.

The apparatus may include a controller configured to cause the second multiplexor to connect each one of the plurality of third electrodes to the second front end module according to a sequence determined by the controller.

Each first electrode may extend in a first direction and the plurality of first electrodes may be arrayed spaced apart perpendicular to the first direction. Each third electrode may extend in a second direction and the plurality of third electrodes may be arrayed spaced apart perpendicular to the second direction. The first and second directions may be different. The first and second directions may be substantially perpendicular. The first and second directions may meet at an angle of more than 30 and less than 90 degrees.

The touch panel may further include a second layer structure including one or more dielectric layers. Each dielectric layer may extend perpendicularly to a thickness direction. The second layer structure may have third and fourth opposite faces. The dielectric layers may be arranged between the third and fourth faces such that the thickness direction of each dielectric layer is perpendicular to the third and fourth faces. The plurality of third electrodes may be disposed on the third face of the second layer structure and the fourth face of the second layer structure may contact the first plurality of electrodes.

The plurality of third electrodes may be disposed on the first face of the layer structure. Each first electrode may comprise a continuous conductive region and each third electrode may comprise a plurality of conductive regions electrically connected to one another by jumpers. Each jumper may span a conductive region forming a portion of one of the first electrodes.

The apparatus may further include a second multiplexer having a plurality of inputs and an output. The apparatus may further include a second front end module configured to receive an input signal from the output of the second multiplexer. The second front end module may have the same electronic configuration as the front end module. The touch panel may include a plurality of second electrodes. The touch panel may further include a plurality of third electrodes disposed on the second face of the layer structure. Each third electrode may be connected to a respective input of the second multiplexer. Each first electrode may extend in a first direction and the plurality of first electrodes may be arrayed spaced apart perpendicular to the first direction. Each second electrode may extend in a second direction and the plurality of second electrodes may be arrayed spaced apart perpendicular to the second direction. Each third electrode may extend in a second direction and the plurality of third electrodes may be arrayed spaced apart perpendicular to the second direction. The third electrodes may be arranged parallel to and be interleaved with the plurality of second electrodes. The first and second directions may be different. The first and second directions may be substantially perpendicular. The first and second directions may meet at an angle of more than 30 and less than 90 degrees.

The layer structure may include one or more dielectric layers stacked between the layer of piezoelectric material and the first face of the layer structure.

The layer structure may include one or more dielectric layers stacked between the second face of the layer structure and the layer of piezoelectric material.

Thus, none of the electrodes need to be disposed directly on the layer of piezoelectric material. This allows a bare layer of piezoelectric material to be included in the layer structure. This can reduce the costs and complexity of producing the layer structure.

The second electrode may be a region of conductive material which is substantially coextensive with the second face.

The at least one second electrode may be a region of conductive material arranged in a grid.

The signal source may include a voltage controlled source, and the apparatus may further include a bias source coupled to the second electrode(s). The bias source may provide a constant bias. The constant bias may be ground potential. The bias source may be provided by the signal source.

The signal source may include one or more synchronized current controlled sources, and each current controlled source may provide the periodic signal to a respective front end module.

The first stage of each front end module may include an operational amplifier having at least an inverting input coupled to a first rail, a non-inverting input coupled to the voltage controlled source via a path comprising a first resistor, and an output coupled to a second rail. The first stage of each front end module may include a second resistor coupling the first rail to the output of the multiplexer corresponding to the front end module, a third resistor coupling the first rail to the second rail, and a first capacitor coupling the first rail to the second rail. The second rail may provide the amplified signal.

A second capacitor may be connected in parallel with the first resistor. The capacitance of the first capacitor may be substantially equal to a mutual capacitance between a given first electrode and at least one second electrode.

The first stage of each front end module may include a first operational amplifier having at least an inverting input coupled to a first rail, a non-inverting input coupled to the voltage source via a path comprising a first resistor and a second rail, and an output coupled to a third rail. The first stage of each front end module may include a second operational amplifier having at least an inverting input coupled to a fourth rail, a non-inverting input coupled to the second rail via a path comprising a second resistor, and an output coupled to a fifth rail. The first stage of each front end module may include a comparator having at least an inverting input coupled to the third rail, a non-inverting input coupled to the fifth rail, and an output providing the amplified signal. The first stage of each front end module may include a third resistor coupling the first rail output of the multiplexer corresponding to the front end module, a fourth resistor coupling the first rail to the third rail, a first capacitor coupling the first rail to the third rail, a fifth resistor coupling the fourth rail to the fifth rail, a second capacitor coupling the fourth rail to the fifth rail, and a sixth resistor coupling the fourth rail to ground via a path comprising a third capacitor.

The first resistor may have a resistance substantially equal to the second resistor. The third resistor may have a resistance substantially equal to the sixth resistor. The fourth resistor may have a resistance substantially equal to the fifth resistor. The first capacitor may have a capacitance substantially equal to the second capacitor. The third capacitor may have a capacitance substantially equal to a mutual capacitance between the given first electrode and at least one second electrode. A fourth capacitor may be connected in parallel with the first resistor. A fifth capacitor may be connected in parallel with the second resistor.

The first stage of each front end module may include an operational amplifier having at least an inverting input coupled to a first current controlled source via a first rail, a non-inverting input coupled to ground via a path comprising a first resistor, and an output coupled to a second rail. The first stage of each front end module may include a second resistor coupling the first rail to the second rail, and a third resistor coupling the first rail to ground via a path comprising a first capacitor. The first rail may be coupled to the output of the multiplexer corresponding to the front end module and the second rail may be coupled to the second electrode(s). The first rail may be coupled to the second electrode(s) and the second rail may be coupled to the output of the multiplexer corresponding to the front end module. The second rail may provide the amplified signal.

A second capacitor may be connected in parallel with the first resistor. The first capacitor may have a capacitance substantially equal to a mutual capacitance between the given first electrode and at least one second electrode.

The first stage of each front end module may include a first operational amplifier having at least an inverting input coupled to a first current controlled source via a first rail, a non-inverting input coupled to ground via a path comprising a first resistor, and an output coupled to a second rail. The first stage of each front end module may include a second operational amplifier having at least an inverting input coupled to a second current source by a third rail, a non-inverting input coupled to ground via a path comprising a second resistor, and an output coupled to a fourth rail. The first stage of each front end module may include a comparator having at least an inverting input coupled to the second rail, a non-inverting input coupled to the fourth rail, and an output providing the amplified signal. The first stage of each front end module may include a third resistor coupling the first rail and the second rail, a fourth resistor coupling the first rail to ground via a path comprising a first capacitor, a fifth resistor coupling the third rail to ground via a path comprising a second capacitor, a sixth resistor coupling the third rail to the fourth rail, and a third capacitor coupling the third rail to the fourth rail. The first rail may be coupled to the output of the multiplexer corresponding to the front end module and the second rail may be coupled to the second electrode(s). The first rail may be coupled to the second electrode(s) and the second rail may be coupled to the output of the multiplexer corresponding to the front end module. The first current controlled source may be synchronised with the second current controlled source.

The third resistor may have a resistance substantially equal to the sixth resistor. The first capacitor may have a capacitance substantially equal to the second capacitor. The third capacitor may have a capacitance substantially equal to a mutual capacitance between the given first electrode and at least one second electrode. A fourth capacitor may be connected in parallel with the first resistor. A fifth capacitor may be connected in parallel with the second resistor.

The apparatus may further comprise a signal processor arranged to receive the first and second filtered signals and to calculate pressure values and/or capacitance values in dependence upon the first and second filtered signals.

The signal processor may be configured to employ correlated double sampling methods so as to improve signal to noise ratio of the pressure values and/or capacitance values. The signal processor may be configured to treat the pressure values and/or the capacitance values as image data.

According to a second aspect of the invention there is provided a device for processing signals from a projected capacitance touch panel, the panel including a layer of piezoelectric material disposed between a plurality of first electrodes and at least one second electrode. The device configured, in response to receiving signals from a given first electrode, to generate a pressure signal indicative of a pressure applied to the touch panel proximate to the given first electrode and a capacitance signal indicative of a capacitance of the given first electrode.

The device may include at least one signal splitter stage configured to split signals received from the touch panel into first and second signals, to pass the first signals to a first frequency dependent filter configured to reject the pressure signal and pass the capacitance signal, and to pass the second signals to a second frequency dependent filter configured to reject the capacitance signal and pass the pressure signal.

The device may include at least one amplification stage configured to amplify the pressure signal. The amplification stage may be configured to receive signals from the given first electrode and to provide an amplified signal to the signal splitter stage. The amplified signal may include a superposition of the capacitance signal and the pressure signal. The device is configured to separate the capacitance signal and the pressure signal. The device may include a signal source configured to generate a periodic signal. The amplification stage may be configured to receive the periodic signal. The capacitance signal may be based on the periodic signal. The pressure signal may not be based on the periodic signal. The signals received from the given first electrode may include a superposition of the capacitance signal and the pressure signal.

Apparatus may include a projected capacitance touch panel, the panel including a layer of piezoelectric material disposed between a plurality of first electrodes and at least one second electrode, and the device. The device may further include a plurality of terminals, each terminal connected to a corresponding first electrode.

The device may be configured to receive signals from each first electrode concurrently. The device may include an amplification stage and a signal splitter stage corresponding to each terminal.

The device may be configured to receive signals from each first electrode sequentially. The device may include one amplification stage and one signal splitter stage and the plurality of terminals may be connected to the amplification stage through a multiplexer. The multiplexer may be configured to connect each of the terminals to the amplification stage according to a sequence.

Apparatus may include a projected capacitance touch panel, the panel including a layer of piezoelectric material disposed between a plurality of first electrodes and at least one second electrode, a multiplexer having a plurality of inputs and an output, each multiplexer input connected to a corresponding first electrode, and the device. The device may further include a terminal connected to the multiplexer output.

The apparatus may further include a signal processor arranged to receive the pressure and capacitance signals and to calculate pressure values and capacitance values in dependence upon the pressure and capacitance signals.

The signal processor may be configured to employ correlated double sampling methods so as to improve signal to noise ratio of the pressure values and/or capacitance values. The signal processor may be configured to treat the pressure values and/or the capacitance values as image data.

According to a third aspect of the invention there is provided a portable electronic device comprising the apparatus.

According to a fourth aspect of the invention there is provided a method in a touch panel including a layer structure comprising one or more layers, each layer extending perpendicularly to a thickness direction, the one or more layers including a layer of piezoelectric material, the layer structure having first and second opposite faces, and the layer(s) arranged between the first and second faces such that the thickness direction of each layer is perpendicular to the first and second faces, a plurality of first electrodes disposed on the first face, and at least one second electrode disposed on the second face. The method includes selecting each given first electrode of the plurality of first electrodes according to a predetermined sequence. The method includes, for each given first electrode, generating an amplified signal based on an input signal received from the given first electrode, filtering the amplified signal using a first frequency-dependent filter to provide a first filtered signal having a first frequency bandwidth, and filtering the amplified signal using a second frequency-dependent filter to provide a second filtered signal having a second frequency bandwidth which has a relatively higher start-frequency than the first frequency bandwidth.

The method may further include providing a periodic signal. The amplified signal may be generated based on the input signal and the periodic signal. The second filtered signal may be based on the periodic signal and the first filtered signal may be based on the periodic signal.

The method may include processing the first filtered signal to calculate pressure values. The method may include processing the second filtered signal to calculate capacitance values. The method may include treating the pressure values and/or the capacitance values as image data. The method may include treating the pressure values as a pressure image in which each pixel value is a pressure value corresponding to a location of the touch panel. The method may include treating the capacitance values as a capacitance image in which each pixel value is a capacitance value corresponding to a location of the touch panel. The method may include applying correlated double sampling methods to the pressure image and/or the capacitance image.

According to a fifth aspect of the invention there is provided a method of processing signals from a projected capacitance touch panel, the panel including a layer of piezoelectric material disposed between a plurality of first electrodes and at least one second electrode. The method includes receiving signal(s) from a given first electrode. The method also includes generating, based on the received signal(s), a pressure signal indicative of a pressure applied to the touch panel proximate to the given first electrode. The method also includes generating, based on the received signal(s), a capacitance signal indicative of a capacitance of the given first electrode.

The method may include splitting the received signal(s) into first and second signal(s). Generating the capacitance signal may including filtering the first signal(s) using a first frequency dependent filter to reject the pressure signal and pass the capacitance signal. Generating the pressure signal may include filtering the second signal(s) using a second frequency dependent filter to reject the capacitance signal and pass the pressure signal.

The method may include amplifying the pressure signal. The method may include generating an amplified signal in dependence upon signals received from the given first electrode. The amplified signal may include a superposition of the capacitance signal and the pressure signal. The method may include separating the capacitance signal and the pressure signal. The method may include receiving a periodic signal. The amplified signal may be generated in dependence upon the signals received from the given first electrode and the periodic signal. The capacitance signal may be based on the periodic signal. The pressure signal may not be based on the periodic signal. The signals received from the given first electrode may include a superposition of the capacitance signal and the pressure signal.

The method may include receiving signals from the plurality of first electrodes concurrently. The method may include receiving signals from the plurality of first electrodes sequentially.

The method may include processing the pressure signal to calculate pressure values. The method may include processing the capacitance signal to calculate capacitance values. The method may include treating the pressure values and/or the capacitance values as image data. The method may include treating the pressure values as a pressure image in which each pixel value is a pressure value corresponding to a location of the touch panel. The method may include treating the capacitance values as a capacitance image in which each pixel value is a capacitance value corresponding to a location of the touch panel. The method may include applying correlated double sampling methods to the pressure image and/or the capacitance image.

According to a sixth aspect of the invention there is provided a portable electronic device carrying out the method.

According to a seventh aspect of the invention there is provided a computer program product stored on a non-transitory computer readable storage medium which, when executed by a data processing apparatus, causes the data processing apparatus to execute the method.

According to an eighth aspect of the invention there is provided a method of fabricating a layer structure for a touch panel. The method includes providing a transparent substrate having first and second opposite faces. The method includes providing a dielectric layer having first and second opposite faces. The method includes providing a layer of piezoelectric material having first and second opposite faces. The method includes providing a plurality of first conductive regions extending in a first direction and spaced apart perpendicular to the first direction. The method includes providing a plurality of second conductive regions extending in a second direction and spaced apart perpendicular to the second direction, the second direction different to the first. The method includes providing a third conductive material region extending such that, when assembled, the third conductive material region at least partially overlaps each first conductive region and each third conductive region. The method includes assembling the layer structure such that the first face of the transparent substrate is opposed to the second face of the dielectric layer, and the first face of the dielectric layer is opposed to the second face of the layer of piezoelectric material. The method includes assembling the layer structure such that the plurality of first conductive regions are disposed between the transparent substrate and the dielectric layer, the plurality of second conductive regions are disposed between the transparent substrate and the layer of piezoelectric material, and the third conductive material region is disposed over the first face of the layer of piezoelectric material.

Thus, the layer structure for a touch panel can be fabricated without the need for complex and/or expensive deposition of patterned electrode on the layer of piezoelectric material. Additionally, the layer of piezoelectric material may be provided as a single sheet without the need to deposit or pattern piezoelectric material regions to provide discrete devices.

The plurality of first conductive regions may be disposed on the second face of the dielectric layer. Assembling the layer structure may include bonding the second face of the dielectric layer to the first face of the transparent substrate.

The plurality of first conductive regions may be disposed on the first face of the transparent substrate. Assembling the layer structure may include bonding the second face of the dielectric layer to the first face of the transparent substrate.

The plurality of first conductive regions may be disposed on the first face of the dielectric layer. Assembling the layer structure may include bonding the second face of the dielectric layer to the first face of the transparent substrate.

The plurality of second conductive regions may be disposed on the same face of the dielectric layer as the plurality of first electrodes. Each first conductive region may be a continuous conductive region and each second conductive region may be a plurality of separate conductive regions connected by jumpers. Each jumper may span a portion of a first conductive region. Assembling the layer structure may include bonding the second face of the layer of piezoelectric material to the first face of the dielectric layer.

The plurality of second conductive regions may be disposed on the first face of the dielectric layer. Assembling the layer structure may include bonding the second face of the layer of piezoelectric material to the first face of the dielectric layer.

The method may further include providing a second dielectric layer having first and second opposite faces. The plurality of second conductive regions may be disposed on the first face or the second face of the second dielectric layer. Assembling the layer structure may include bonding the second face of the second dielectric layer to the first face of the dielectric layer, and bonding the second face of the layer of piezoelectric material to the first face of the second dielectric material layer.

The plurality of second conductive regions may be disposed on the second face of the layer of piezoelectric material. The method may further include bonding the second face of the layer of piezoelectric material to the first face of the dielectric layer.

The method may further include providing a third dielectric layer having first and second opposite faces. The third conductive material region may be disposed on the first face or the second face of the third dielectric layer. Assembling the layer structure may include bonding the second face of the third dielectric layer to the first face of the layer of piezoelectric material.

The third conductive material region may be disposed on the first face of the layer of piezoelectric material.

Bonding a second face of one layer to a first face of another layer may include providing a layer of pressure sensitive adhesive material between the opposed first and second faces, and applying pressure between the first and second faces. "Pressure sensitive adhesive" (PSA) as used herein includes optically clear adhesives (OCA), optically clear resins (OCR) and liquid optically clear adhesives (LOCA).

According to a ninth aspect of the invention there is provided a portable electronic device comprising a layer structure for a touch panel fabricated according to the method.

According to a tenth aspect of the invention there is provided a method of fabricating a layer structure for a touch panel. The method includes providing a transparent substrate having first and second opposite faces, providing a first dielectric layer having first and second opposite faces, wherein a plurality of first conductive regions extending in a first direction and spaced apart perpendicular to the first direction are disposed on the second face of the first dielectric layer, and bonding the second face of the first dielectric layer to the first face of the transparent substrate. The method includes providing a second dielectric layer having first and second opposite faces, wherein a plurality of second conductive regions extending in a second direction and spaced apart perpendicular to the second direction are disposed on the second face of the second dielectric layer, and wherein the second direction is different to the first direction, and bonding the second face of the second dielectric layer to the first face of the first dielectric layer. The method includes providing a layer of piezoelectric material having first and second opposite faces, wherein a third conductive material region is disposed on the first face of the layer of piezoelectric material such that, when assembled, the third conductive region at least partially overlaps each first conductive region and each second conductive region, and bonding the second face of the layer of piezoelectric material to the first face of the second dielectric layer.

According to an eleventh aspect of the invention there is provided a method of fabricating a layer structure for a touch panel. The method includes providing a transparent substrate having first and second opposite faces, providing a dielectric layer having first and second opposite faces, wherein a plurality of first conductive regions extending in a first direction and spaced apart perpendicular to the first direction are disposed on the second face of the dielectric layer, and bonding the second face of the dielectric layer to the first face of the transparent substrate. The method includes providing a layer of piezoelectric material having first and second opposite faces, wherein a plurality of second conductive regions extending in a second direction are and spaced apart perpendicular to the second direction are disposed on the second face of the layer of piezoelectric material, wherein the second direction is different to the first direction, and wherein a third conductive material region is disposed on the first face of the layer of piezoelectric material such that, when assembled, the third conductive region at least partially overlaps each first conductive region and each second conductive region, and bonding the second face of the layer of piezoelectric material to the first face of the dielectric layer.

According to a twelfth aspect of the invention there is provided a method of fabricating a layer structure for a touch panel. The method includes providing a transparent substrate having first and second opposite faces, providing a first dielectric layer having first and second opposite faces, wherein a plurality of first conductive regions extending in a first direction and spaced apart perpendicular to the first direction are disposed on the second face of the first dielectric layer, and bonding the second face of the first dielectric layer to the first face of the transparent substrate. The method includes providing a second dielectric layer having first and second opposite faces, wherein a plurality of second conductive regions extending in a second direction and spaced apart perpendicular to the second direction are disposed on the second face of the second dielectric layer, and wherein the second direction is different to the first direction, and bonding the second face of the second dielectric layer to the first face of the first dielectric layer. The method includes providing a layer of piezoelectric material having first and second opposite faces, and bonding the second face of the layer of piezoelectric material to the first face of the second dielectric layer. The method includes providing a third dielectric layer having first and second faces, wherein a third conductive material region is disposed on the second surface of the third dielectric layer such that, when assembled, the third conductive region at least partially overlaps each first conductive region and each second conductive region, and bonding the second face of the third dielectric layer to the first face of the layer of piezoelectric material.

According to a thirteenth aspect of the invention there is provided a method of fabricating a layer structure for a touch panel. The method includes providing a transparent substrate having first and second opposite faces, providing a dielectric layer having first and second opposite faces, wherein a plurality of first conductive regions extending in a first direction and spaced apart perpendicular to the first direction are disposed on the second face of the dielectric layer, and wherein a plurality of second conductive regions extending in a second direction and spaced apart perpendicular to the second direction are disposed on the first face of the dielectric layer, and wherein the second direction is different to the first direction, and bonding the second face of the dielectric layer to the first face of the transparent substrate. The method includes providing a layer of piezoelectric material having first and second opposite faces, wherein a third conductive material region is disposed on the first face of the layer of piezoelectric material such that, when assembled, the third conductive region at least partially overlaps each first conductive region and each second conductive region, and bonding the second face of the layer of piezoelectric material to the first face of the dielectric layer.

According to a fourteenth aspect of the invention there is provided a method of fabricating a layer structure for a touch panel. The method including providing a transparent substrate having first and second opposite face, providing a first dielectric layer having first and second opposite faces, wherein a plurality of first conductive regions extending in a first direction and spaced apart perpendicular to the first direction are disposed on the second face of the first dielectric layer, and wherein a plurality of second conductive regions extending in a second direction and spaced apart perpendicular to the second direction are disposed on the second surface of the first dielectric layer, and wherein the second direction is different to the first direction, and bonding the second face of the first dielectric layer to the first face of the transparent substrate. The method includes providing a layer of piezoelectric material having first and second faces, and bonding the second face of the layer of piezoelectric material to the first face of the first dielectric layer. The method includes providing a second dielectric layer having first and second opposite faces, wherein a third conductive material region is disposed on the second face of the second dielectric layer such that, when assembled, the third conductive region at least partially overlaps each first conductive region and each second conductive region, and bonding the second face of the second dielectric layer to the first face of the layer of piezoelectric material. Each first conductive region comprises a continuous conductive region and each second conductive region comprises a plurality of separate conductive regions connected by jumpers, each jumper spanning a portion of a first conductive region.

According to a fifteenth aspect of the invention there is provided a method of fabricating a layer structure for a touch panel. The method includes providing a transparent substrate having first and second opposite faces, wherein a plurality of first conductive regions extending in a first direction and spaced apart perpendicular to the first direction are disposed on the first face of the glass sheet, providing a first dielectric layer having first and second opposite faces, wherein a plurality of second conductive regions extending in a second direction and spaced apart perpendicular to the second direction are disposed on the second surface of the first dielectric layer, and wherein the second direction is different to the first direction, and bonding the second face of the first dielectric layer to the first face of the transparent substrate. The method includes providing a layer of piezoelectric material having first and second opposite faces, and bonding the second face of the layer of piezoelectric material to the first face of the first dielectric layer. The method includes providing a second dielectric layer having first and second opposite faces, wherein a third conductive material region is disposed on the second face of the second dielectric layer such that, when assembled, the third conductive region at least partially overlaps each first conductive region and each second conductive region, and bonding the second face of the second dielectric layer to the first face of the layer of piezoelectric material.

BRIEF DESCRIPTION OF THE DRAWINGS

Certain embodiments of the present invention will now be described, by way of example, with reference to the accompanying drawings in which.

DETAILED DESCRIPTION

Figure 1:
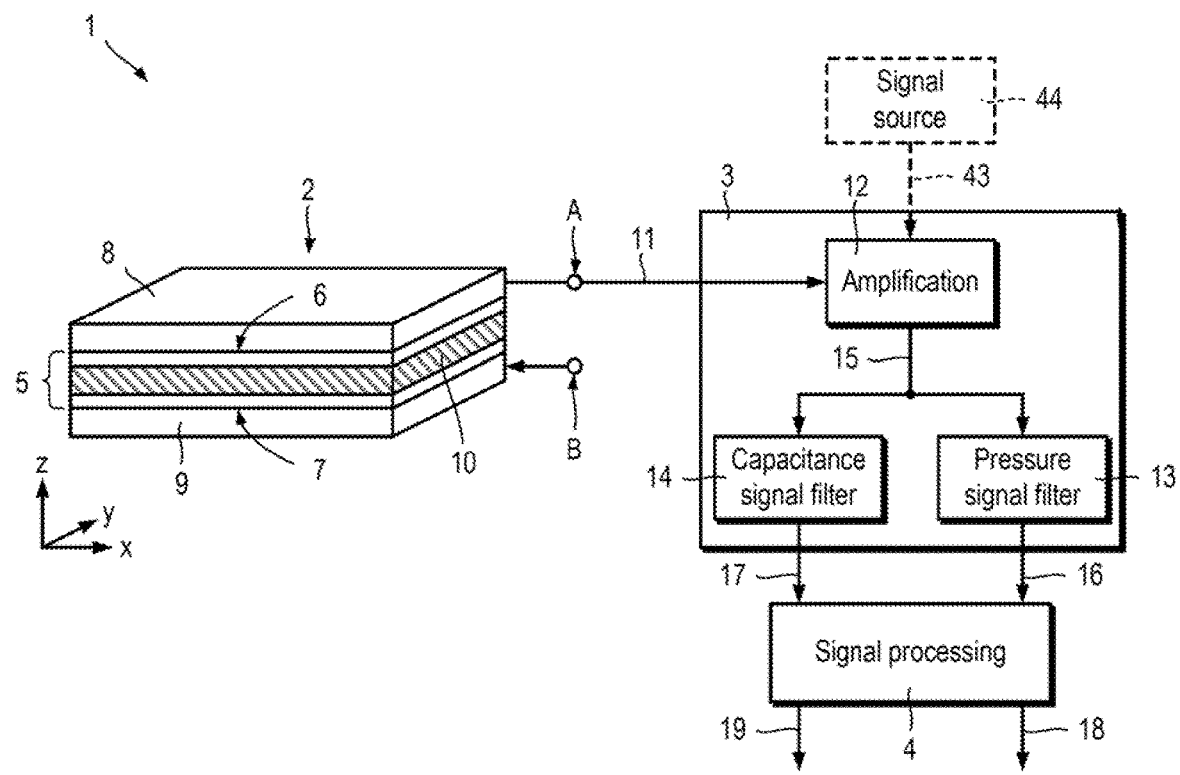
FIG. 1 schematically illustrates a first apparatus including a first touch sensor and a front end module for combined capacitive and pressure sensing.

In the following description, like parts are denoted by like reference numerals.

First Combined Capacitance and Pressure Sensing Apparatus and First Touch Sensor:

FIG. 1 schematically illustrates a first apparatus 1 for combined capacitive and pressure sensing which includes a first touch sensor 2, a front end module 3, and a first signal processing module 4.

The first touch sensor 2 includes a layer structure 5 having a first face 6 and a second, opposite, face 7, a first electrode 8 and a second electrode 9. The layer structure 5 includes one or more layers, including at least a layer of piezoelectric material 10. Each layer included in the layer structure 5 is generally planar and extends in first x and second y directions which are perpendicular to a thickness direction z. The one or more layers of the layer structure 5 are arranged between the first and second faces 6, 7 such that the thickness direction z of each layer of the layer structure 5 is perpendicular to the first and second faces 6, 7. The first electrode 8 is disposed on the first face 6 of the layer structure 5, and the second electrode 9 is disposed on the second face 7 of the layer structure 5. The first electrode 8 is electrical coupled to a terminal A and the second electrode 9 is coupled to a terminal B.

Preferably, the piezoelectric material is a piezoelectric polymer such as polyvinylidene fluoride (PVDF). However, the piezoelectric material may alternatively be a layer of a piezoelectric ceramic such as lead zirconate titanate (PZT). Preferably, the first and second electrodes are indium tin oxide (ITO) or indium zinc oxide (IZO).

However, the first and second electrodes 8, 9 may be metal films such as aluminium, copper, silver or other metals suitable for deposition and patterning as a thin film. The first and second electrodes 8, 9 may be conductive polymers such as polyaniline, polythiphene, polypyrrole or poly(3,4-ethylenedioxythiophene) polystyrene sulfonate (PEDOT/PSS). The first and second electrodes may be formed from a metal mesh; nanowires, optionally silver nanowires; graphene; and carbon nanotubes.

The front end module 3 is coupled to the first touch sensor 2 via terminal A in order to receive an input signal 11 from the first electrode 8. The front end module includes a first stage 12 in the form of an amplification stage, and a second stage in the form of a first frequency-dependent filter 13 and a second frequency-dependent filter 14. The first stage 12 receives the input signal 11 from the first electrode 8, and provides an amplified signal 15 based on the input signal 11. The first frequency-dependent filter 13 receives and filters the amplified signal 15 to provide a first filtered signal 16 having a first frequency bandwidth. The second frequency-dependent filter 14 receives and filters the amplified signal 15 to provide a second filtered signal 17 having a second frequency bandwidth. The frequency bandwidth has a relatively higher start-frequency than the first frequency bandwidth.

The input signal 11 is produced in response to a user interaction with the touch sensor 2 or with a layer of material overlying the touch sensor 2. In the following description, reference to a "user interaction" shall be taken to include a user touching or pressing a touch sensor, a touch panel or a layer of material overlying either. The term "user interaction" shall be taken to include interactions involving a user's digit or a stylus (whether conductive or not). The term "user interaction" shall also be taken to include a user's digit or conductive stylus being proximate to a touch sensor or touch panel without direct physical contact.

The terminal B may couple the second electrode 9 to ground, to a voltage bias source 52 (FIG. 10) providing a constant potential, to a signal source 44 providing a periodic signal 43 or to the front end module 3 such that the front end module 3 is connected across the terminals A and B.

The terminals A, B, and other terminals denoted herein by capitalised Latin letters are used as reference points for describing electrical coupling between electrodes and other elements of an apparatus. Although the terminals A, B may actually be physical terminals, the description that an element, for example a front end module 3, is coupled to a terminal, for example, the terminal A shall be taken to mean that the front end module is directly coupled to the first electrode 8. Similarly for other elements and other terminals denoted by capitalised Latin letters.

The first signal processing module 4 receives the first and second filtered signals 16, 17. The first signal processing module 4 calculates pressure values 18 based on the first filtered signal 16 and capacitance values 19 based on the second filtered signal 17. The pressure values 18 depend upon a deformation, which may be a strain, applied to the layer of piezoelectric material 10 and corresponding to a user interaction. The capacitance values 19 depend upon the self-capacitance of the first electrode 8 and/or a mutual capacitance between the first and second electrodes 8, 9. The capacitance values 19 vary in response to a user interaction involving a digit or a conductive stylus.

In this way, pressure and capacitance measurements may be performed using the touch sensor 2 without the need for separate pressure and capacitance electrodes. A single input signal 11 is received from the first electrode 8 which includes pressure and capacitance information. Additionally, the input signal 11 may be amplified and processed using a single front end module 3. This can allow the apparatus 1 to be more readily integrated into existing projected capacitance touch panels.

The layer structure 5 may include only the layer of piezoelectric material 10, such that the first and second opposite faces 6, 7 are faces of the piezoelectric material layer to (FIGS. 15, 21, 27, 32 and 38). Alternatively, the layer structure 5 may include one or more dielectric layers which are stacked between the layer of piezoelectric material 10 and the first face 6 of the layer structure 5 (FIGS. 31, 33, 35 and 36). The layer structure 5 may include one or more dielectric layers stacked between the second face 7 of the layer structure 5 and the layer of piezoelectric material 10 (FIG. 33). Preferably, one or more dielectric layer(s) include layers of a polymer dielectric material such as polyethylene terephthalate (PET), or layers of pressure sensitive adhesive (PSA) material. However, one or more dielectric layer(s) may include layers of a ceramic insulating material such as aluminium oxide.

In FIG. 1, the first and second faces 6, 7 and the layers of the layer structure 5 are shown extending along orthogonal axes labelled x and y, and the thickness direction of each layer of the layer structure 5 is aligned with an axis labelled z which is orthogonal to the x and y axes. However, the first, second and thickness directions need not form a right handed orthogonal set as shown. For example, the first and second directions x, y may intersect at an angle of 30 degrees or 45 degrees or any other angle greater than 0 degrees and less than 90 degrees.

Figure 2:
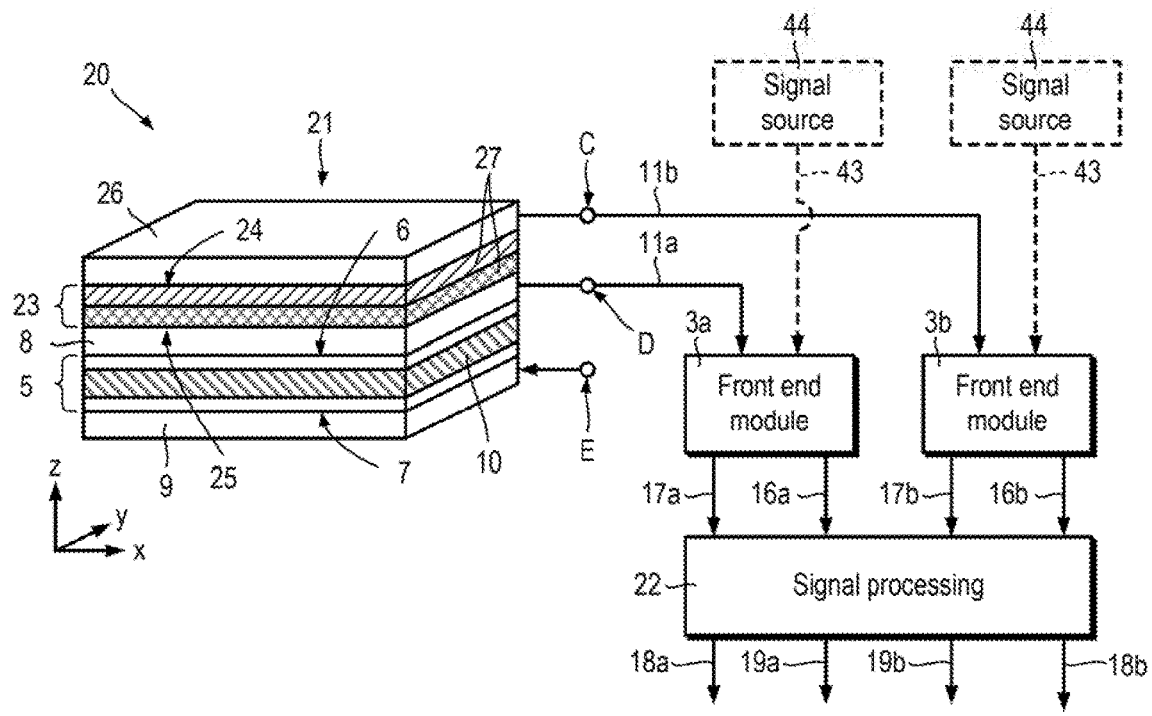
FIG. 2 schematically illustrates a second apparatus including a second touch sensor.

Second Combined Capacitance and Pressure Sensing Apparatus and Second Touch Sensor:

Referring also to FIG. 2, a second apparatus 20 is shown which includes a second touch sensor 21, a first front end module 3a, a second front end module 3b and a second signal processing module 22.

The second touch sensor 21 is similar to the first touch sensor 2, except that the second touch sensor 21 also includes a second layer structure 23 having a third face 24 and a fourth, opposite, face 25, and a third electrode 26. The second layer structure 23 includes one or more dielectric layers 27. Each dielectric layer 27 is generally planar and extends in first x and second y directions which are perpendicular to a thickness direction z. The one or more dielectric layers 27 of the second layer structure 23 are arranged between the third and fourth faces 24, 25 such that the thickness direction z of each dielectric layer 27 of the second layer structure 23 is perpendicular to the third and fourth faces 24, 25. The third electrode 26 is disposed on the third face 24 of the second layer structure 23, and the fourth face 25 of the second layer structure 23 contacts the first electrode 8.

Preferably, the dielectric layer(s) 27 include layers of a polymer dielectric material such as PET or layers of PSA materials. However, the dielectric layer(s) 27 may include layers of a ceramic insulating material such as aluminium oxide. Preferably, the third electrode 26 is made of indium tin oxide (ITO) or indium zinc oxide (IZO). However, the third electrode 26 may be a metal mesh film such as aluminium, copper, silver or other metals suitable for deposition and patterning as a thin film. The third electrode 26 may be made of a conductive polymer such as polyaniline, polythiphene, polypyrrole or poly(3,4-ethylenedioxythiophene) polystyrene sulfonate (PEDOT/PSS).

The first and second front end modules 3a, 3b are the same as the front end module 3. The first front end module 3a is coupled to the second touch sensor 21 via a terminal D in order to receive a first input signal 11a from the first electrode 8. The second front end module 3b is coupled to the second touch sensor 21 via a terminal C in order to receive a second input signal 11b from the third electrode 26. A terminal E may couple the second electrode 9 to ground, to a voltage bias source 52 (FIG. 10) providing a constant potential, or to a signal source 44 providing a periodic signal 43. Alternatively, the terminal E may be coupled to the first front end module 3a such that the first front end module 3a is connected across the terminals D and E, and the terminal E may also be coupled to the second front end module 3b such that the second front end module 3b is connected across the terminals C and E.

The second signal processing module 22 receives first and second filtered signals 16a, 17a from the first front end module 3a and first and second filtered signals 16b, 17b from the second front end module 3b. The second signal processing module 22 calculates first pressure values 18a and capacitance values 19a based on the filtered signals 16a, 17a from the first front end module 3a and the second filtered signal 17b from the second front end module 3b. The second signal processing module 22 calculates second pressure values 18b and capacitance values 19b based on the filtered signals 16b, 17b from the second front end module 3b and the second filtered signal 17a from the first front end module 3a. The pressure values 18a, 18b depend upon a deformation applied to the layer of piezoelectric material 10 by a user interaction. The first capacitance values 19a depend upon the self-capacitance of the first electrode 8 and/or a mutual capacitance between the first and second electrodes 8, 9 and/or upon a mutual capacitance between the first and third electrodes 8, 23. The second capacitance values 19b depend upon the self-capacitance of the third electrode 26 and/or a mutual capacitance between the third and second electrodes 23, 9, and/or upon a mutual capacitance between the first and third electrodes 8, 23. The capacitance values 19 vary in response to a user interaction involving a digit or a conductive stylus.

The second layer structure 23 may include only a single dielectric layer 27, such that the third and fourth opposite faces 24, 25 are faces of a single dielectric layer 27 (FIGS. 21, 23, 30, 34, 36). Alternatively, a second layer structure need not be used, and the third electrode 26 could be disposed on the first face 6 along with the first electrode 8 (FIGS. 24, 35, 37). In FIG. 2, the third and fourth faces 24, 25 and the dielectric layers 27 of the second layer structure 23 are shown extending along orthogonal axes labelled x and y, and the thickness direction of each dielectric layer 23 of the second layer structure 23 is aligned with an axis labelled z which is orthogonal to the x and y axes. However, the first, second and thickness directions need not form a right handed orthogonal set as shown.

Figure 3:
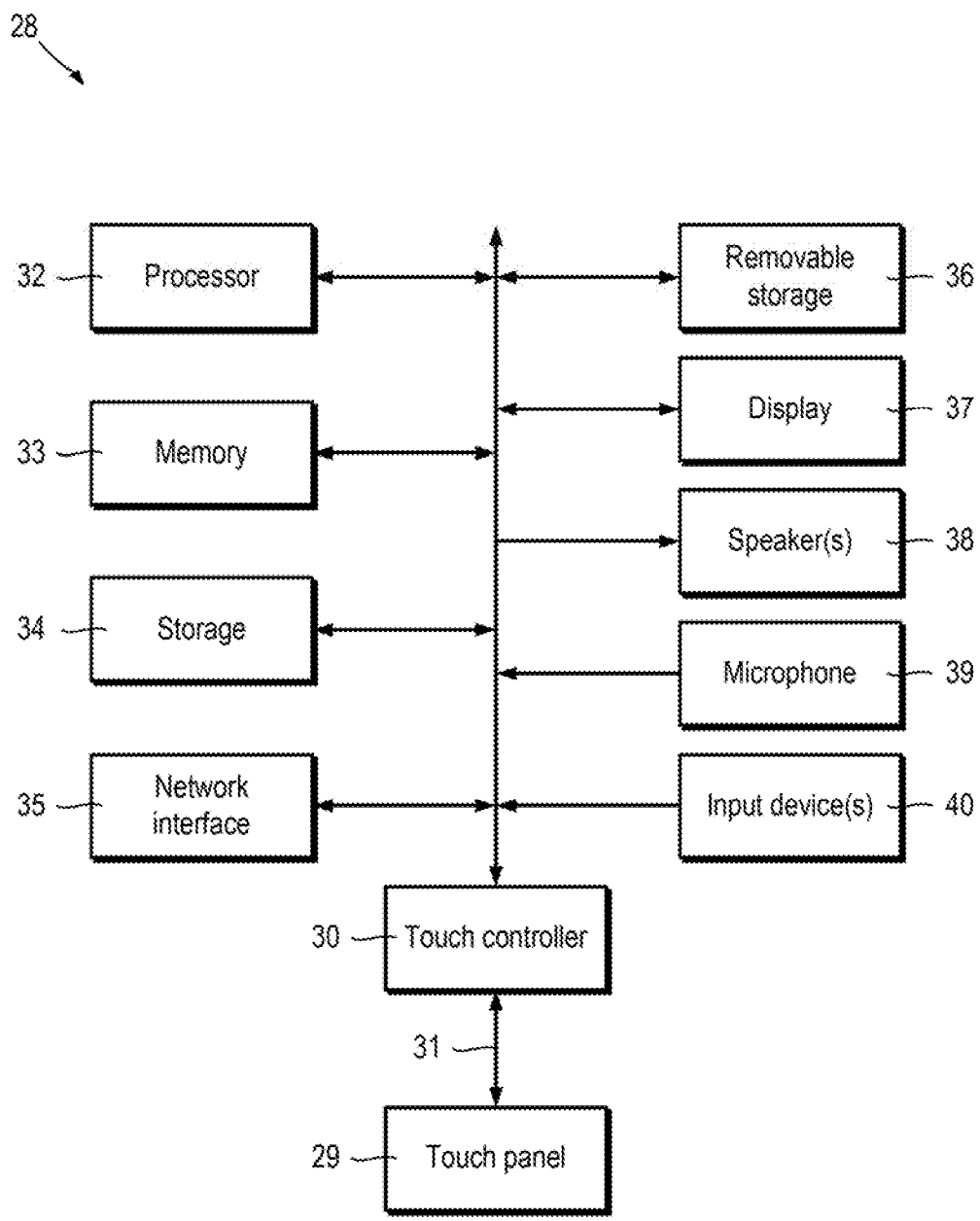
FIG. 3 is a block diagram of an electronic device.

Electronic Device:

Referring also to FIG. 3, an electronic device 28 may include a touch panel 29 and a touch controller 30 for providing combined capacitive and pressure sensing.

The electronic device 28 may be a relatively immobile electronic device such as, for example a desktop computer, an automated teller machine (ATM), a vending machine, a point of sale device, or a public access information terminal. Alternatively, an electronic device 28 may be a portable electronic device such as a laptop, notebook or tablet computer, a mobile phone, a smart phone, a personal data assistant or a music playing device. The electronic device 28 includes a touch panel 29 including one or more touch sensors 2, 21. The touch panel 29 is coupled to a touch controller 30 including one or more front end modules 3 by a link 31. In a case where the link 31 is a multiplexed link, one front end module 3 may receive input signals 11 from multiple touch sensors 2, 21. For example, using a multiplexed link 31 the touch controller 30 may include one front end module and the touch panel 29 may include two, four, eight, sixteen, thirty two, sixty four, one hundred and twenty eight, two hundred and fifty six or more touch sensors 2, 21. The number of touch sensors 2, 21 coupled to a front end module 3 by a multiplexed link 31 need not be a power of two.

The electronic device 28 may include a processor 32 for executing programs and processing information. The electronic device 28 may include a memory 33 such as a volatile random access memory for temporarily storing programs and information, and/or storage 31 such as non-volatile random access memory (NVRAM) or a hard disc drive (HDD) for long term storage of programs and information. The electronic device 28 may include a network interface 35 for transmitting and/or receiving information from wired or wireless communication networks. The electronic device 28 may include a removable storage interface 36 which can interface with removable storage media to read and/or write programs and information. The electronic device 28 may include output means such as a display 37 and/or speaker(s) 38. The display 37 may be any type of display such as, for example, an liquid crystal display (LCD), a light emitting diode display (LED), an organic LED display, an electrophoretic display or other type of electronic-ink display.

The touch controller 30 provides input information to the electronic device 28 which corresponds to user interactions with the touch panel 29. For example, input information may be the locations and/or pressures of one or more user interactions. The electronic device may include other input means such as a microphone 39, or other input devices 40 such as, for example, a keyboard, keypad, mouse or trackball. When the touch panel 29 includes a plurality of touch sensors 2, 21, the touch controller 30 may provide positional information in the form of coordinates and/or pressures corresponding to one or more simultaneous user interactions with the touch panel 29.

The touch panel 29 may be provided overlying the display 37, such that the touch panel 29 and display 37 provide a touch screen. Alternatively, the touch sensors 2, 21 of the touch panel 29 may be integrated into or embedded within the display 37. When the touch panel 29 is used overlying or integrated into the display 37, the layer structure(s) 5, 23 and electrodes 8, 9, 26 may be transparent or substantially transparent. For example, the layer structure(s) 5, 23 and electrodes 8, 9, 26 may transmit 50% or more, preferably at least 75%, preferably at least 90% of light in visible wavelengths. For example, the piezoelectric material may be PVDF, dielectric layers included in the layers structures 5, 23 may be PET or an optically clear PSA, and the electrodes 8, 9, 26 may be ITO. Alternatively, the electrodes 8, 9, 26, and any connections thereto, may be opaque and sufficiently thin in a direction perpendicular to the thickness direction z that they are not immediately noticeable to the human eye, for example, electrodes, and any connections thereto, may be less than 100 micrometers ($1\times10^{-4}$ m) wide, less than 10 micrometers ($1\times10^{-5}$ m) wide or thinner.

Figure 4:
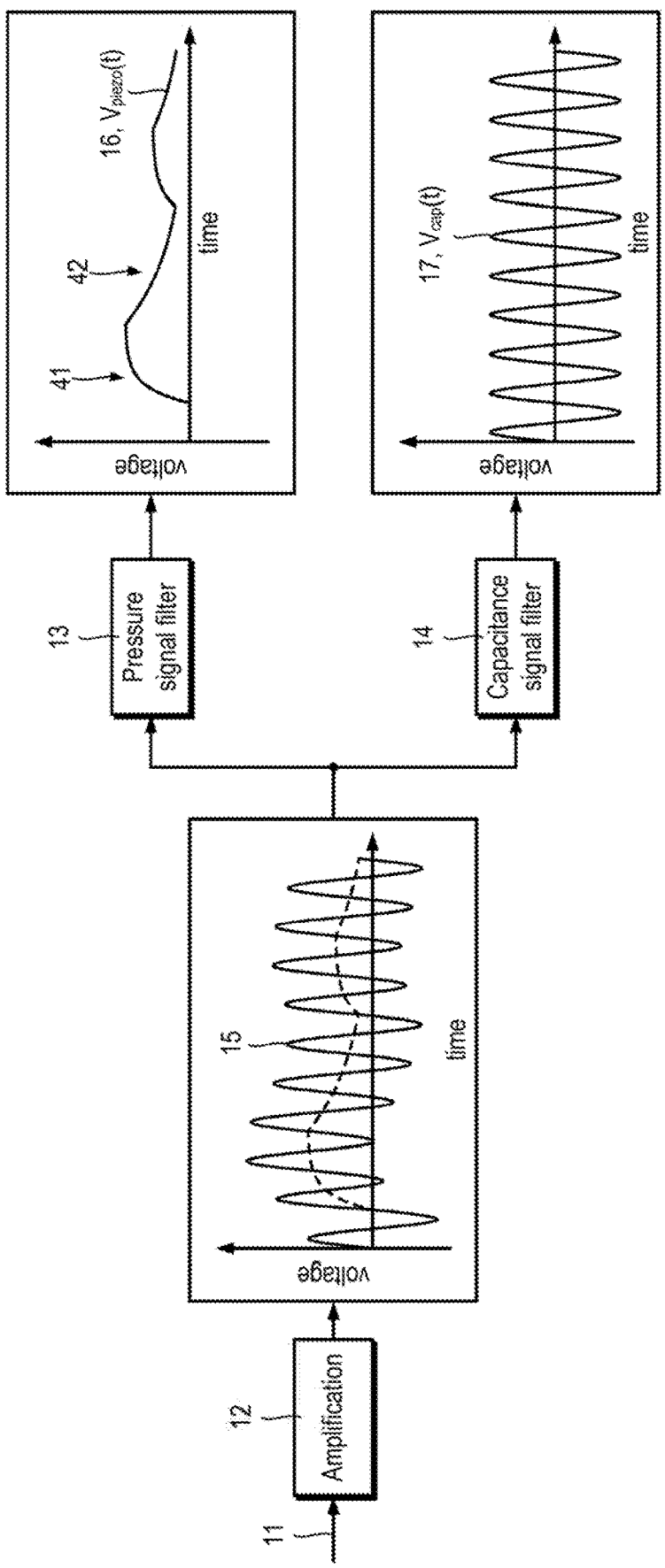
FIG. 4 illustrates the operation of the front end module shown in FIG. 1.

Operation of the First and Second Apparatuses:

Referring also to FIG. 4, operation of the first end module 3 will be explained.

The layer of piezoelectric material 10 is poled such that a polarisation P of the layer of piezoelectric material 10 having a component $P_z$ in the thickness direction z will be generated by the application of a pressure (or stress or force) in the thickness direction z which results from a user interaction with the touch sensor 2, 21. The polarisation P of the layer of piezoelectric material results in an induced electric field $E_p$, which has a component $E_z$ in the thickness direction. Preferably, the layer of piezoelectric material 10 is poled such that the induced electric field $E_p$ is orientated substantially in the thickness direction z, such that the component of the induced electric field $E_p$ in the thickness direction $E_z$ is substantially larger than any components perpendicular to the thickness direction $E_x$, $E_y$. Preferably, the induced electric field $E_p$ is orientated at an angle within 10 degrees of the thickness direction z. However, the induced electric field $E_p$ may be orientated at an angle within 30 degrees, within 45 degrees or within 60 degrees of the thickness direction z. The deformation which produces the polarisation P may result from a compression or a tension. The deformation which produces the polarisation P may be an in-plane stretching of the piezoelectric material layer 10.

The induced electric field $E_p$ produces a potential difference between the first and second electrodes 8, 9 of the first or second touch sensors 2, 21. The induced electric field $E_p$ produces a potential difference between the third and second electrodes 26, 9 of the second touch sensor 21. If a conductive path is provided between the first or third electrodes 8, 26 and the second electrode 9, charges will flow between them until the induced electric field $E_p$ is cancelled by an electric field $E_q$ produced by the charging of the electrodes 8, 9, 26. Intimate contact between the layer of piezoelectric material 10 and the electrodes 8, 9, 26 is not required, provided that intervening layers of the layer structures 5, 23 are not so thick that the induced electric field $E_p$ is negligible at the location of an electrode 8, 9, 26. A potential difference may be produced between the third and second electrodes 23, 9 of the second touch sensor 21 provided that the first electrode 8 is arranged such that the third electrode 23 is not entirely screened from the induced electric field $E_p$.

The input signal 11 received from the first electrode 8 or the third electrode 23 includes a current signal $I_{piezo}(t)$ which depends upon the induced electric field $E_p$ (because there exists a finite resistance between the first or third electrodes 8, 26 and the second electrode 9). Generally, a greater deformation applied to the layer of piezoelectric material 10 will result in a greater induced electric field $E_p$ and a correspondingly larger magnitude of $I_{piezo}(t)$. The first stage 12 includes a circuit providing an integrating amplifier which integrates the current signal $I_{piezo}(t)$ and multiplies by a gain G in order to provide an integrated output voltage signal $V_{piezo}(t)$. The gain G need not be fixed, and in general may be by a function of time, frequency and/or the electrical parameters of a feedback network included in the first stage 12. The current signal $I_{piezo}(t)$ and leakage currents result in the magnitude of the induced electric field $E_p$ decaying slowly over time (also referred to herein as "rolling off") in response to a static pressure applied by a user. For example, when a user presses the touch sensor 2, 21 the integrated output voltage signal $V_{piezo}(t)$ will display a rapidly rising period 41, followed by a relatively slowly decaying period 42.

The amplified signal 15 is a superposition of the integrated output voltage signal $V_{piezo}(t)$ and a capacitance measurement voltage signal $V_{cap}(t)$. The capacitance voltage signal $V_{cap}(t)$ is a periodic signal having a basic frequency of $f_d$. The capacitance voltage signal $V_{cap}(t)$ is based on the capacitance of the touch sensor 2, 21 and a periodic signal 43 provided by a signal source 44. Relative to the periodic signal 43, one or more of the amplitude, phase or frequency of the capacitance voltage signal $V_{cap}(t)$ depends directly upon the capacitance of the touch sensor 2, 21.

For the first touch sensor 2, a signal source 44 may be coupled to the front end module 3 or to the second electrode 9 via terminal B. For the second touch sensor 21, signal source(s) 44 may be coupled to the first and second front end modules 3a, 3b or to the second electrode 9 via terminal E. The signal source 44 may be a voltage controlled source $V_d(f_d)$ or a current controlled source $I_d(f_d)$. When the signal source 44 is a current controlled source $I_d(f_d)$ and the periodic signal 43 is an input to the front end modules 3a, 3b of the second apparatus 20, a pair of synchronised current controlled sources $I_d(f_d)$ are used so that current drawn by one front end module 3a, 3b does not disturb the periodic signal 43 supplied to the other.

The signal source 44 may provide a periodic signal 43 having a sinusoidal, square, triangular or saw-toothed waveform. The signal source may provide a periodic signal comprising a superposition of two or more sinusoidal waveforms having different frequencies.

Preferably, the front end module 3 receives the periodic signal 43 and the first stage 12 provides the amplified signal 15 based on the input signal 11 and the periodic signal 43. The amplified signal 15 is a superposition of the integrated output voltage signal $V_{piezo}(t)$ and the capacitance measurement voltage signal $V_{cap}(t)$. However, the integrated output voltage signal $V_{piezo}(t)$ and the capacitance measurement voltage signal $V_{cap}(t)$ generally have distinctly different frequency contents, which facilitates separation using the first and second frequency-dependent filters 13, 14. Where a user interaction does not apply a pressure to the layer of piezoelectric material the contribution of the integrated output voltage signal $V_{piezo}(t)$ to the amplified signal 15 may be zero or negligible.

Self capacitances of the first or third electrodes 8, 26, or mutual capacitances between any pair of the first, second or third electrodes 8, 9, 26 may typically fall within the range of 0.1 to 3000 pF or more, and preferably 100-2500 pF. In order to effectively couple to capacitances in this range, the periodic signal 43 may typically have a base frequency of greater than or equal to 10 kHz, greater than or equal to 20 kHz, greater than or equal to 50 kHz or greater than or equal to 100 kHz. The periodic signal 43 may be provided with a narrow frequency band or may be provided by a single frequency signal, such as a sinusoidal signal.

By contrast, the integrated output voltage signal $V_{piezo}(t)$ typically includes a broadband frequency content spanning a range from several Hz to several hundreds or thousands of Hz. This is partly because the integrated output voltage signal $V_{piezo}(t)$ arises from user interactions by a human user and partly because of the slowly decaying roll off period 42.

Preferably, the first frequency-dependent filter 13 attenuates the capacitance measurement voltage signal $V_{cap}(t)$ such that the first filtered signal 16 is not based on the periodic signal 43. Preferably, the first filtered signal 16 is substantially equal to the integrated output voltage signal $V_{piezo}(t)$.

Preferably, the second frequency-dependent filter 14 selects the capacitance measurement voltage signal $V_{cap}(t)$ such that the second filtered signal 17 is based on the periodic signal 43 and the capacitance of the touch sensor 2, 21. Preferably, the second filtered signal 17 is substantially equal to the capacitance measurement voltage signal $V_{cap}(t)$. Preferably, the first stage 12 provides the amplified signal 15 such that the amplitude of the capacitance measurement voltage signal $V_{cap}(t)$ depends upon the capacitance of the touch sensor 2, 21.

In this way, the amplitude of the first filtered signal 16 is dependent upon a pressure applied to the layer of piezoelectric material 10 by a user interaction, and the amplitude of the second filtered signal 17 is dependent upon a capacitance of a the touch sensor 2, 21 as modified by a user interaction.

Figure 5:
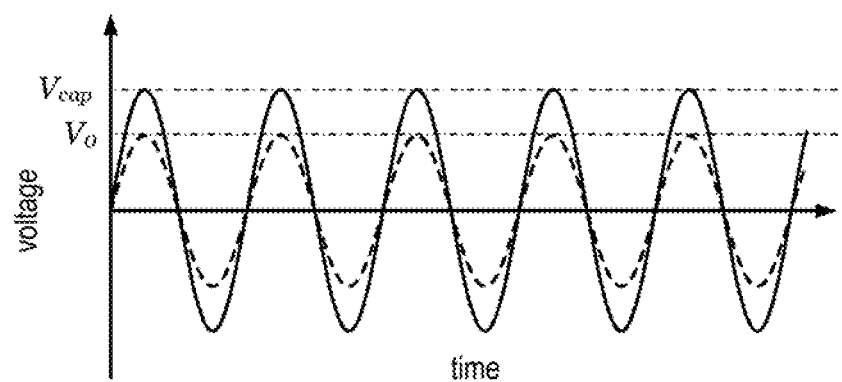
FIG. 5 illustrates the operation of the front end module shown in FIG. 1 using a single ended amplifier.
Figure 6:
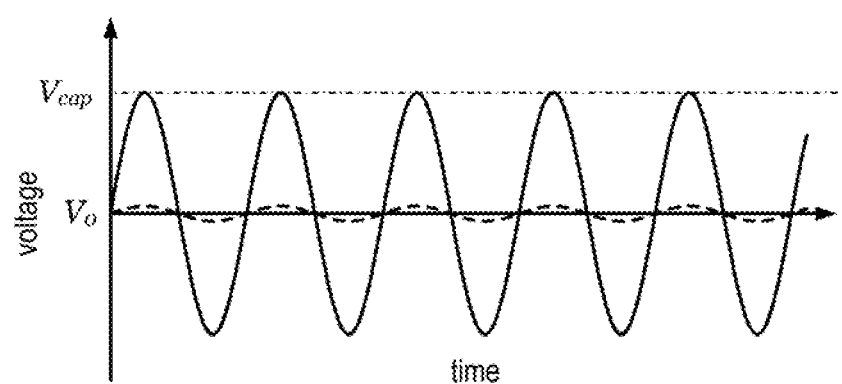
FIG. 6 illustrates the operation of the front end module shown in FIG. 1 using a differential amplifier.

Referring also to FIG. 5, a change in amplitude of the second filtered signal 17 in response to a user interaction in a case where the first stage 12 uses a single ended amplifier circuit is shown.

When there is no user interaction with a touch sensor 2, 21, the second filtered signal 17 has a baseline amplitude $V_o$. In response to a user interaction with the touch sensor 2, 21, the amplitude of the second filtered signal changes to $V_{cap}$, which may be greater than, less than or equal to $V_o$, depending on the configuration of the first stage 12. The user interaction is detected by the change in the amplitude $V_o - V_{cap}$ of the second filtered signal 17.

Referring also to FIG. 5, a change in amplitude of the second filtered signal 17 in response to a user interaction in a case where the first stage 12 uses a differential amplifier circuit is shown.

When there is no user interaction with a touch sensor 2, 21, the second filtered signal 17 has a baseline amplitude $V_o$ which is zero, negligible or as small as possible. In response to a user interaction, the amplitude of the second filtered signal changes to $V_{cap}$ which is greater than $V_o$. In the same way as the case using a single ended amplifier, the user interaction is detected by the change in amplitude $V_o - V_{cap}$ of the second filtered signal 17. However, in a case where the first stage 12 uses a differential amplifier circuit, it may be possible to increase the sensitivity of the first stage 12 amplification without requiring an analog to digital converter with a very high dynamic range in order to digitise and further process the second filtered signal 17.

Figure 7:
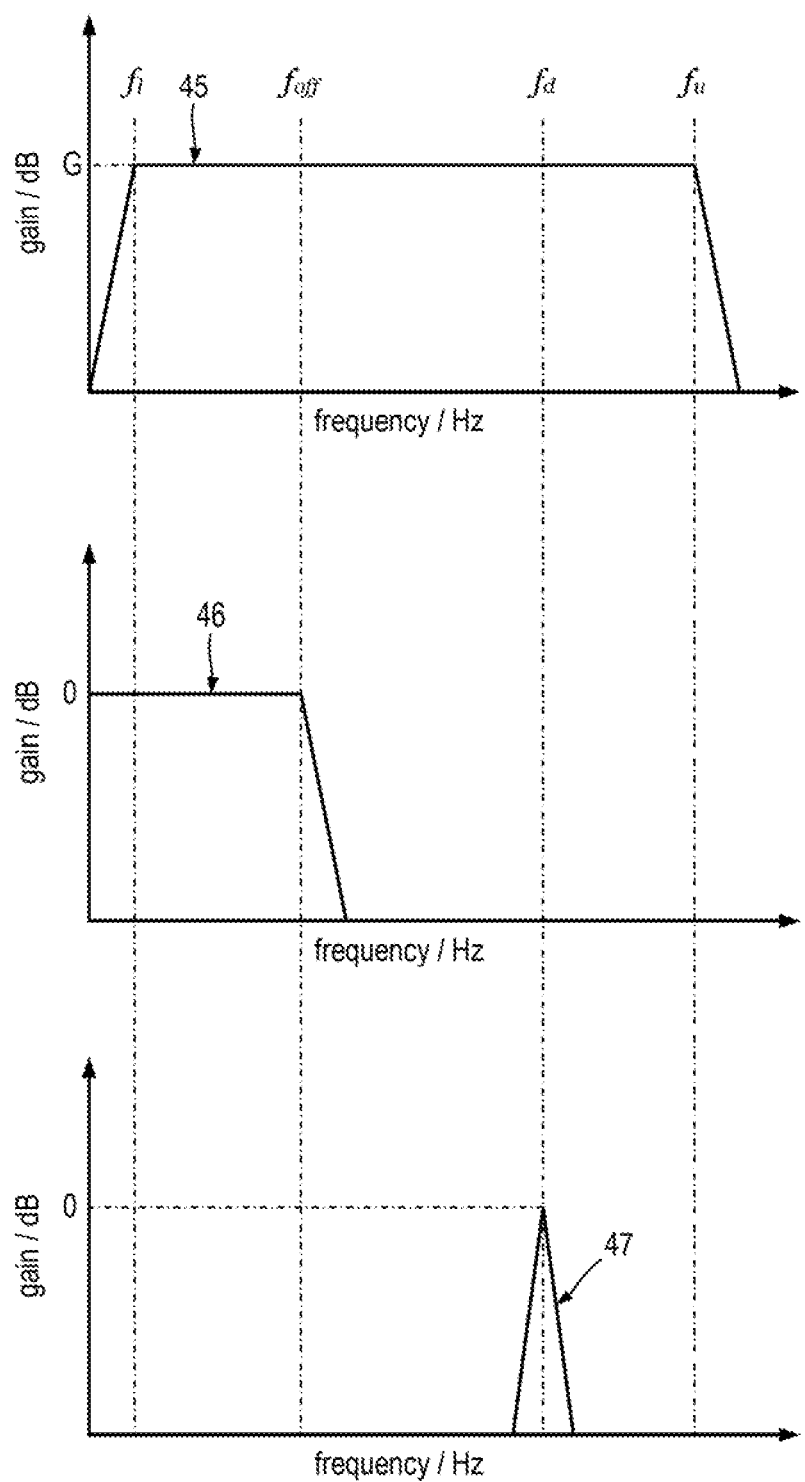
FIG. 7 schematically illustrates an example of a filter configuration for the front end module shown in FIG. 1.
Figure 8:
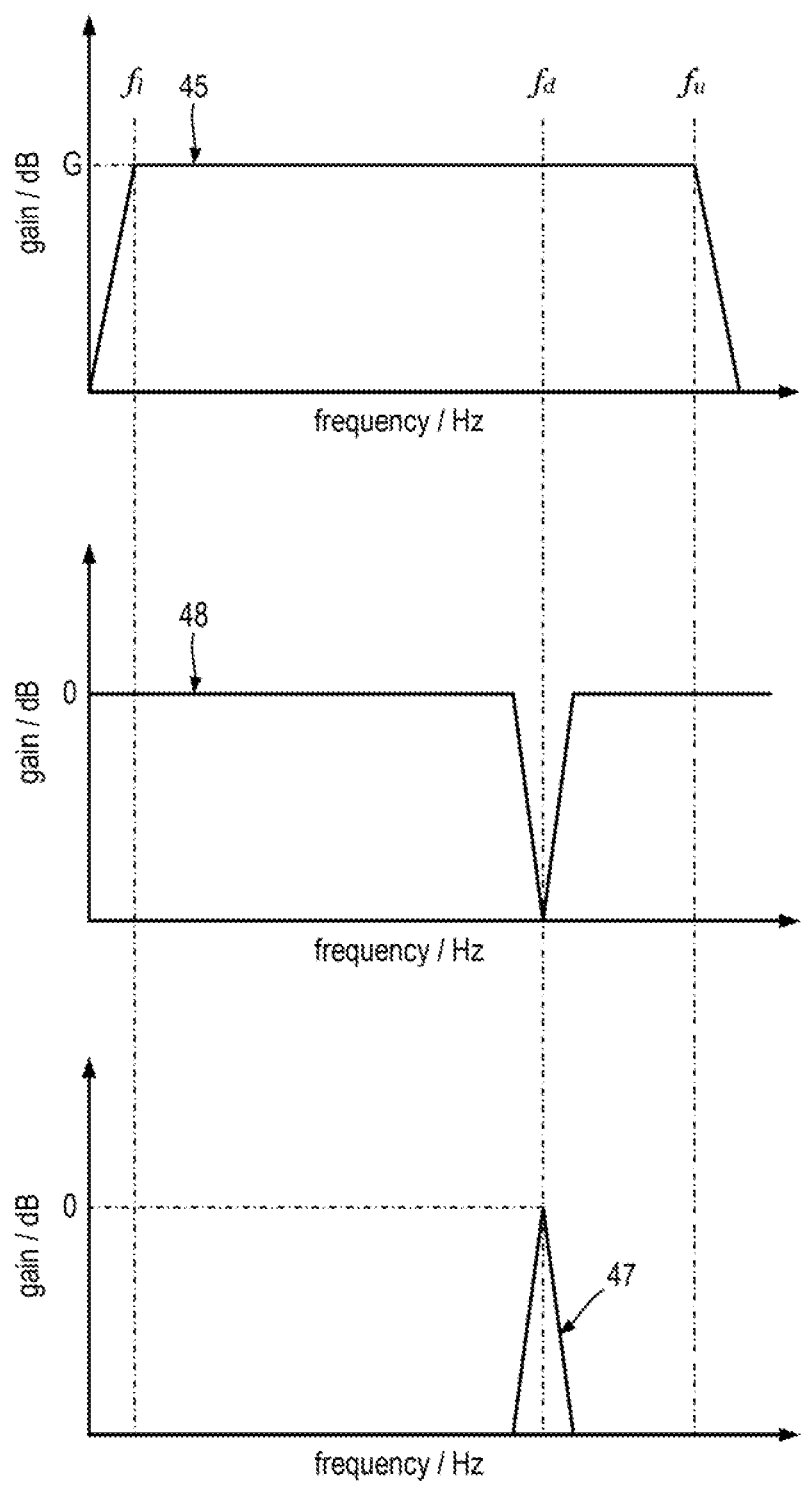
FIG. 8 schematically illustrates an example of a filter configuration for the front end module shown in FIG. 1.
Figure 9:
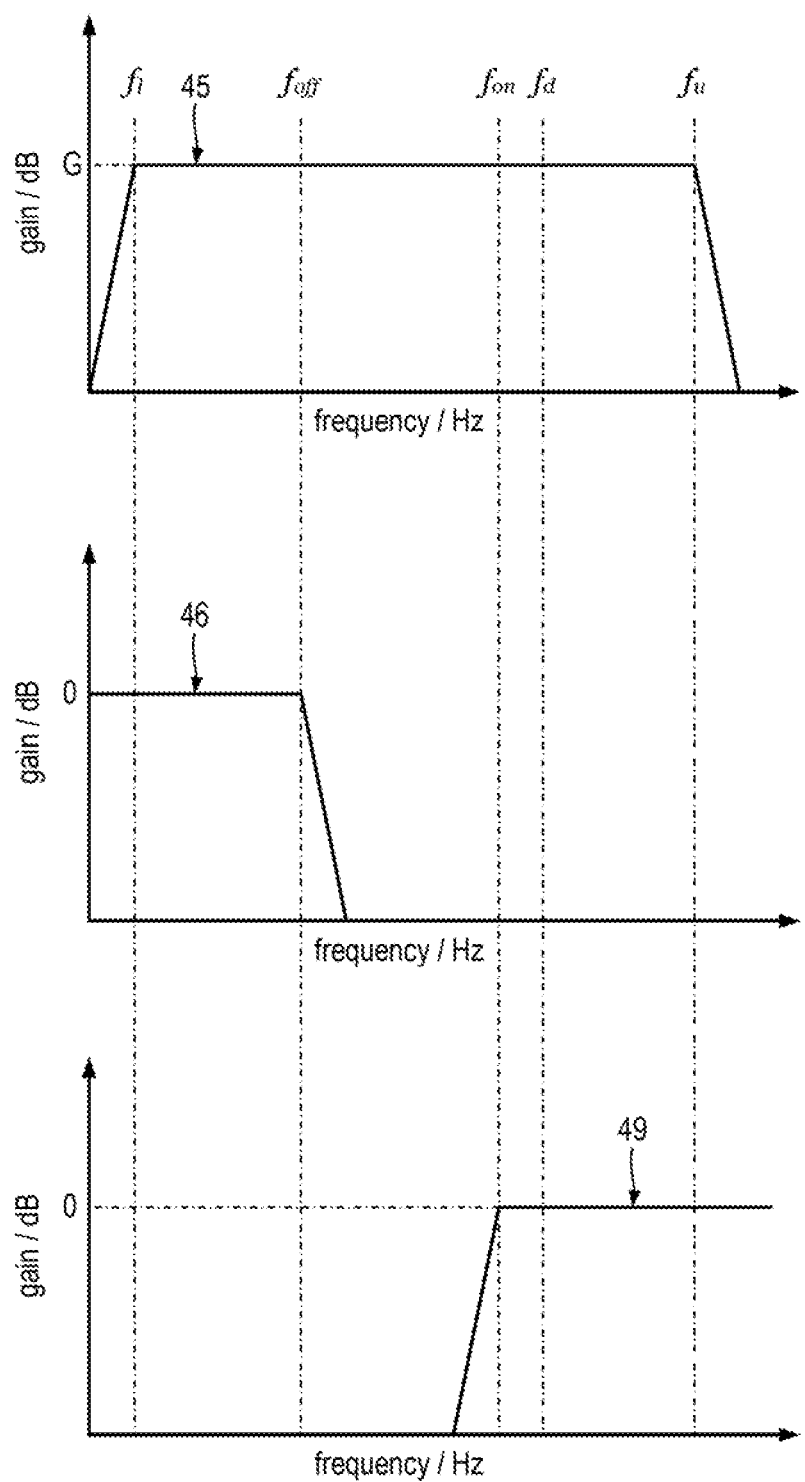
FIG. 9 schematically illustrates an example of a filter configuration for the front end module shown in FIG. 1.

Referring also to FIGS. 7 to 9, the frequency-attenuation behaviour of the first stage 12, and the second stage including the first and second frequency-dependent filters 13, 14 are shown.

The first stage 12 has a frequency response 45 having a low frequency cut-off $f_l$ and a high frequency cut-off $f_u$. Below the low frequency cut-off $f_l$ and above the high frequency cut-off $f_u$ the gain G of the first stage drops rapidly so that frequencies outside the range $f_l$ to $f_u$ are blocked. The high frequency cut-off $f_u$ is greater than the base frequency $f_d$ of the periodic signal 43. The low-frequency cut-off is preferably at least 1 hertz, or at least sufficiently high to substantially block voltage signals resulting from a pyroelectric effect in the layer of piezoelectric material 10 which result from the body temperature of a user's digit. For application in an industrial or domestic environment, the low frequency cut-off $f_l$ may be at least 50 Hz, at least 60 Hz or at least sufficiently high to reject noise pick-up at a frequency of a domestic of industrial power distribution network and resulting from ambient electric fields. The low frequency cut-off $f_l$ may be at least 100 Hz. The low frequency cut-off $f_l$ may be at least 200 Hz. For application in aircraft, the low frequency cut-off $f_l$ may be at least 400 Hz.

Referring in particular to FIG. 7, the first frequency-dependent filter 13 may be a low-pass filter 46 having a cut-off frequency $f_{off}$ which is lower than the base frequency $f_d$ of the periodic signal 43, and the second frequency-dependent filter 14 may be a band-pass filter 47 having a pass-band including the base frequency $f_d$.

Referring in particular to FIG. 8, the first frequency-dependent filter 13 may be a band-reject filter 48 having a stop-band including the base frequency $f_d$, and the second frequency-dependent filter 14 may be a band-pass filter 47 having a pass-band including the base frequency $f_d$.

Referring in particular to FIG. 9, the first frequency-dependent filter 13 may be a low-pass filter 46 having a cut-off frequency $f_{off}$ which is lower than the base frequency $f_d$ of the periodic signal 43, and the second frequency-dependent filter 14 may be a high-pass filter 49 having a cut-off frequency $f_{on}$ which is lower than the base frequency $f_d$ of the periodic signal 43 and higher than the cut-off frequency $f_{off}$ of the first frequency-dependent filter 13.

The band-pass filter 47 and/or the band-reject filter 48 may be notch filters or comb filters. If the periodic signal 43 has a sinusoidal waveform the band-pass filter 47 and/or the band-reject filter 48 are preferably notch filters centred at the base frequency $f_d$. If the periodic signal 43 has a non-sinusoidal waveform, then the band-pass filter 47 and/or the band-reject filter 48 are preferably wide band-filters or comb-filters having pass/reject bands centred at the base frequency $f_d$ and harmonics thereof.

The first and second frequency-dependent filters 13, 14 may be provided by active filter circuits. The first and second frequency-dependent filters 13, 14 may be provided by passive filter circuits. The first and second frequency-dependent filters 13, 14 may be provided by single stage filters or multiple stage filters. The first and second frequency-dependent filters 13, 14 may be Butterworth filters, Chebyshev filters, Gaussian filters and Bessel filters. The first frequency-dependent filter 13 may be of different type to the second frequency-dependent filter.

Alternatively, the second stage of the front end module 3 and the first and second frequency-dependent filters 13, 14 may be provided by an suitably programmed information processing device such as a microprocessor or a microcontroller.

Examples of circuits which may provide the first stage 12 in cases where the periodic signal 43 is received by the front end module 3 shall now be described.

Figure 10:
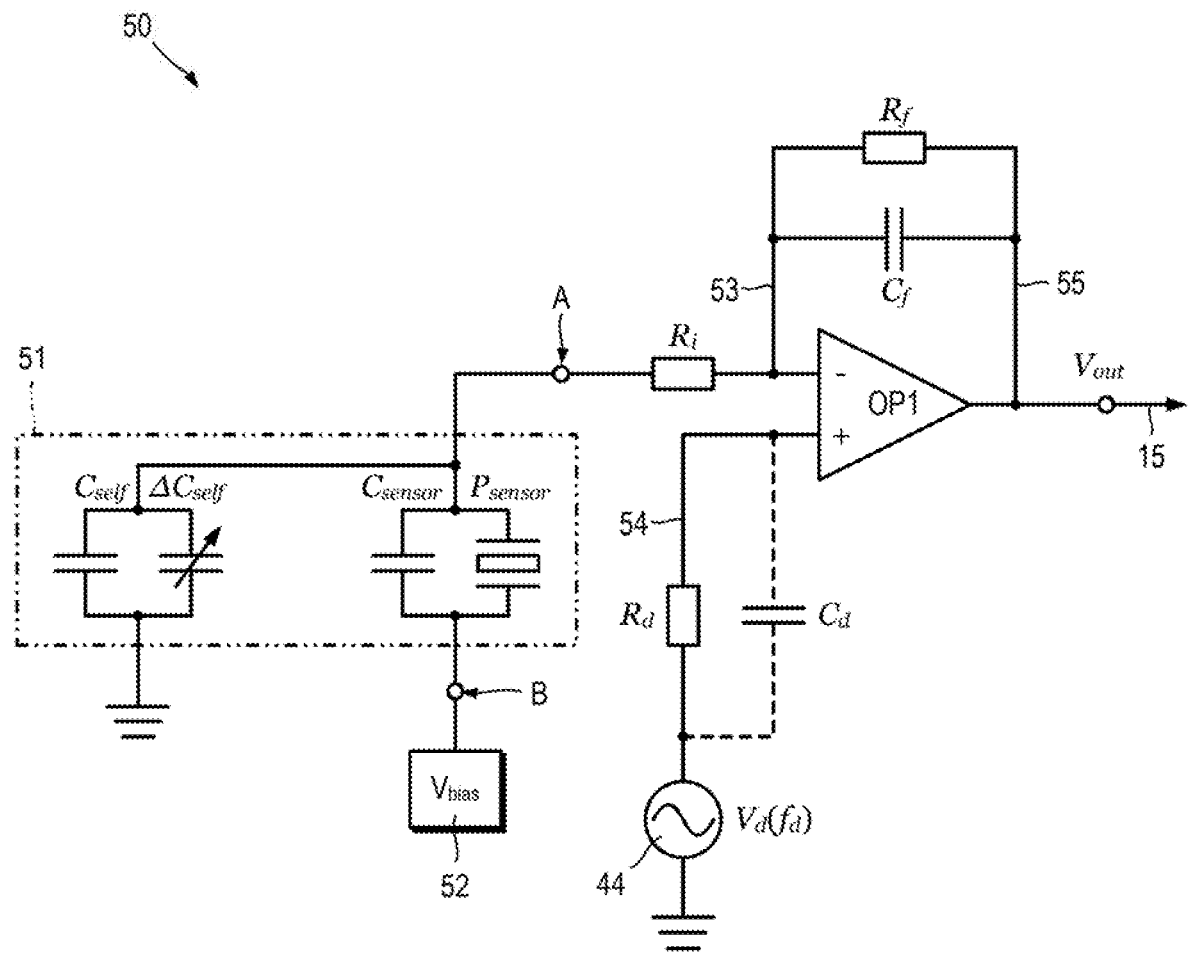
FIG. 10 is a schematic circuit diagram of a first amplifier included in the apparatus shown in FIG. 1.

First Amplifier:

Referring also to FIG. 10, a first amplifier 50 for the first stage 12 of the front end module 3 will be explained in a case where the signal source 44 is a voltage controlled source $V_d(f_d)$ which supplies the periodic signal 43 to the front end module 3.

The first touch sensor 2 is represented in the circuit diagram by an equivalent circuit 51 in which $C_{self}$ represents the self capacitance of the first electrode 8, $\Delta C_{self}$ represents the change in the self capacitance of the first electrode resulting from the touch or proximity of a user's digit or a conductive stylus, $C_{sensor}$ represents the mutual capacitance between the first and second electrodes 8, 9 and $P_{sensor}$ represents the piezoelectric response of the layer of piezoelectric material 10. The first electrode 8 is coupled to the terminal A and the second electrode 9 is coupled to a voltage bias source 52 which provides a constant bias voltage $V_{bias}$ to the second electrode 9. The voltage bias $V_{bias}$ may be a positive, negative or ground potential.

The first amplifier 50 provides the first stage 12 of the front end module 3. The first amplifier 50 includes an operational amplifier OP1 having at least an inverting input coupled to a first rail 53, a non-inverting input coupled to the voltage controlled source $V_d(f_d)$ via a path 54 including a first resistor $R_d$, and an output coupled to a second rail 55. The first amplifier 50 also includes a second resistor $R_i$ coupling the first rail 53 to the terminal A. In this way, the first amplifier 50 is coupled to the first electrode 8. The first amplifier 50 also includes a third resistor $R_f$ coupling the first rail 53 to the second rail 55, and a first capacitor $C_f$ coupling the first rail 53 to the second rail 55. Optionally, a second capacitor $C_d$ may be connected in parallel with the first resistor $R_d$. Other terminals of the operational amplifier OP1, such as power supply terminals, may be present but are not shown in this or other schematic circuit diagrams described herein.

The gain and frequency dependence of the first amplifier 50 are controlled by the third resistor $R_f$ and the first capacitor $C_f$ which provide a negative feedback network to the operational amplifier OP1. In the first amplifier 50, the second rail 55 provides the amplified signal 15 via an output terminal $V_{out}$. Alternatively, the second rail 55 may be directly coupled to the second stage of the front end module 3.

Because the non-inverting input of the operational amplifier OP1 is coupled to the voltage controlled source $V_d(f_d)$, the amplifier is effectively provided with a periodically varying virtual earth. In this way, the amplified signal 15 output by the first amplifier 50 is modulated by the periodic signal 43, and includes a superposition of the integrated output voltage signal $V_{piezo}(t)$ and the capacitance measurement voltage signal $V_{cap}(t)$. One simple way to view the interaction with the periodic signal 43 is using one of the "Golden rules" of operational amplifiers, namely that when an ideal operational amplifier is provided with a negative feedback network, the inverting and non-inverting inputs will be at the same potential. Thus, the potential at the non-inverting input of the operational amplifier OP1 varies with the periodic signal 43, and couples to the capacitances of the equivalent circuit 51. Coupling the periodic signal 43 to the capacitances of the equivalent circuit 51 using the described virtual earth configuration may have the advantage of allowing higher gains to be used to amplify the current signal $I_{piezo}(t)$ without saturating the output of the operational amplifier OP1.

The capacitance of the first capacitor $C_f$ may be selected to be approximately equal to the mutual capacitance $C_{sensor}$ between the first electrode 8 and the second electrode 9. The low frequency cut-off $f_l$ of the first amplifier 50 may be approximated as $f_l = 1/(2\pi \times R_f \times C_f)$. The high frequency cut-off $f_u$ may be approximated as $f_u = 1/(2\pi \times R_i \times C_f)$. In this way, the second and third resistors $R_i$, $R_f$ and the first capacitor $C_f$ may be selected such that the high frequency cut-off $f_u$ is greater than the base frequency $f_d$ of the periodic signal 43 and the low-frequency cut-off is at least 1 hertz or at least sufficiently high to substantially block voltage signals resulting from a pyroelectric effect in the layer of piezoelectric material 10. Optionally, the low frequency cut-off $f_l$ may be at least 50 Hz or at least 60 Hz or at least sufficiently high to reject noise pick-up at a frequency of a domestic or industrial power distribution network.

The voltage bias source 52 need not provide a constant bias voltage $V_{bias}$, and the voltage bias source 52 may instead provide a time varying voltage. In some cases, the voltage bias source 52 may alternatively be provided by the signal source 44 such that the periodic signal 43 is provided to the second electrode 9.

The equivalent circuit 51 has been shown as including a variable capacitance $\Delta C_{self}$ arising from self capacitance of the first electrode 8. However, the equivalent circuit 51 of the touch sensor 2 may additionally or alternatively include a variable capacitance $\Delta C_{sensor}$ arising from a mutual capacitance between the first and second electrodes 8, 9. In general, the equivalent circuit 51 may be different depending on the exact geometries of the first and second electrodes 8, 9 and the touch sensor 2.

Figure 11:
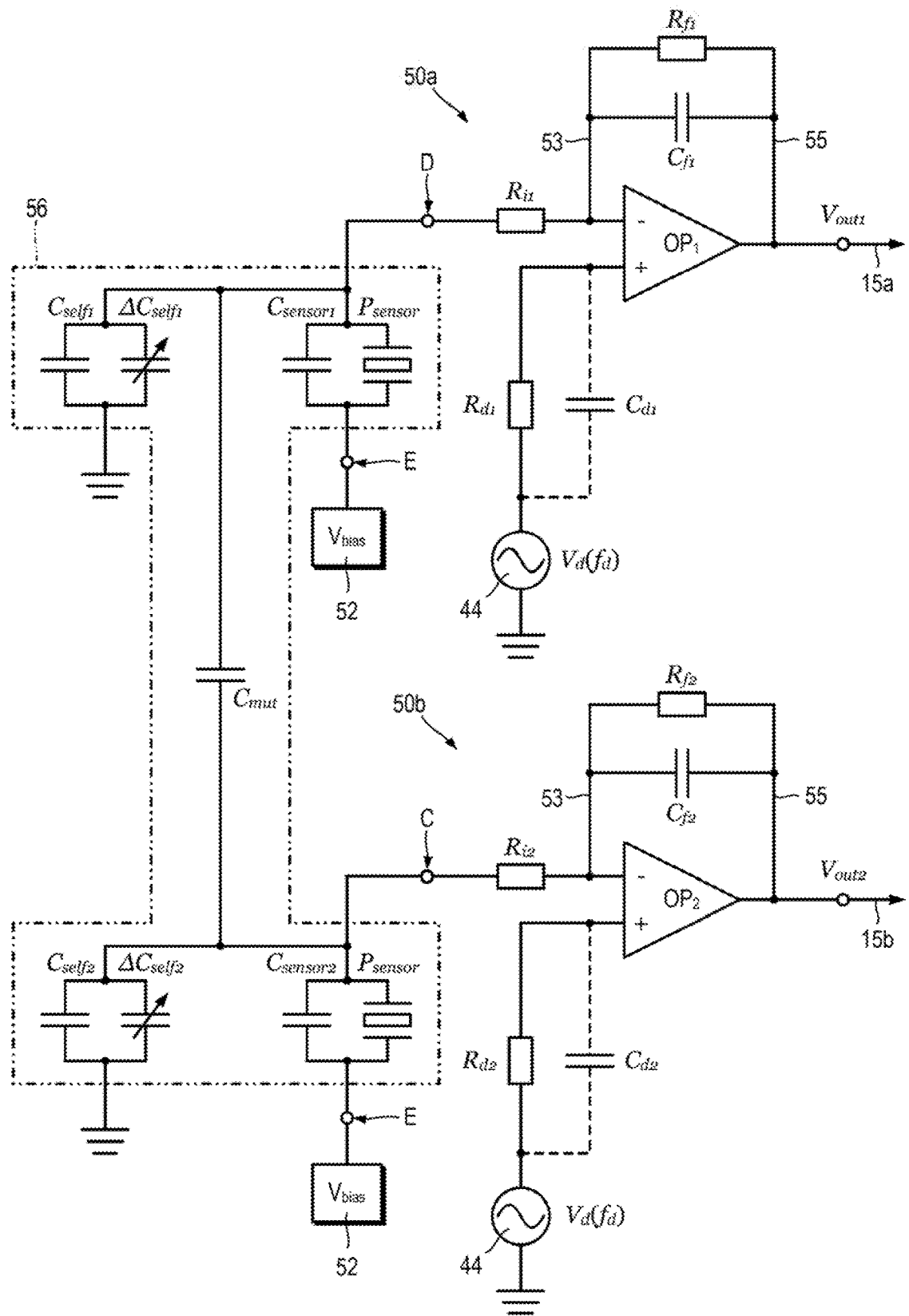
FIG. 11 is a schematic circuit diagram of the first amplifier shown in FIG. 10 included in the apparatus shown in FIG. 2.

Referring also to FIG. 11, the first amplifier 50 may provide the first stages 12 of the first and second front end modules 3a, 3b for the second apparatus 20.

A pair of first amplifiers 50a, 50b may provide the first stage of the respective front end modules 3a, 3b of the second apparatus 20 in a similar way to the first apparatus 1. The input to a first amplifier 50a which is included in the first front end module 3a is coupled via terminal D to the first electrode 8 of the second touch sensor 21. The input to a first amplifier S0b which is included in the second front end module 3b is coupled via terminal C to the third electrode 26 of the second touch sensor 21. The second electrode 9 of the second touch sensor 21 is coupled via terminal E to a voltage bias source 52. The same voltage controlled source 44, $V_d(f_d)$ may be coupled to both front end modules 3a, 3b in parallel.

Thus, each first amplifier 50a, 50b provides a corresponding amplified signal 15a, 15b depending upon input signals 11a, 11b from the first and third electrodes 8, 26 respectively. One difference to the first touch sensor 2 is that the equivalent circuit 56 of the second touch sensor 21 also includes a mutual capacitance $C_{mut}$ between the first electrode 8 and the third electrode 26.

Figure 12:
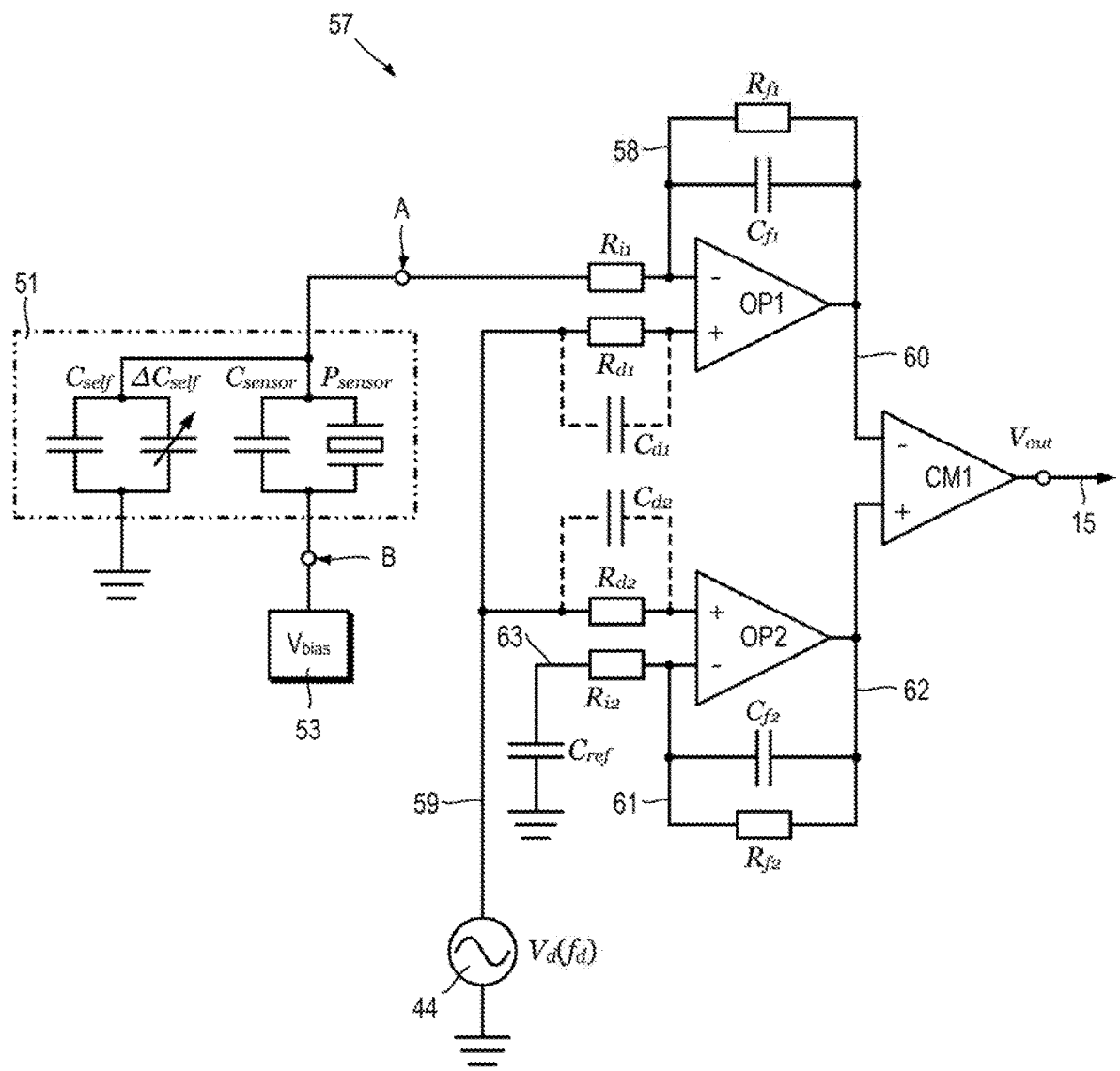
FIG. 12 is a schematic circuit diagram of a second amplifier included in the apparatus shown in FIG. 1.

Second Amplifier:

Referring also to FIG. 12, a second amplifier 57 for the first stage 12 of the front end module 3 will be explained in a case where the signal source 44 is a voltage controlled source $V_d(f_d)$ which supplies the periodic signal 43 to the front end module 3.

The first touch sensor 2 is represented in the circuit diagram by an equivalent circuit 51. The first electrode 8 is coupled to the terminal A and the second electrode 9 is coupled to a voltage bias source 52 which provides a constant bias voltage $V_{bias}$ to the second electrode 9. The voltage bias $V_{bias}$ may be a positive, negative or ground potential.

The second amplifier 57 includes a first operational amplifier $OP_1$ having at least an inverting input coupled to a first rail 58, a non-inverting input coupled to the voltage controlled source $V_d(f_d)$ via a path including a first resistor $R_{d1}$ and a second rail 59, and an output coupled to a third rail 60. The second amplifier 57 includes a second operational amplifier OP2 having at least an inverting input coupled to a fourth rail 61, a non-inverting input coupled to the second rail 59 via a path including a second resistor $R_{d2}$, and an output coupled to a fifth rail 62. The second amplifier includes a comparator CM1 having at least an inverting input coupled to the third rail 60, a non-inverting input coupled to the fifth rail 62, and an output providing the amplified signal 15. The second amplifier 57 also includes a third resistor $R_{i1}$, coupling the first rail 58 to the terminal A, a fourth resistor $R_{f1}$ coupling the first rail 58 to the third rail 60, a first capacitor $C_{f1}$ coupling the first rail 58 to the third rail 60, a fifth resistor $R_{f2}$ coupling the fourth rail 61 to the fifth rail 62, a second capacitor $C_{f2}$ coupling the fourth rail 61 to the fifth rail 62, and a sixth resistor $R_{i2}$ coupling the fourth rail 61 to ground via a path 63 including a third capacitor $C_{ref}$.

The first resistor $R_{d1}$ may have a resistance substantially equal to the second resistor $R_{d2}$. The fourth resistor $R_{f1}$ may have a resistance substantially equal to the fifth resistor $R_{f2}$. The first capacitor $C_{f1}$ may have a capacitance substantially equal to the second capacitor $C_{f2}$, and also approximately equal to a mutual capacitance $C_{sensor}$ between the first electrode 8 and the second electrode 9. The third capacitor $C_{ref}$ may have a capacitance approximately equal to a mutual capacitance $C_{sensor}$ between the first electrode 8 and the second electrode 9. A fourth capacitor $C_{d1}$ may be connected in parallel with the first resistor $R_{d1}$. A fifth capacitor $C_{d2}$ may be connected in parallel with the second resistor $R_{d2}$.

The second amplifier 57 operates in substantially the same way as the first amplifier 50, except that the second amplifier 57 is a differential amplifier which ideally provides an amplified signal 15 which has zero or negligible amplitude when there is no user interaction with the touch sensor 2.

Referring also to FIGS. 2 and 11, the second amplifier 57 may be used in the second apparatus in the same way as the first amplifier 50 by connecting the respective inputs of a pair of second amplifiers 57 to the first and third electrodes 8, 26 of the second touch sensor 21 via the terminals D and C respectively.

Figure 13:
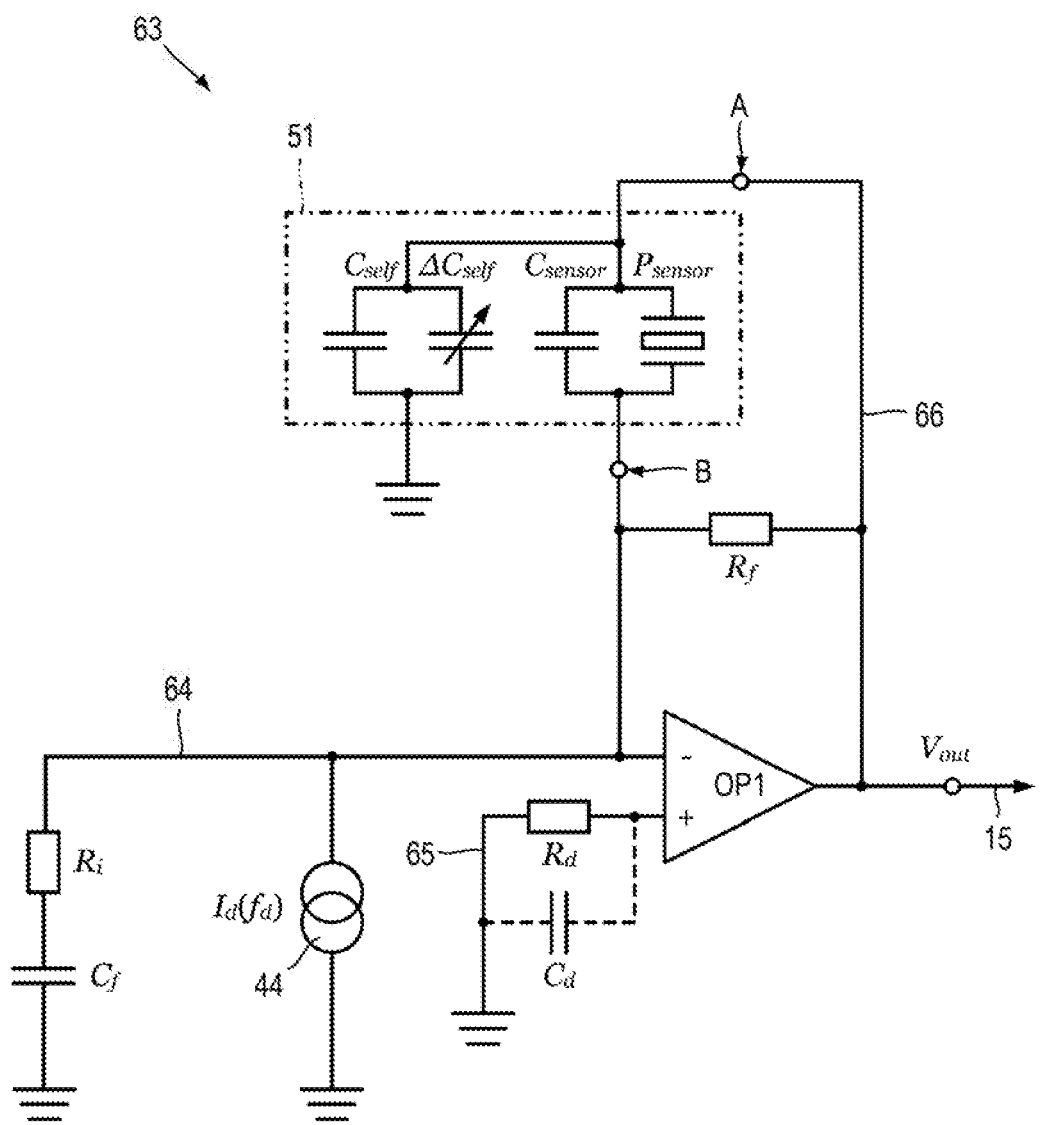
FIG. 13 is a schematic circuit diagram of a third amplifier included in the apparatus shown in FIG. 1.

Third Amplifier:

Referring also to FIG. 13, a third amplifier 63 for the first stage 12 of the front end module 3 will be explained in a case where the signal source 44 is a current controlled source $I_d(f_d)$ which supplies the periodic signal 43 to the front end module 3.

The first touch sensor 2 is represented in the circuit diagram by the equivalent circuit 51. The first electrode 8 is coupled to the terminal A and the second electrode 9 is coupled to the terminal B. Both the terminal A and terminal B are coupled to the third amplifier 63.

The third amplifier 63 includes an operational amplifier OP1 having at least an inverting input coupled to the current controlled source $I_d(f_d)$ via a first rail 63, a non-inverting input coupled to ground via a path 65 including a first resistor $R_d$, and an output coupled to a second rail 66. The third amplifier 63 also includes a second resistor $(R_f)$ coupling the first rail 64 to the second rail 66, and a third resistor $R_i$ coupling the first rail 64 to ground via a path including a first capacitor $C_f$. In the third amplifier 63, the second rail 66 provides the amplified signal 15.

The first rail 64 is coupled to the first electrode 8 via terminal A and the second rail 66 is coupled to the second electrode 9 via terminal B. Alternatively, the first rail 64 may be coupled to the second electrode 9 via terminal B and the second rail 66 may be coupled to the first electrode 8 via terminal A.

A second capacitor $C_d$ may be connected in parallel with the first resistor $R_d$. The first capacitor $C_f$ may have a capacitance substantially equal to a mutual capacitance $C_{sensor}$ between the first electrode 8 and the second electrode 9.

In many respects, for example the high and low frequency cut-offs $f_l, f_u$, the third amplifier 63 is configured similarly to the first and second amplifiers 50, 57. However, the feedback network of the third amplifier 63 differs from the first or second amplifiers 50, 57 because it includes the first touch sensor 2.

The second apparatus 20 may use front end modules 3a, 3b which have first stages 12 provided by the third amplifier 63. A third amplifier 63 included in the first front end module 3a may be connected across the terminals D and E instead of A and B, and a third amplifier 63 included in the second front end module 3b may be connected across the terminals C and E. Optionally, a third front end module (not shown) may be used which includes a third amplifier 63 connected across the terminals C and D. When more than one third amplifier 63 is used, each third amplifier 63 should be coupled to the output of a separate, synchronised current controlled source $I_d(f_d)$.

Figure 14:
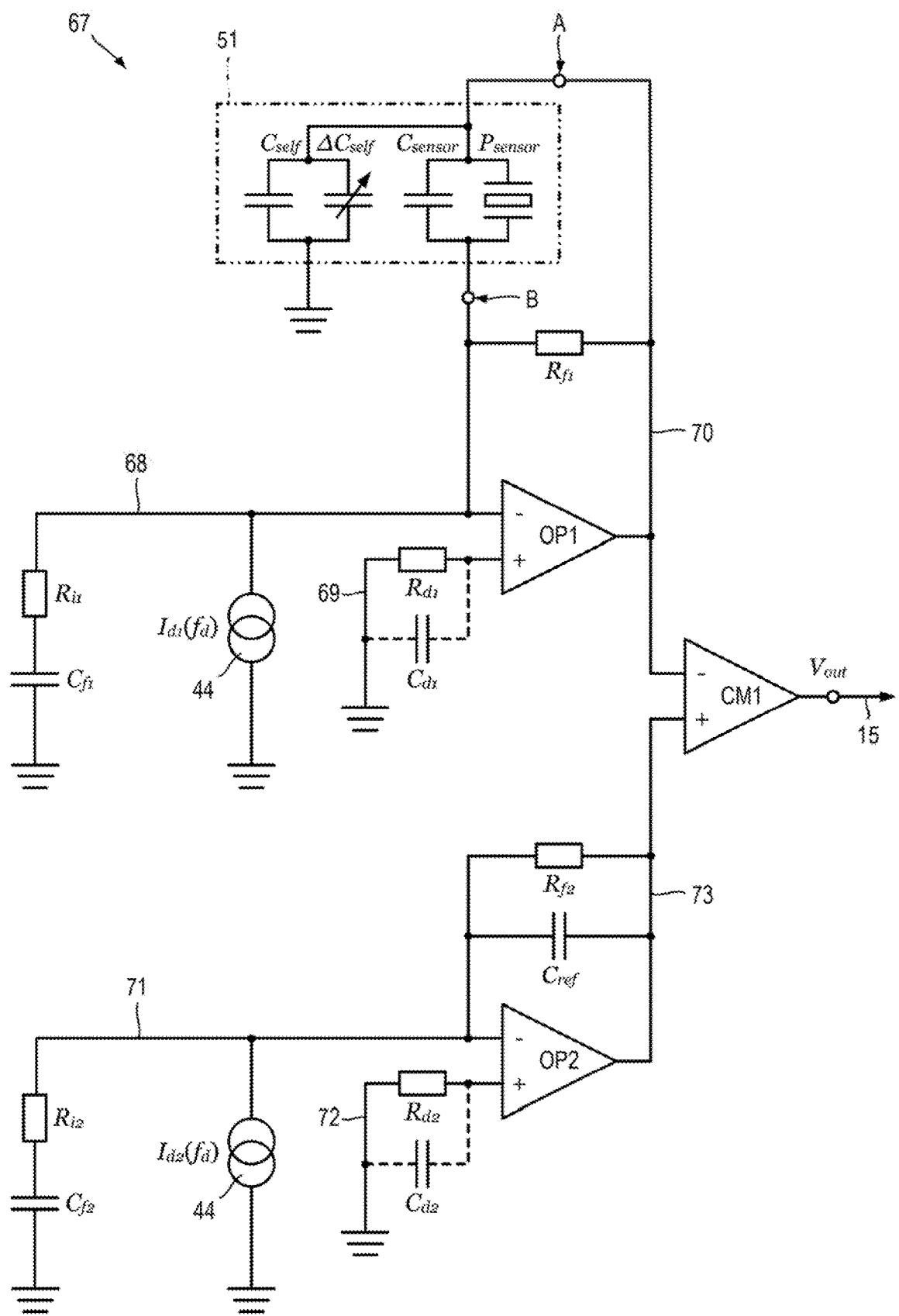
FIG. 14 is a schematic circuit diagram of a fourth amplifier included in the apparatus shown in FIG. 1.

Fourth Amplifier:

Referring also to FIG. 14, a fourth amplifier 67 for the first stage 12 of the front end module 3 will be explained in a case where the signal source 44 is a pair of synchronised current controlled sources $I_{d1}(f_d)$, $I_{d2}(f_d)$ which supply the periodic signal 43 to the front end module 3.

The first touch sensor 2 is represented in the circuit diagram by the equivalent circuit 51. The first electrode 8 is coupled to the terminal A and the second electrode 9 is coupled to the terminal B. Both terminal A and terminal B are coupled to the third amplifier 63.

The fourth amplifier 67 includes a first operational amplifier OP1 having at least an inverting input coupled to a first current controlled source $I_{d1}(f_d)$ via a first rail 68, a non-inverting input coupled to ground via a path 69 including a first resistor $R_{d1}$, and an output coupled to a second rail 70. The fourth amplifier 67 also includes a second operational amplifier OP2 having at least an inverting input coupled to a second current $I_{d2}(f_d)$ source by a third rail 71, a non-inverting input coupled to ground via a path 72 including a second resistor $R_{d2}$, and an output coupled to a fourth rail 73. The fourth amplifier 67 also includes a comparator CM1 having at least an inverting input coupled to the second rail 70, a non-inverting input coupled to the fourth rail 73, and an output providing the amplified signal 15. The fourth amplifier 67 also includes a third resistor $R_{f1}$ coupling the first rail 68 and the second rail 70, a fourth resistor $R_{i1}$ coupling the first rail 68 to ground via a path including a first capacitor $C_{f1}$, a fifth resistor $R_{i2}$ coupling the third rail 71 to ground via a path including a second capacitor $C_{f2}$, a sixth resistor $R_{f2}$ coupling the third rail 71 to the fourth rail 73, and a third capacitor $C_{ref}$ coupling the third rail 71 to the fourth rail 73. The first current controlled source $I_{d1}(f_d)$ is synchronised with the second current controlled source $I_{d2}(f_d)$.

The first rail 68 is coupled to the first electrode 8 via terminal A and the second rail 70 is coupled to the second electrode 9 via terminal B. Alternatively, the first rail 68 may be coupled to the second electrode 9 via terminal B and the second rail 70 may be coupled to the first electrode 8 via terminal A.

The first resistor $R_{d1}$ may have a resistance substantially equal to the second resistor $R_{d2}$. The third resistor $R_{f1}$ may have a resistance substantially equal to the sixth resistor $R_{f2}$. The first capacitor $C_{f1}$ may have a capacitance substantially equal to the second capacitor $C_{f2}$ and approximately equal to a mutual capacitance $C_{sensor}$ between the first electrode 8 and the second electrode 9. The third capacitor $C_{ref}$ may have a capacitance approximately equal to a mutual capacitance $C_{sensor}$ between the first electrode 8 and the second electrode 9. A fourth capacitor $C_{d1}$ may be connected in parallel with the first resistor $R_{d1}$. A fifth capacitor $C_{d2}$ may be connected in parallel with the second resistor $R_{d2}$.

The fourth amplifier 67 operates in substantially the same way as the third amplifier 63, except that the fourth amplifier 67 is a differential amplifier which ideally provides an amplified signal 15 which has zero or negligible amplitude when user does not touch and/or press the touch sensor 2.

The second apparatus 20 may use front end modules 3a, 3b which each have a first stage 12 provided by the fourth amplifier 67. A fourth amplifier 67 included in the first front end module 3a may be connected across the terminals D and E instead of A and B as shown in FIG. 14, and a fourth amplifier 67 included in the second front end module 3b may be connected across the terminals C and E. Optionally, a third front end module (not shown) may be used which includes a fourth amplifier 67 connected across the terminals C and D.

Figure 15:
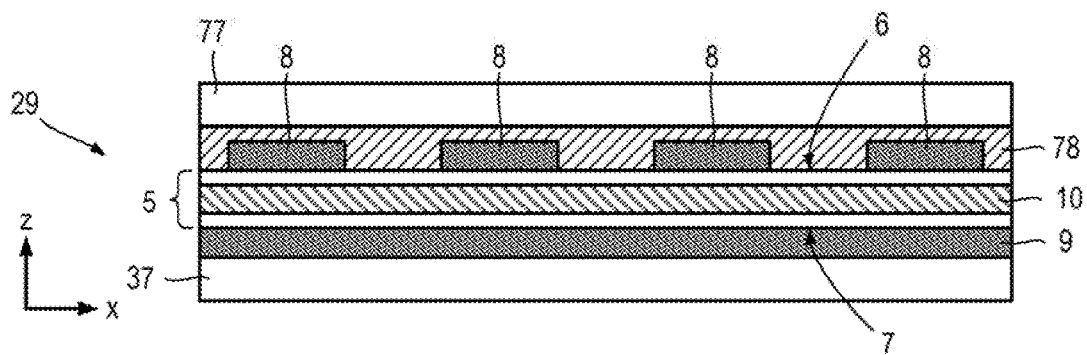
FIG. 15 is a cross-sectional view of a first touch panel for combined capacitive and pressure sensing.
Figure 16:
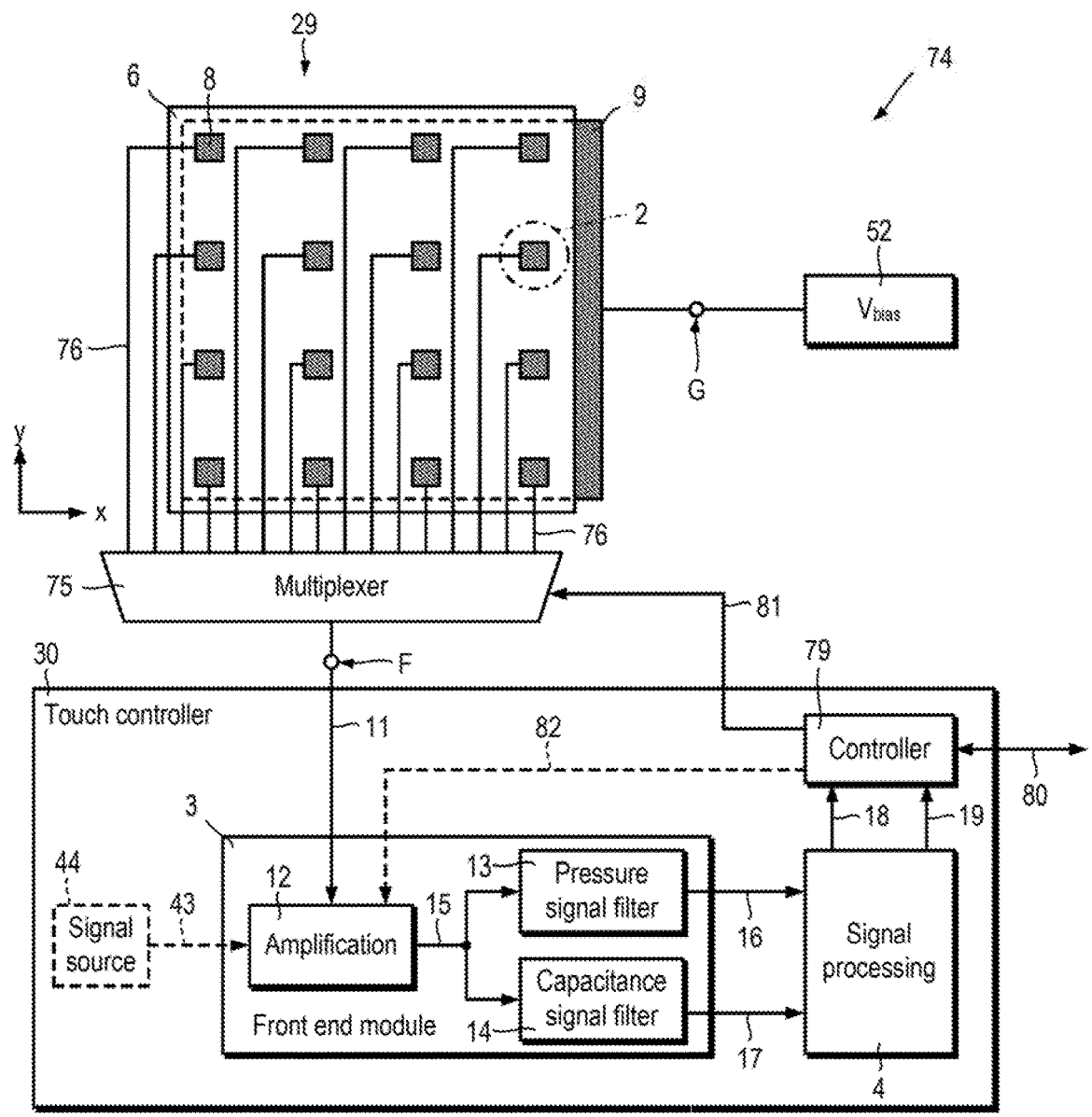
FIG. 16 schematically illustrates a third apparatus including the touch panel shown in FIG. 15.

Third Combined Capacitance and Pressure Sensing Apparatus and First Touch Panel:

Referring also to FIGS. 15 and 16, a third apparatus 74 including a first touch panel 29, a first touch controller 30 and a multiplexer 75 will be explained.

The multiplexer 75 has a plurality of inputs and one output, the output is coupled to a terminal F.

The first touch panel 29 includes a layer structure 5 which is generally the same as the layer structure of the first touch sensor 2, except that the layer structure 5 of the first touch panel 29 is shared between multiple first electrodes 8 disposed on the first face 6 in the form of pads of conductive material. The first electrodes 8 are disposed on the first face 6 in an array extending in the first and second directions x, y. Each first electrode 8 is coupled to a corresponding input of the multiplexer 75 by a respective conductive trace 76. The conductive traces 76 may be made of the same material as the first electrodes 8. Alternatively, the conductive traces 76 may be made of a material having a higher conductivity than the material used for the first electrodes 8. The conductive traces 76 are generally much thinner in the plane defined by the first and second directions x, y than the corresponding first electrodes 8. The second electrode 9 is disposed on the second face 9 and is extensive such that the second electrode at least partial underlies each first electrode 8. The second electrode 9 may be substantially coextensive with the second face 7. The second electrode is coupled to a terminal G.

In this way, each first electrode 8 effectively provides a first touch sensor 2 which may be individually addressed using the multiplexer 75 and the conductive traces 76.

The first touch panel 29 may be bonded overlying the display 37 of an electronic device 28. In this case, the materials of the first touch panel 29 should be substantially transparent as described hereinbefore. A cover lens 77 may be bonded overlying the first touch panel 29. The cover lens 77 is preferably glass but may be any transparent material. The cover lens 77 may be bonded to the touch panel 29 using a layer of PSA material 78. The layer of PSA material 78 may be substantially transparent. The array of first electrodes 8 and the corresponding conductive traces 76 may be fabricated using index matching techniques to minimise visibility to a user.

The first touch controller 30 includes a front end module 3, a signal processing module 4 and a controller 79. The controller 79 may communicate with the processor 32 of the electronic device 28 using a link 80. The touch controller 30 may include a signal source 44 providing the periodic signal 43 to the front end module 3

The front end module 3 is coupled to the output of the multiplexor 75 by the terminal F. In this way, the front end module 3 may receive an input signal 11 from any one of the first electrodes 8 which is addressed by the multiplexer 75. The front end module 3 may include a first stage 12 provided by any one of the first, second, third or fourth amplifiers 50, 57, 63, 67. Alternatively, the front end module 3 may include a first stage 12 using any circuit which provides an amplified signal 15 based on the input signal 11 and including a superposition of the integrated output voltage signal $V_{piezo}$(t) and the capacitance measurement voltage signal $V_{cap}$(t) as hereinbefore described.

In a case where the front end module 3 includes the first or second amplifiers 50, 57, the second electrode 9 may be coupled to a bias voltage source 52 via the terminal G. Alternatively, in a case when the front end module 3 includes the third or fourth amplifiers 63, 67, the second electrode 9 may be coupled to the front end module 3 via the terminal G.

The controller 79 may provide a control signal 81 to the multiplexer 75. The control signal 81 may cause the multiplexer 75 to address each input according to a sequence determined by the controller 79. In this way, the front end module 3 may receive an input signal 11 from each first electrode 8 according to a sequence determined by the controller 80. The sequence may be pre-defined, for example, the sequence may select each first electrode 8 once before repeating. The sequence may be dynamically determined, for example, when one or more user interactions are detected, the controller 79 may scan the subset of first electrodes 8 adjacent to each detected user interaction in order to provide faster and/or more accurate tracking of user touches. The sequence may be arranged so that the multiplexor 75 addresses each first electrode 8 during a quiet period or blanking period of the display 37. The sequence may be provided to the controller 79 by the processor 32 via the link 80. Alternatively, the processor may directly control the sequence via the link 80.

In this way, the front end module 3 may receive input signals 11 from each of the first electrodes 8 which are disposed in an array extending in the first and second directions. The signal processing module 4 provides respective pressure values 18 and capacitance values 19 to the controller. The controller 79 uses the received pressure values 18 and capacitance values 19 to calculate a position and an applied pressure for one or more user interactions with the touch panel 29. The controller 79 provides the positions and/or pressures of one or more user interactions to the processor 32 as input information via the link 80. Alternatively, the pressure values 18 and capacitance values 19 may be provided to the processor 32 via the link 80 and the processor 32 may calculate the positions and/or pressures of one or more user interactions. The controller 79 or the processor 32 are calibrated by applying known pressures to known locations so that the accuracy of calculated positions and/or pressures of one or more user interactions may be optimised and/or verified.

Figure 17:
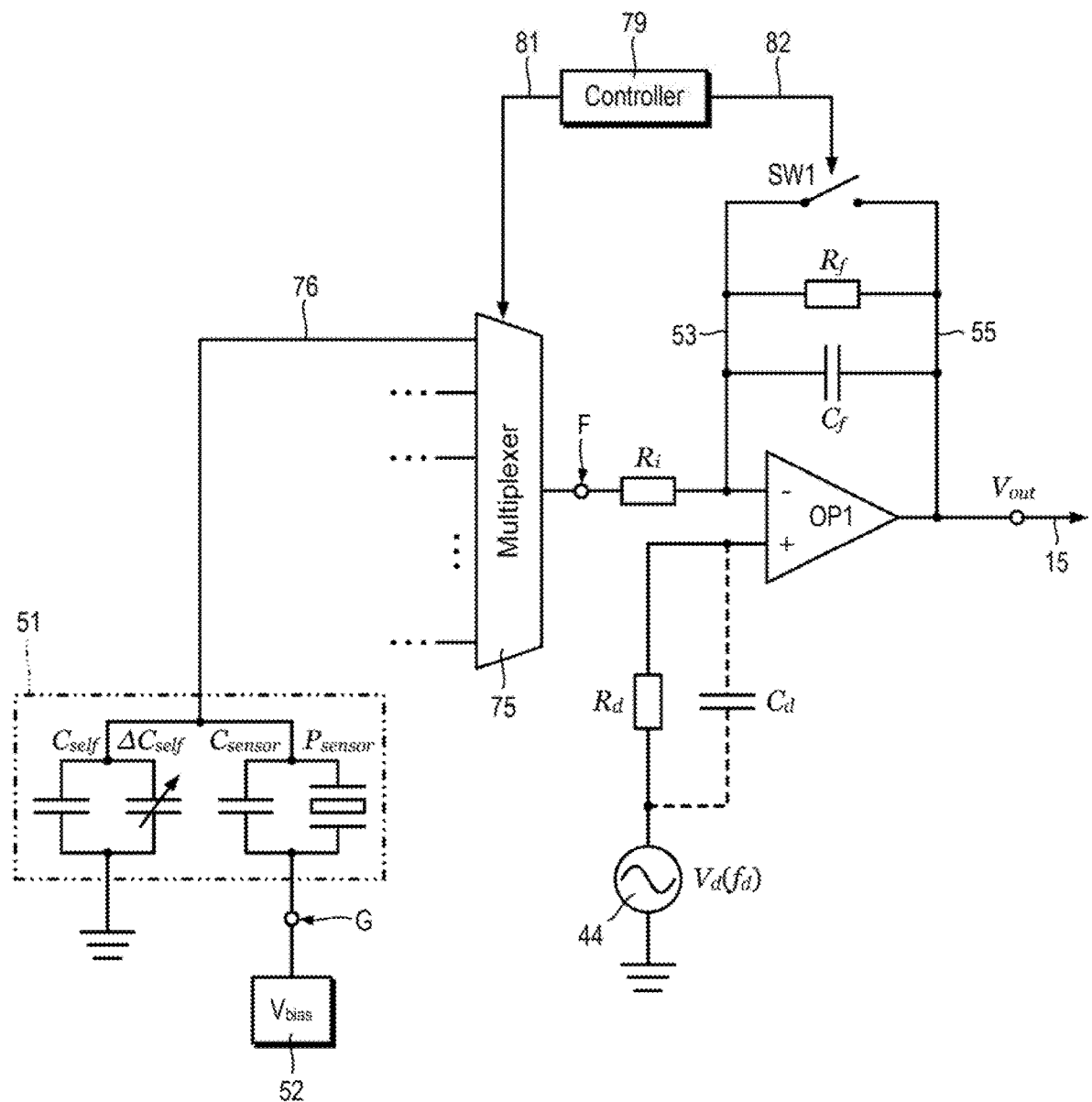
FIG. 17 is a schematic circuit diagram of the first amplifier shown in FIG. 10 included in the apparatus shown in FIG. 16.

Referring also to FIG. 17, a configuration of the first amplifier 50 included in the third apparatus 74 is shown.

The configuration of the first amplifier 50 included in the third apparatus 74 is substantially the same as the configuration of the first amplifier 50 included in the first apparatus 1, except that the first rail 53 is coupled to the output of the multiplexor 75 via the terminal F instead of being coupled to the terminal A, the voltage bias source 52 is coupled to the second electrode 9 via the terminal G instead of the terminal B, and that the first amplifier 50 further includes a switch SW1.

The switch SW1 is coupled between the first rail 53 and the second rail 55 of the first amplifier 50. When the switch SW1 is closed, the first capacitor $C_f$ of the first amplifier 50 is discharged. The opening and closing of the switch SW1 may be governed by a control signal 82 provided by the controller 79. In this way, after an input signal 11 has been received from one of the first electrodes 8, the first capacitor $C_f$ may be discharged in order to reset the feedback network of the first amplifier 50 before the multiplexer 75 addresses a different first electrode 8.

Figure 18:
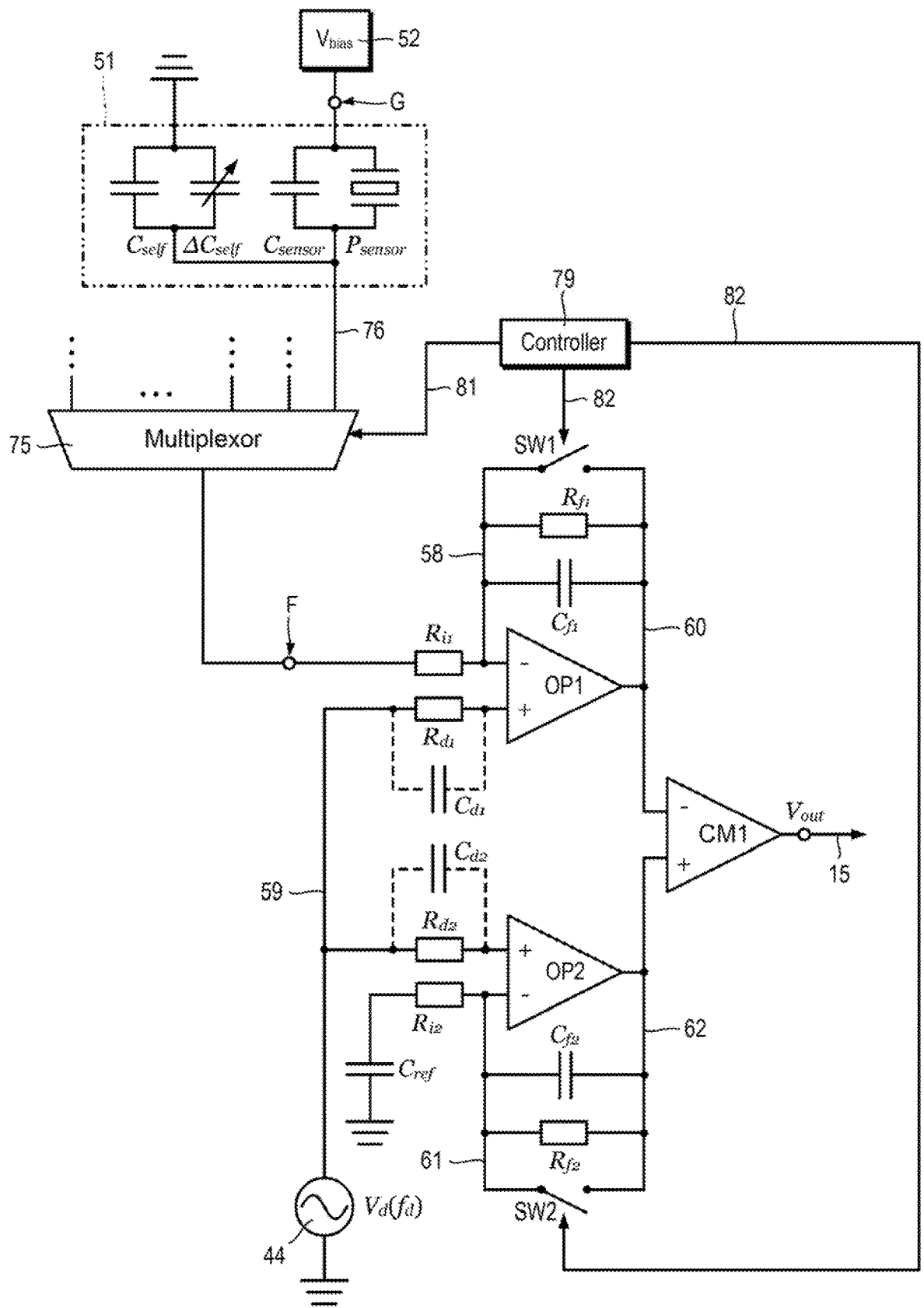
FIG. 18 is a schematic circuit diagram of the second amplifier shown in FIG. 12 included in the apparatus shown in FIG. 16.

Referring also to FIG. 18, a configuration of the second amplifier 57 included in the third apparatus 74 is shown.

The configuration of the second amplifier 57 included in the third apparatus 74 is substantially the same as the configuration of the first amplifier 50 included in the third apparatus 74, except that the second amplifier 57 is used instead of the first amplifier 50 and the second amplifier 57 further includes a first switch SW1 and a second switch SW2.

The first switch SW1 couples the first rail 58 to the third rail 60 of the second amplifier 57 and the second switch SW2 couples the fourth rail 61 to the fifth rail 62. When the switch SW1 is closed, the first capacitor $C_{f1}$ of the second amplifier 57 is discharged. When the switch SW2 is closed, the second capacitor $C_{f2}$ of the second amplifier 57 is discharged. The opening and closing of the switches SW1, SW2 may be governed by control signals 82 provided by the controller 79. In this way, after an input signal 11 has been received from one of the first electrodes 8, the capacitors $C_{f1}$, $C_{f2}$ may be discharged so as to reset the feedback network of the second amplifier 57 before the multiplexer 75 addresses a different first electrode 8.

Alternatively, the third apparatus 74 may include the third amplifier 63. In such a case, the first rail 64 of the third amplifier 63 may be coupled to the output of the multiplexor 75 via terminal F and the second rail 66 of the third amplifier 63 may be coupled to the second electrode 9 via terminal G.

Alternatively, the first rail 64 of the third amplifier 63 may be coupled to the second electrode 9 via terminal G and the second rail 66 of the third amplifier 63 may be coupled to output of the multiplexor 75 via terminal F.

Alternatively, the third apparatus 74 may include the fourth amplifier 67. In such a case, the first rail 68 of the fourth amplifier 67 may be coupled to the output of the multiplexor 75 via terminal F and the second rail 70 of the fourth amplifier 67 may be coupled to the second electrode 9 via terminal G. Alternatively, the first rail 68 of the fourth amplifier 67 may be coupled to the second electrode 9 via terminal G and the second rail 70 of the fourth amplifier 67 may be coupled to the multiplexor 75 via terminal F.

When a user interacts with the first touch panel 29 proximate to a given first electrodes 8, the resulting change in capacitance of the respective touch sensor 2 formed by the given first electrode 8, the local region of the layer structure 5 and the local region of the second electrode 9, is mostly due to a change in the self-capacitance of the first electrode 8. This is because the magnitude of the mutual capacitance $C_{sensor}$ between the first electrode 8 and the second electrode 9 may be large such that a change in the mutual capacitance is relatively small. The value of the mutual capacitance $C_{sensor}$ between the first electrode 8 and the second electrode 9 may be reduced if required by using a patterned second electrode 9. Using a patterned second electrode 9 may allow the second electrode 9 to be disposed between a user's digit/stylus and the first and/or third electrodes 8, 26 without screening electrostatic interactions between the user's digit/stylus and the first and/or third electrodes 8, 26.

Figure 19:
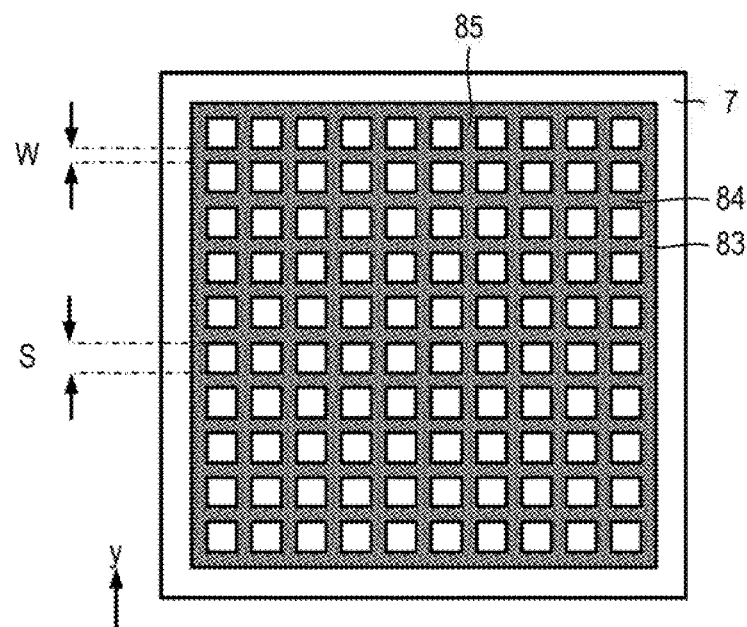
FIG. 19 is a plan view of a patterned electrode for the touch panel shown FIG. 15.

Referring also to FIG. 19, a patterned second electrode 83 is in the form of a Cartesian grid. The conductive region of the patterned second electrode 83 includes struts 84 extending in the first direction x and having a width W in the second direction y, and struts 85 extending in the second direction y and having a width W in the first direction x. The struts 84 extending in the first direction x are evenly spaced in the second direction y with a spacing S, and the struts 85 extending in the second direction y are evenly spaced in the first direction x with the same spacing S. The struts 84, 85 are joined where they intersect such that the patterned second electrode 83 is formed of a single region of conductive material.

The patterned second electrode 83 may be arranged such that the magnitude of the mutual capacitance $C_{sensor}$ between the first electrode 8 and the second electrode 9 is reduced. This may increase the relative size of changes in the mutual capacitance $\Delta C_{sensor}$ between the first electrode 8 and the second electrode 9 resulting from a user's touch, making such changes $\Delta C_{sensor}$ easier to detect.

Figure 20:
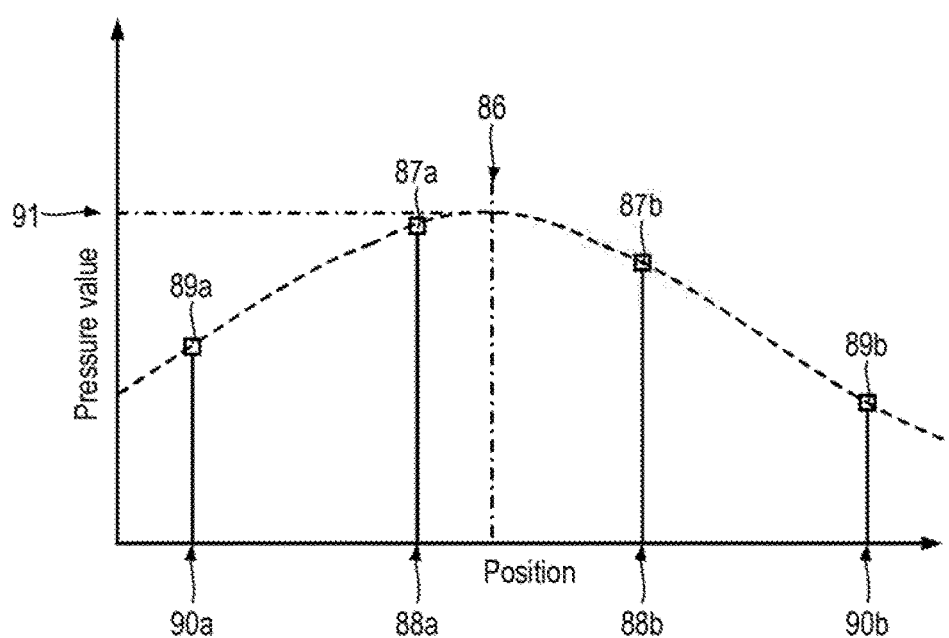
FIG. 20 illustrates using interpolation based on measured pressure values to estimate a location and a pressure of a user interaction with a touch panel.

Referring also to FIG. 20, using pressure values to infer a location and/or pressure of a user interaction occurring between two first electrodes 8 will be explained.

The separation between adjacent electrodes in a projected capacitance touch panel, sometimes referred to as the pitch, may be relatively coarse, for example, 1 to 5 mm or larger than 5 mm. If the positions of user interactions were determined only at the pitch length, projected capacitance touchscreens would not be able to provide accurate positions of user interactions or to smoothly follow a path traced by a user. To provide more accurate locations, projected capacitance touchscreens employ interpolation, for example, using an electrode having a peak signal and also the adjacent electrode signals, in order to infer a touch location using linear interpolation, quadratic interpolation or interpolation using higher order polynomials or other suitable functions.

Such interpolation is possible because a user interaction may alter the capacitances of several adjacent electrodes simultaneously.

Similarly, when a user presses on the cover lens 77, the layer of piezoelectric material 10 underlying the cover lens 77 will experience strain across a broader area because of the rigidity of the cover lens 77. For example, a user interaction at a precise location 86 may result in pressure values 87a and 87b being calculated for first electrodes 8 at locations 88a, 88b which bracket the precise location 86. A user interaction at a precise location 86 may also result in pressure values 89a and 89b being calculated for first electrodes 8 at locations 90a, 90b adjacent to the pair of bracketing locations 88a, 88b.

The controller 79 or the processor 32 may calculate an estimate of the precise location 86 and/or a precise pressure value 91 using the largest value 87a and the corresponding location 88a in combination with the two next nearest values 87b, 89a and the corresponding locations 88b, 90a. Alternatively, the controller 79 or the processor 32 may calculate an estimate of the precise location 86 and/or a precise pressure value 91 using the pair of bracketing values 87a, 87b and locations 88a, 88b. The controller 79 or the processor 32 may calculate an estimate of the precise location 86 and/or a precise pressure value 91 using the pair of bracketing values 87a, 87b and locations 88a, 88b and the adjacent values and locations 89a, 89n, 90a, 90b. The controller 79 or the processor 32 may calculate an estimate of the precise location 86 and/or a precise pressure value 91 using linear interpolation, quadratic interpolation or interpolation using higher order polynomials or other suitable functions.

The third apparatus 73 may operate using interpolation of capacitance values 19 and/or pressure values 18 to determine locations and pressures of one or more user interactions.

Figure 21:
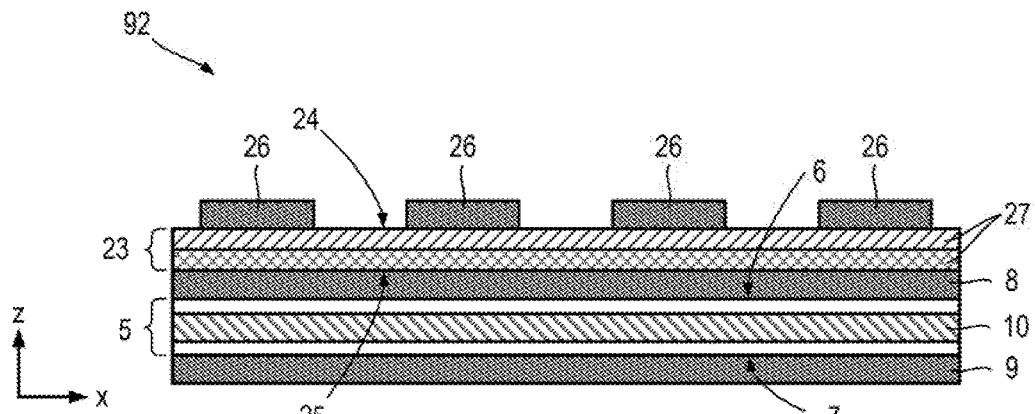
FIG. 21 is a cross-sectional view of a second touch panel for combined capacitive and pressure sensing.
Figure 22:
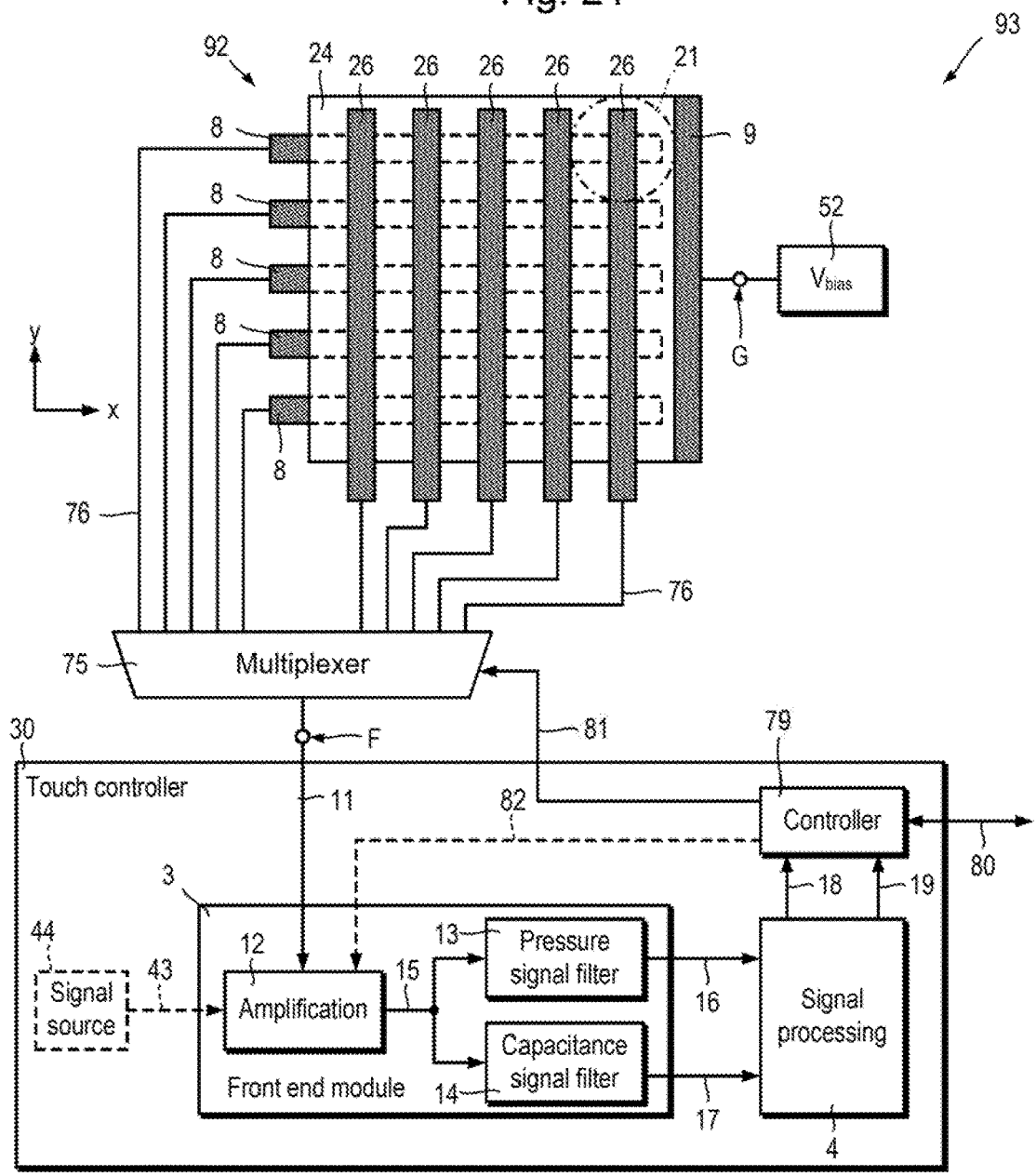
FIG. 22 schematically illustrates a fourth apparatus including the touch panel shown in FIG. 21.

Fourth Combined Capacitance and Pressure Sensing Apparatus and Second Touch Panel:

Referring also to FIGS. 21 and 22, a fourth apparatus 93 including a second touch panel 92, a first touch controller 30 and a multiplexer 75 will be explained.

The fourth apparatus 93 is substantially the same as the third apparatus 74, except that the fourth apparatus 93 includes a second touch panel 92 instead of the touch panel 29.

The second touch panel 92 includes a layer structure 5 which is generally the same as the layer structure 5 of the second touch sensor 21, except that in the touch panel 92, the layer structure 5 is shared by multiple first electrodes 8 disposed on the first face 6 of the layer structure 5, and the second layer structure 23 is shared by multiple third electrodes 26 disposed on the third face 24 of the second layer structure 23. The first electrodes 8 each extend in the first direction x and the first electrodes 8 are disposed in an array evenly spaced in the second direction y. The third electrodes 26 each extend in the second direction y and the third electrodes 26 are disposed in an array evenly spaced in the first direction x. Each first electrode 8 and each third electrode 26 is coupled to a corresponding input of the multiplexer 75 by a respective conductive trace 76. The second electrode 9 is disposed on the second face 9 and is extensive such that the second electrode at least partially underlies each first electrode 8 and each third electrode 26. The second electrode 9 may be substantially coextensive with the second face 7. The second electrode is coupled to a terminal G.

In this way, the area around each intersection of a first electrode 8 with a third electrode 26 effectively provides a second touch sensor 21 and each of the first and third 8, 26 electrodes may be individually addressed using the multiplexer 75 and the conductive traces 76.

The second touch panel 92 may be bonded overlying the display 37 of an electronic device 28 and a cover lens 77 may be bonded overlying the second touch panel 92 in the same way as for the touch panel 29.

The controller 79 may provide a control signal 81 to the multiplexer 75 in the same way as for the third apparatus 74. However, in the fourth apparatus 93, the control signal 81 may cause the multiplexer 75 to address each input according to a different sequence to the third apparatus 74. For example, the control signal 81 may cause the multiplexer 75 to address a given first electrode 8, and to subsequently address each third electrode 26 intersecting the given first electrode 8 before addressing a further first electrode 8 and repeating the scan through the third electrodes 26. The control signal 81 may cause the multiplexer to dynamically address first and third electrodes 8, 26 proximate to first and third electrodes 8, 26 at which a user touch was previously detected.

In this way, a raster scan of the first and third electrodes 8, 26 may be performed which allows the first touch controller 30 to determine the positions and/or pressures of one or more user interactions.

In the similar way to the third apparatus 74, the changes in capacitance values 19 generated in the fourth apparatus in response to user interactions may be predominantly due to changes in self-capacitance of the addressed first or second electrode 8, 26. However, if a given pair of first and third electrodes 8, 26 are addressed sequentially and without excessive delay, a change in the mutual capacitance between the given pair of first and third electrodes 8, 26 may additionally be determined.

Although the first electrode 8 and the third electrode 26 have been shown as being substantially rectangular, other shapes can be used.

Figure 23:
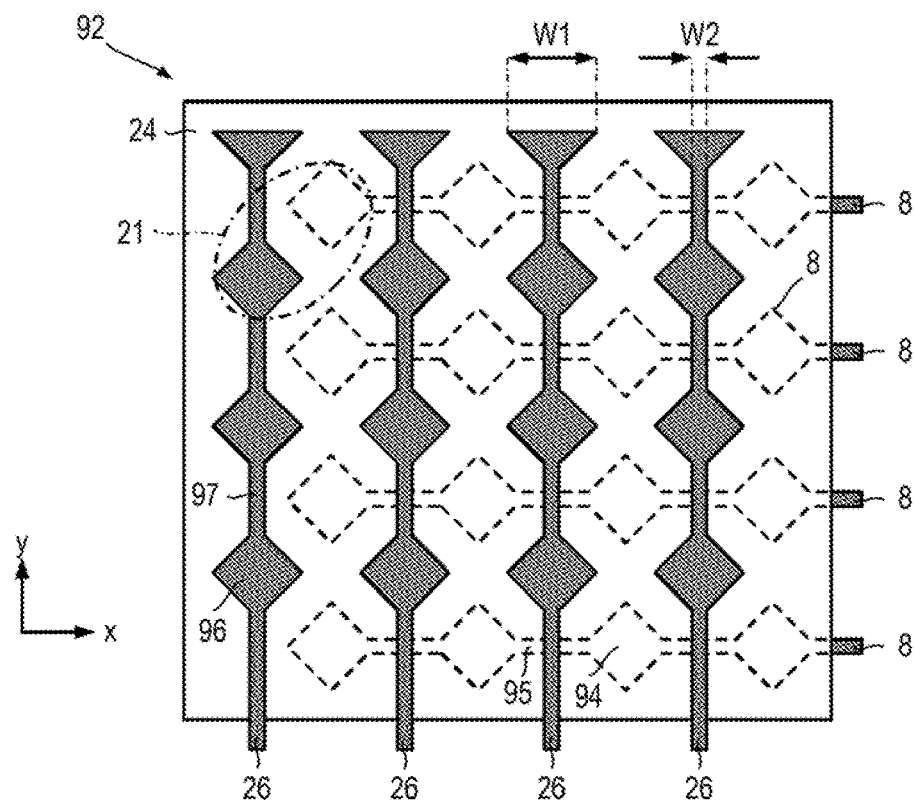
FIG. 23 is a plan view of an arrangement of electrodes for the touch panel for combined capacitive and pressure sensing shown in FIG. 21.
Figure 24:
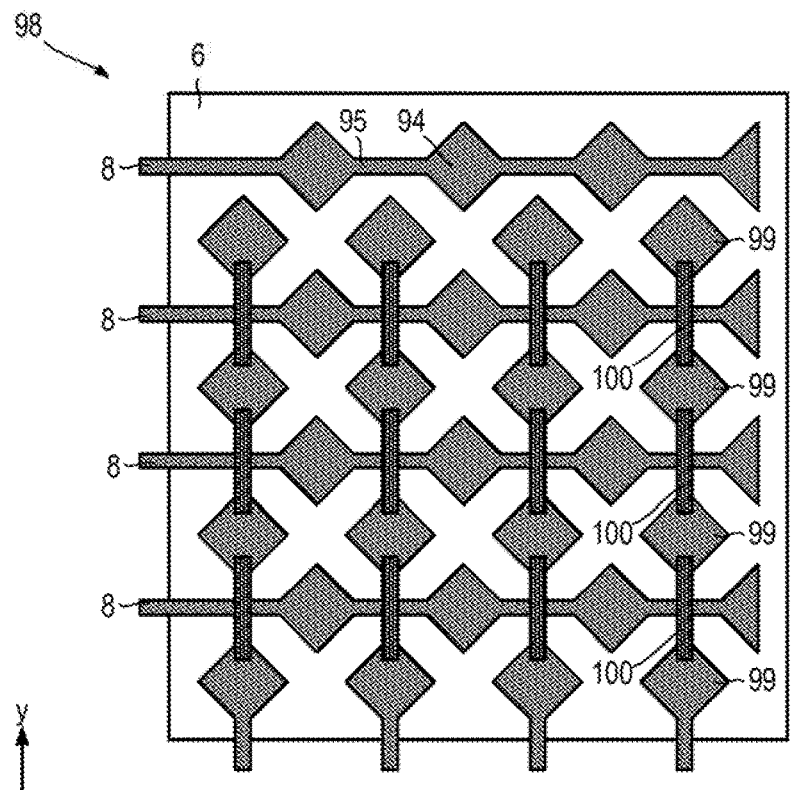
FIG. 24 is a plan view of an arrangement of electrodes for a third touch panel for combined capacitive and pressure sensing.

Referring also to FIG. 23, an alternative arrangement of the first and third electrodes 8, 26 is shown. Instead of being rectangular, each first electrode 8 may include several pad segments 94 evenly spaced in the first direction x and connected to one another in the first direction x by relatively narrow bridging segments 95. Similarly each third electrode 26 may comprise several pad segments 96 evenly spaced in the second direction y and connected to one another in the second direction y by relatively narrow bridging segments 97. The pad segments 94 of the first electrodes 8 are diamonds having a first width W3 in the second direction 7 and the bridging segments 95 of the first electrodes 8 have a second width W2 in the second direction y. The pad segments 96 and bridging segments 97 of the third electrodes 26 have the same respective shapes and widths W1, W2 as the first electrodes 8.

The first electrodes 8 and the third electrodes 26 are arranged such that the bridging segments 97 of the third electrodes 26 overlie the bridging segments 95 of the first electrodes 8. Alternatively, the first electrodes 8 and the third electrodes 26 may be arranged such that the pad segments 96 of the third electrodes 26 overlie the pad segments 94 of the first electrodes 8. The pad segments 94, 96 need not be diamond shaped, and may instead be circular. The pad segments 94, 96 may be a regular polygon such as a triangle, square, pentagon or hexagon. The pad segments 94, 96 may be I shaped or Z shaped.

Third Touch Panel:

Referring also FIG. 24, a third touch panel 98 may be included in the fourth apparatus 93 instead of the second touch panel 92.

The third touch panel 98 is substantially the same as the second touch panel 92 except that the third touch panel 98 does not include the second layer structure 23 and the third electrodes 26 are disposed on the first face 6 of the layer structure 5 in addition to the first electrodes 8. Each first electrode 8 is a continuous conductive region extending in the first direction x in the same way as the second touch panel 92, for example, each first electrode 8 may include several pad segments 94 evenly spaced in the first direction x and connected to one another in the first direction x by relatively narrow bridging segments 95. Each third electrode 26 may comprise several pad segments 99 evenly spaced in the second direction y in the same way as the second touch panel 92. However, unlike the second touch panel 92, the pad segments 99 of the third touch panel are disposed on the first face 6 of the layer structure 5 and are interspersed with, and separated by, the first electrodes 8. The pad segments 99 corresponding to each third electrode 26 are connected together by conductive jumpers 100. The jumpers 100 each span a part of a first electrode 8 and the jumpers 100 are insulated from the first electrodes 8 by a thin layer of dielectric material (not shown) which may be localised to the area around the intersection of the jumper too and the first electrode 8.

Alternatively, a dielectric layer (not shown) may overlie the first face 6 of the layer structure 5 and the first and third electrode 8, 26. Conductive traces (not shown) extending in the second direction y may be disposed over the dielectric layer (not shown), each conductive trace (not shown) overlying the pad segments 99 making up one third electrode 26. The overlying conductive traces (not shown) may connect the pad segments 99 making up each third electrode 26 using vias (not shown) formed through the dielectric layer (not shown).

Figure 25:
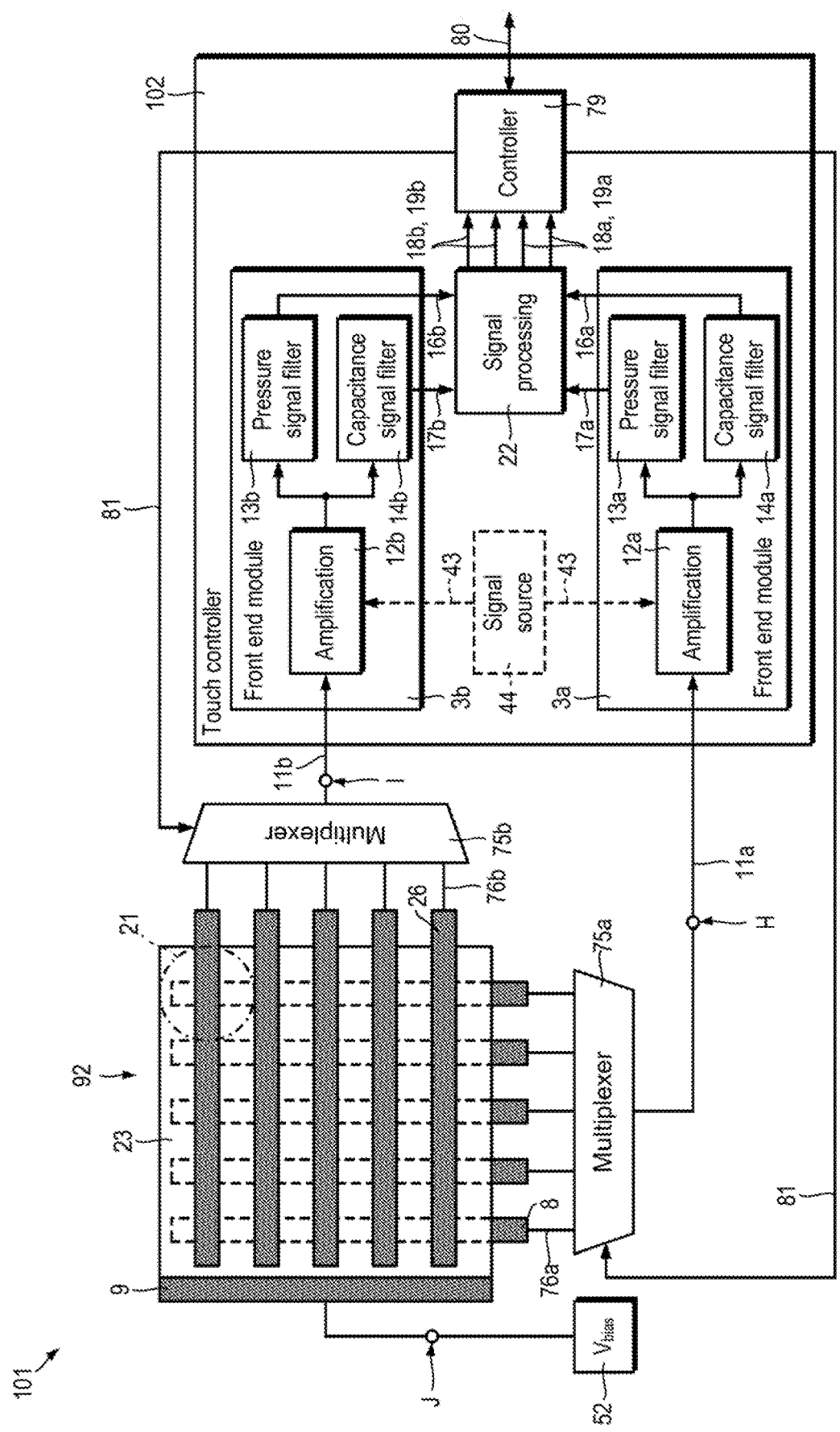
FIG. 25 schematically illustrates a fifth apparatus including the touch panel shown in FIG. 21.

Fifth Combined Capacitance and Pressure Sensing Apparatus:

Referring also to FIG. 25, a fifth apparatus 93 including a second touch panel 92, a second touch controller 102 and first and second multiplexers 75a, 75b will be explained.

The first multiplexer 75a has a plurality of inputs and an output coupled to the terminal H. The second multiplexer 75b has a plurality of inputs and an output coupled to the terminal I.

The second touch panel 92 of the fifth apparatus 101 is the same as the second touch panel 92 of the fourth apparatus 93, except that each of the first electrodes 8 is coupled to a corresponding input of the first multiplexor 75a by a respective first conductive trace 76a, each of the third electrodes 26 is coupled to a corresponding input of the second multiplexer 75b by a respective second conductive trace 76b, and the second electrode 9 is coupled to a terminal J.

The second touch controller 102 includes the first and second front end modules 3a, 3b, the second signal processing module 22 and the controller 79. Each of the first and second front end modules 3a, 3b is substantially the same as the front end module 3 of the third and fourth apparatuses 74, 93. The second signal processing module 22 is substantially the same as the second signal processing module 22 of the second apparatus 20. The controller 79 is substantially the same as the controller 79 of the third or fourth apparatuses 74, 93, except that the control signals 81 may cause the first and second multiplexers 75a, 75b to address each given pair of first and third electrodes 8, 26 according to a sequence determined by the controller 79 or communicated to the controller 79 from the processor 32 by the link 80. The sequence may be a predetermined sequence or a dynamically determined sequence.

In this way, each intersection of the first and third electrodes 8, 26 effectively provides a second touch sensor 21 which may be individually addressed by the first and second multiplexers 75a, 75b. When a particular intersection is addressed by the first and second multiplexers 75a, 75b, a first input signal 11a from the respective first electrode 8 is received by the first front end module 3a and a second input signal 11b from the respective third electrode 26 is concurrently received by the second front end module.

Alternatively, the fifth apparatus 101 may use the third touch panel 98 instead of the second touch panel 92.

In addition to changes in the self-capacitances of given first and third electrode 8, 26 addressed by the multiplexers 75a, 75b, the respective capacitance values 19a, 19b also include a change in the mutual capacitance between the addressed pair of first and third electrodes 8, 26.

Figure 26:
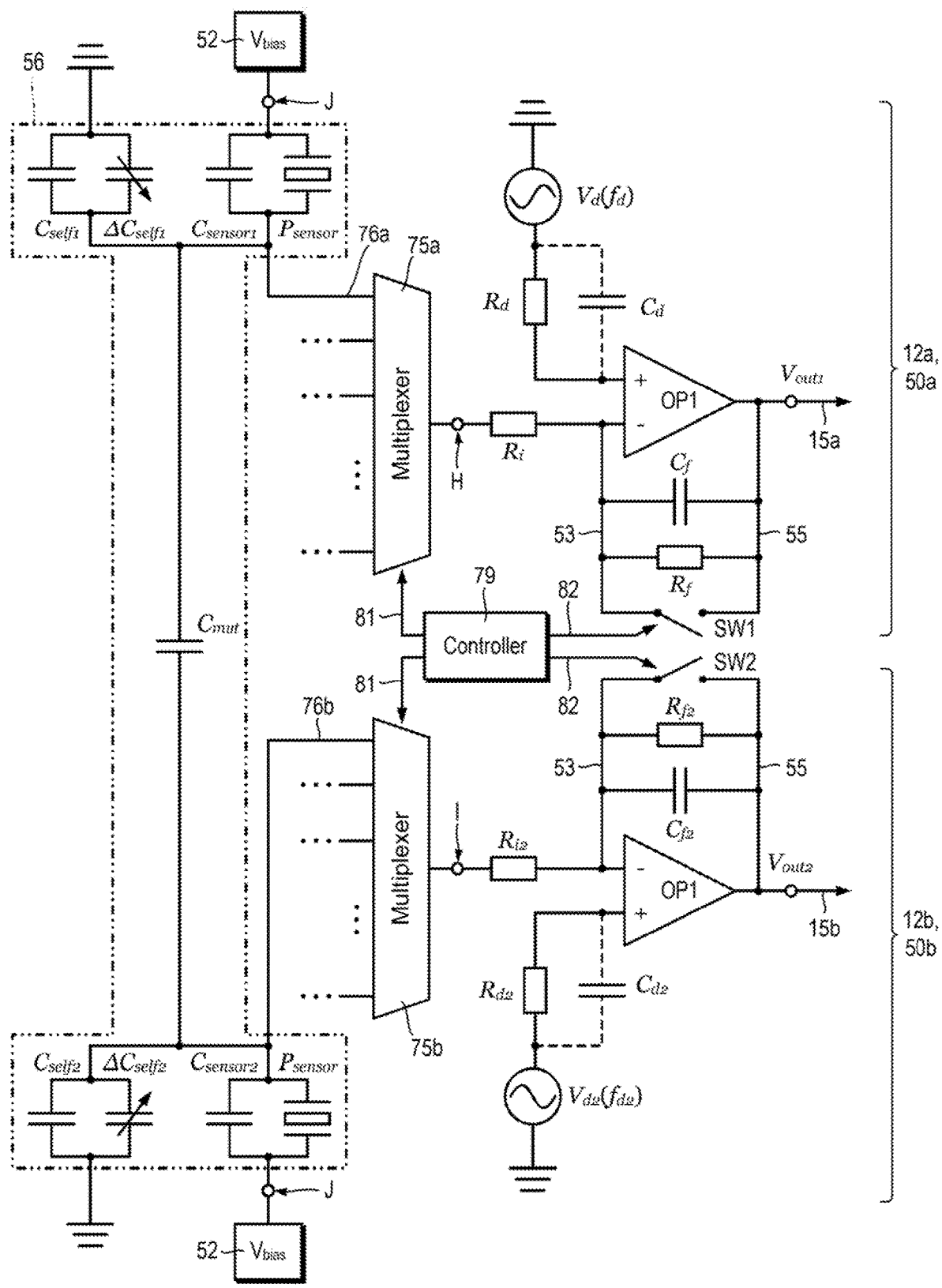
FIG. 26 is a schematic circuit diagram of the first amplifier shown in FIG. 10 included in the apparatus shown in FIG. 25.

Referring also to FIG. 26, a configuration using first amplifier 50 to provide the first stages 12a, 12b of the first and second front end modules 3a, 3b will be explained.

A configuration of the fifth apparatus 101 including the first amplifier 50 is substantially the same as the configuration of the third or fourth apparatuses 74, 93 including the first amplifier 50, except that a pair of multiplexers 75a, 75b, a pair of front end modules 3a, 3b and a pair of first amplifiers 50a, 50b are used, and in that the first amplifiers 50a, 50b further include a first switch SW1 and a second switch SW2.

The pair of first amplifiers 50a, 50b provide the first stages 12a, 12b of the first and second front end modules 3a, 3b respectively. The first rail 53 of the first amplifier 50a which is included in the first front end module 3a is coupled via the terminal H to the output of the first multiplexer 75a. The first rail 53 of the first amplifier 50b which is included in the second front end module 3b is coupled via the terminal I to the output of the second multiplexer 75b. The second electrode 9 of the second or third touch panels 92, 98 is coupled via terminal J to the voltage bias source 52. The same voltage controlled source $V_d(f_d)$ may be coupled to both front end modules 3a, 3b in parallel.

The pair first amplifiers 50a, 50b include a first switch SW1 and a second switch SW2. The first switch SW1 couples the first rail 53 to the second rail 55 of the first amplifier 50s included in the first front end module 3a. The second switch SW2 couples the first rail 53 to the second rail 55 of the first amplifier 50b included in the second front end module 3b. When the switch SW1 is closed, the first capacitor $C_f$ of the first amplifier 50a is discharged. When the switch SW2 is closed, the first capacitor $C_f$ of the first amplifier 50b is discharged. The opening and closing of the switches SW1, SW2 may be governed by control signals 82 provided by the controller 79. In this way, after the first front end module 3a has received an input signal 11 from one of the first electrodes 8 and the second front end module 3b has received an input signal 11 from one of the third electrodes 26, the capacitors $C_f$ of the first amplifiers 50a, 50b may be discharged so as to reset the respective feedback networks before the multiplexers 75a, 75b connect a different pairing of first and third electrodes 8, 26.

Thus, each first amplifier 50a, 50b provides a corresponding amplified signal 15a, 15b depending upon first and second input signals 11a, 11b received from the first and third electrodes 8, 26 addressed by the respective first and second multiplexers 75a, 75b. One difference to the third or fourth apparatuses 74, 93 is that the equivalent circuit 56 of each second touch sensor 21 provided by an addressed pair of first and second electrodes 8, 26 additionally includes a mutual capacitance $C_{mut}$ between the selected first electrode 8 and the selected third electrode 26.

Alternatively, the fifth apparatus 102 may be configured using first and second front end modules 3a, 3b including respective second amplifiers 57. In such a case, the first rail 58 of the second amplifier 57 included in the first front end module 3a may be coupled to the output of the first multiplexer 75a via the terminal H, the first rail 58 of the second amplifier 57 included in the second front end module 3b may be coupled to the output of the second multiplexer 75b via the terminal I, and the second electrode 9 of the second or third touch panels 92, 98 may be coupled via terminal J to a voltage bias source 52.

Alternatively, the fifth apparatus 102 may be configured using first and second front end modules 3a, 3b including respective third amplifiers 63. In such a case, the first rail 64 of the third amplifier 63 included in the first front end module 3a may be coupled to the terminal H and the corresponding second rail 66 may be coupled to the terminal J, and the first rail 64 of the third amplifier 63 included in the second front end module 3b may be coupled to the terminal I and the corresponding second rail 66 may be coupled to the terminal J. Alternatively, the first rail 64 of the third amplifier 63 included in the first front end module 3a may be coupled to the terminal J and the corresponding second rail 66 may be coupled to the terminal H, and the first rail 64 of the third amplifier 63 included in the second front end module 3b may be coupled to the terminal J and the corresponding second rail 66 may be coupled to the terminal I.

Figure 27:
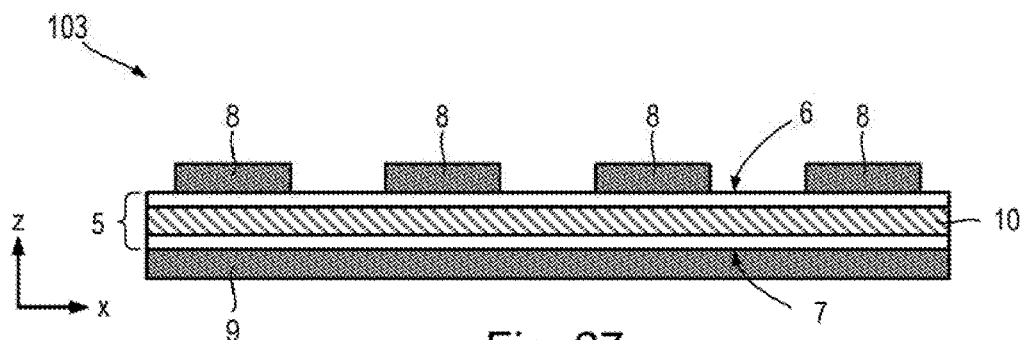
FIG. 27 is a cross-sectional view of a fourth touch panel for combined capacitive and pressure sensing.
Figure 28:
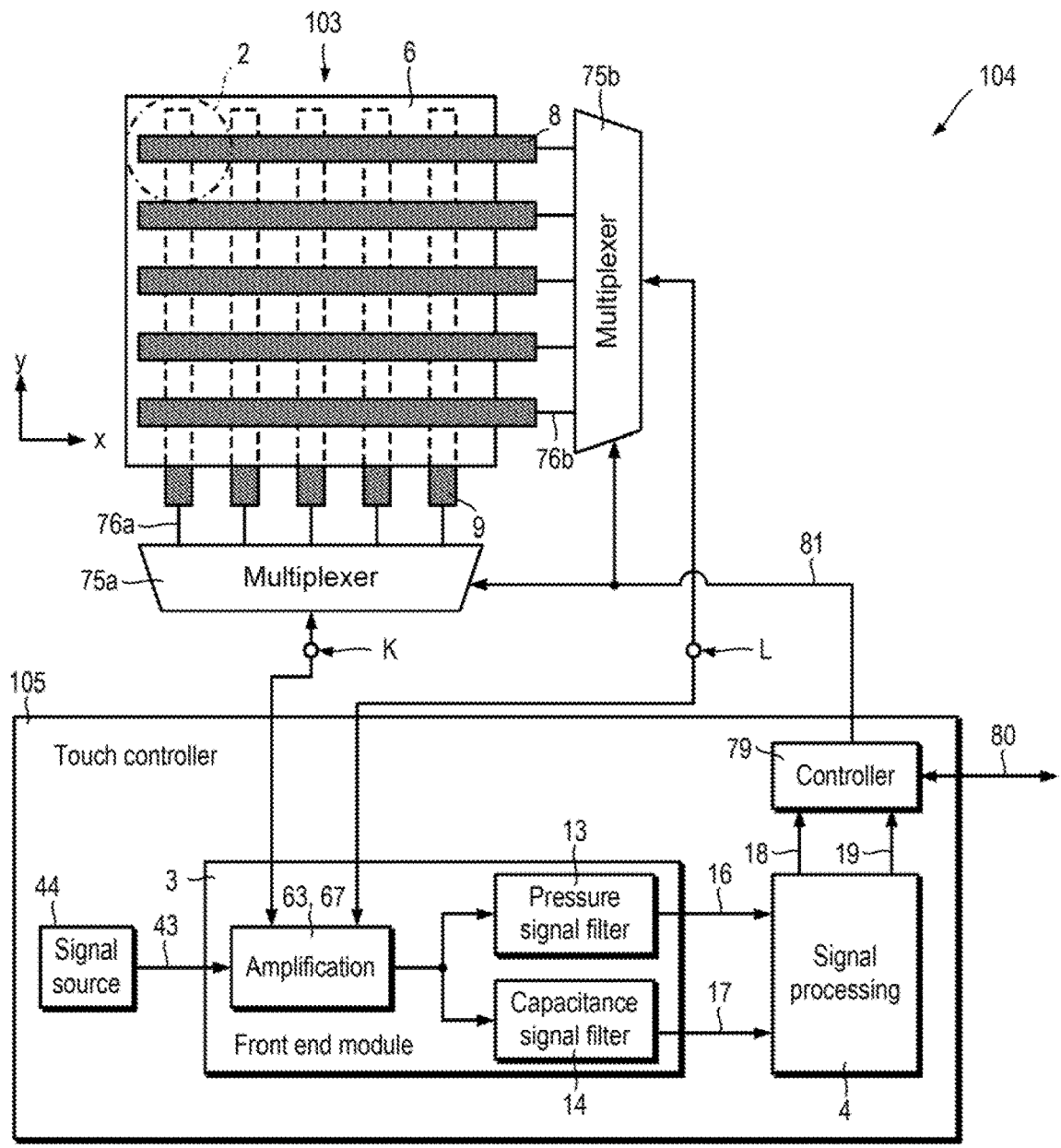
FIG. 28 schematically illustrates a sixth apparatus including the touch panel shown in FIG. 27.

Alternatively, the fifth apparatus 102 may be configured using first and second front end modules 3a, 3b including respective fourth amplifiers 67. In such a case, the first rail 68 of the fourth amplifier 67 included in the first front end module 3a may be coupled to the terminal H and the corresponding second rail 70 may be coupled to the terminal J, and the first rail 68 of the fourth amplifier 67 included in the second front end module 3b may be coupled to the terminal I and the corresponding second rail 70 may be coupled to the terminal J. Alternatively, the first rail 68 of the fourth amplifier 67 included in the first front end module 3a may be coupled to the terminal J and the corresponding second rail 70 may be coupled to the terminal H, and the first rail 68 of the fourth amplifier 67 included in the second front end module 3b may be coupled to the terminal J and the corresponding second rail 70 may be coupled to the terminal I Sixth Combined Capacitance and Pressure Sensing Apparatus and Fourth Touch Panel:

Referring also to FIGS. 27 and 28, a sixth apparatus 104 including a fourth touch panel 103, a third touch controller 105 and first and second multiplexers 75a, 75b will be explained.

The sixth apparatus 104 includes first and second multiplexers 75a, 75b, a fourth touch panel 103 and a third touch controller 105. In many respects the sixth apparatus 104 is substantially similar or analogous to the third to fifth apparatuses 74, 93, 101, and only the differences of the sixth apparatus 104 shall be explained.

The first and second multiplexers 75a, 75b each include a plurality of inputs and an output. The output of the first multiplexer 75a is coupled to a terminal K and the output of the second multiplexer 75b is coupled to a terminal L.

The fourth touch panel 103 includes a layer structure 5 which is generally the same as the layer structure 5 of the first touch sensor 1, except that in the fourth touch panel 103, the layer structure 5 is common to many first electrodes 8 disposed on the first face 6 of the layer structure 5 and many second electrodes 9 disposed on the second face 7 of the layer structure 5. The first electrodes 8 each extend in the first direction x and the first electrodes 8 are disposed in an array evenly spaced in the second direction y. The second electrodes 9 each extend in the second direction y and the second electrodes 9 are disposed in an array evenly spaced in the first direction x. Each second electrode 9 is coupled to a corresponding input of the first multiplexer 75a by a respective conductive trace 76a, and each first electrode 8 is coupled to a corresponding input of the second multiplexer 75b by a respective conductive trace 76b. In this way, the area around each intersection of a first electrode 8 with a second electrode 9 effectively provides a first touch sensor 2 and each of the first and second 8, 9 electrodes may be individually addressed using the first and second multiplexers 75a, 75b and the conductive traces 76a, 76b.

The fourth touch panel 103 may be bonded overlying the display 37 of an electronic device 28 and a cover lens 77 may be bonded overlying the fourth touch panel 103 in the same way as for the touch panel 29, the second touch panel 92 or the third touch panel 98.

The third touch controller 105 includes a front end module 3, a signal source 44, a signal processing module 4 and a controller 79 which are the same as hereinbefore described, except that the first stage 12 of the front end module 3 uses the third amplifier 63 of the fourth amplifier 67 and the signal source 44 is one or more synchronised current controlled sources $I_d(f_d)$. In this case, the front end module 3 is connected across the terminals K and L.

The controller 79 may provide a control signal 81 to the first and second multiplexers 75a, 75b in the same way as for the fifth apparatus 110. In this way, each intersection of the first and third electrodes 8, 26 effectively provides a first touch sensor 2 which may be individually addressed by the first and second multiplexers 75a, 75b.

In addition to changes in the self-capacitances of given first and second electrodes 8, 9 addressed by the multiplexers 75a, 75b, the capacitance values 19 also include a change in the mutual capacitance between the addressed pair of first and second electrodes 8, 9.

Although the first electrode 8 and the third electrode 26 have been shown as being substantially rectangular, other shapes can be used. For example, the first and second electrodes 8, 9 of the fourth touch panel 103 may have shapes and configurations substantially similar to the first and third electrodes 8, 26 of the second touch panel 92.

Figure 29:
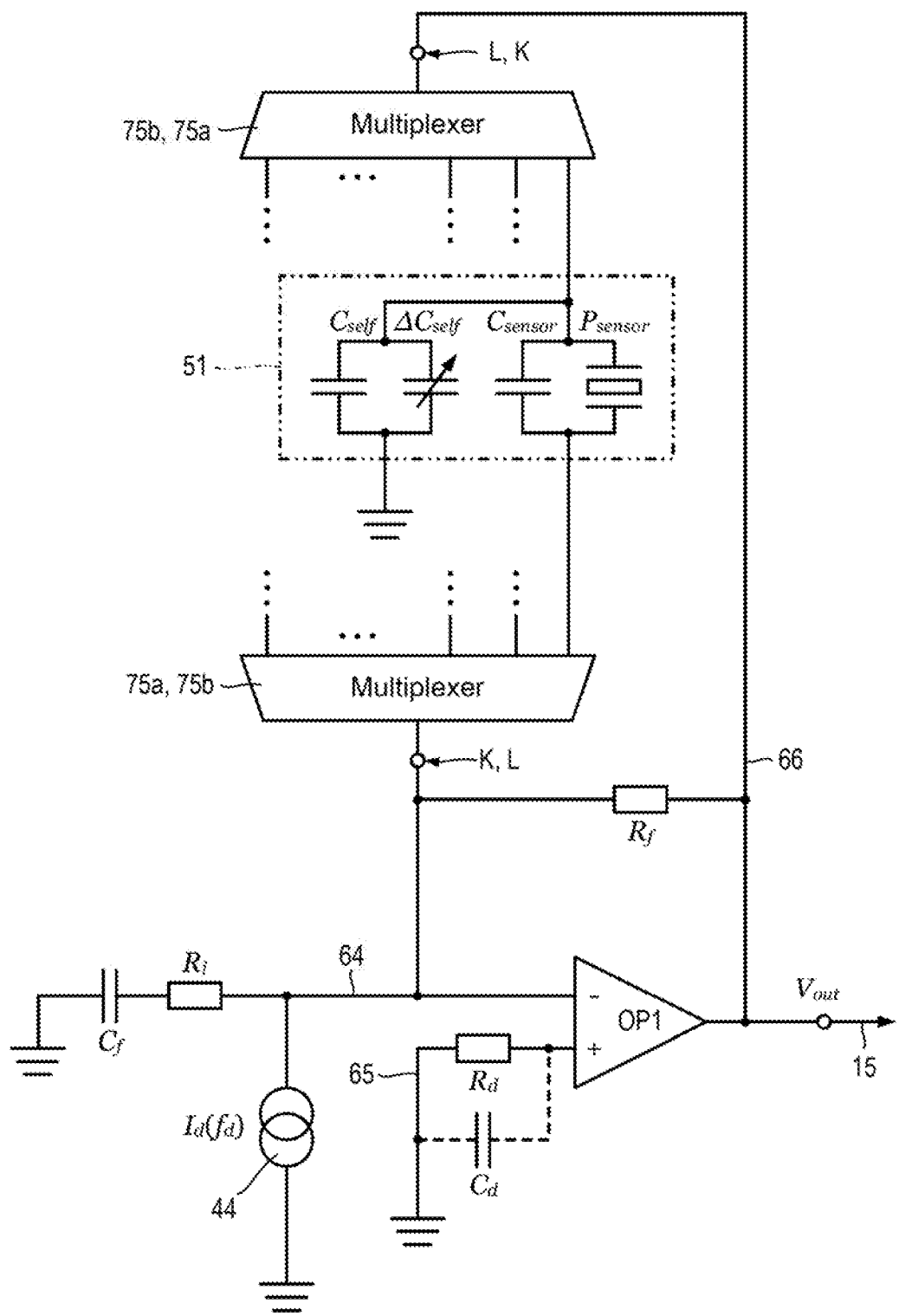
FIG. 29 is a schematic circuit diagram of the third amplifier shown in FIG. 13 included in the apparatus shown in FIG. 28.

Referring also to FIG. 29, a configuration of the third amplifier 63 included in the sixth apparatus 104 will be explained.

The first rail 64 of the third amplifier 63 may be coupled to the terminal K and the second rail 66 may be coupled to the terminal L Alternatively, first rail 64 of the third amplifier 63 may be coupled to the terminal L and the second rail 66 may be coupled to the terminal K.

Alternatively, the fourth amplifier 67 may be included in the sixth apparatus 104. In such a case, the first rail 68 of the fourth amplifier 67 may be coupled to the terminal K and the second rail 70 may be coupled to the terminal L. Alternatively, first rail 68 of the fourth amplifier 67 may be coupled to the terminal L and the second rail 70 may be coupled to the terminal K.

Figure 30A:
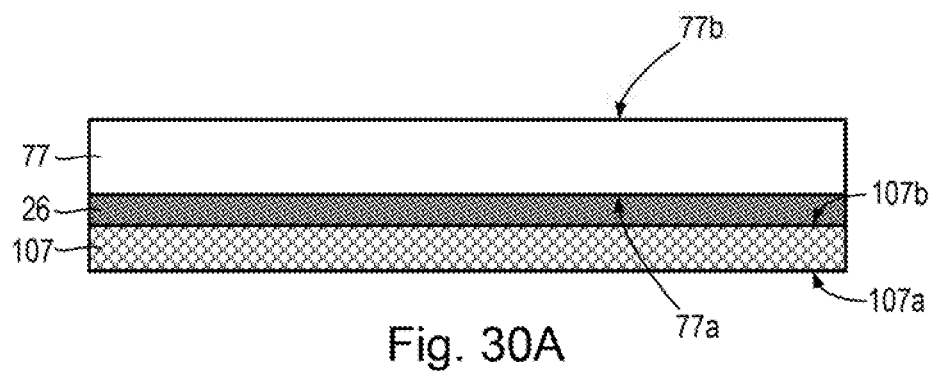
FIGS. 30A to 30C illustrate a first display stack-up at different stages during fabrication.
Figure 30B:
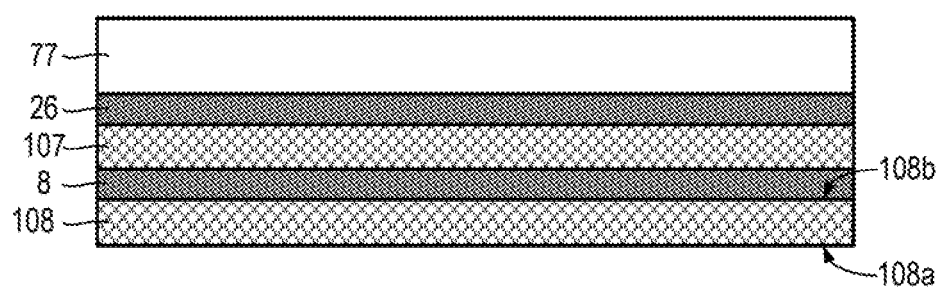
Figure 30C:
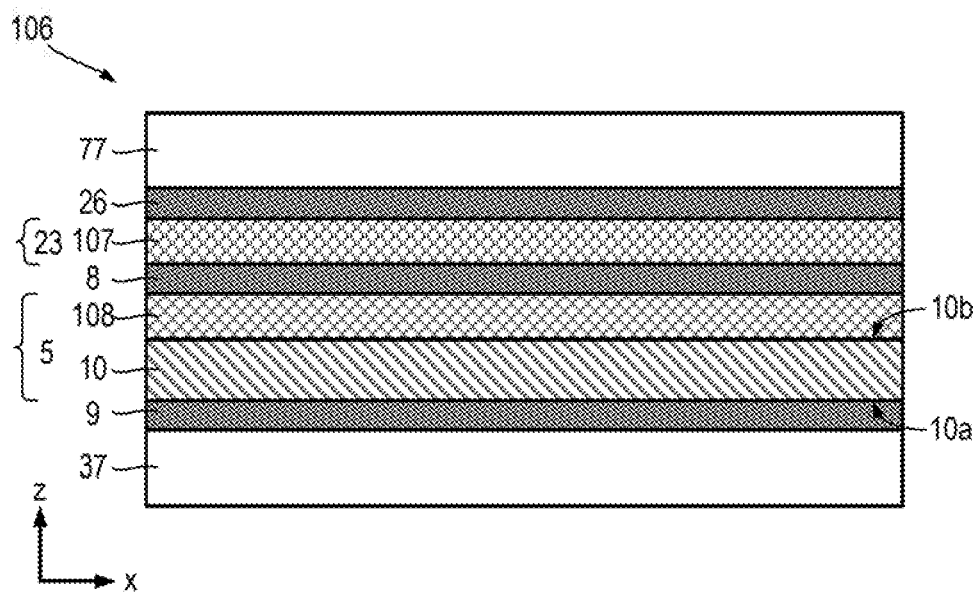

First Display Stack Up:

Referring also to FIGS. 30A to 30C, a first display stack-up 106 and a method of fabricating the first display stack 106 up will be explained.

Referring in particular to FIG. 30A, the cover lens 77 is a transparent substrate extending in the first x and second y directions and having first 77a and second 77b opposite faces. A first dielectric layer 107 extends in the first x and second y directions and has first 107a and second 107b opposite faces. Third electrodes 26 in the form of a set of conductive regions extending in the first direction x and spaced apart in the second direction y are disposed on the second face 107b of the first dielectric layer 107. The second face 107b of the first dielectric layer 107 is bonded to the first face 77a of the cover lens 77.

Referring in particular to FIG. 30B, a second dielectric layer 108 extends in the first x and second y directions and has first 108a and second 108b opposite faces. First electrodes 8 in the form of a set of conductive regions extending in the second direction y and spaced apart in the first direction x are disposed on the second face 108b of the second dielectric layer 108. The second face 108b of the second dielectric layer 108 is bonded to the first face 107a of the first dielectric layer 107.

Referring in particular to FIG. 30C, a layer of piezoelectric material 10 extends in the first x and second y directions and has first 10a and second 10b opposite faces. A second electrode 9 in the form of a conductive material region is disposed on the first face 10a of the layer of piezoelectric material 10 such that, when assembled, the second electrode 9 at least partially overlaps each first electrode 8 and each third electrode 26 region. The second face 10b of the layer of piezoelectric material 10 is bonded to the first face 108a of the second dielectric layer 108.

The first display stack-up 106 may be bonded overlying the display 37 of an electronic device 28. The elements of the first display stack-up 106 are stacked in the thickness direction z from the display 37 to the cover lens 77. The layer structure 5 includes the second dielectric layer 108 and the layer of piezoelectric material 10 and the second layer structure 23 includes the first dielectric layer 108.

The cover lens 77 is made of glass, or PET or any other substantially transparent material. The cover lens 7 may be up to about 20 mm thick and may be at least 0.05 mm thick. Preferably, the cover lens 77 is up to about 2 mm thick and may be at least 0.05 mm thick. The layer of piezoelectric material 10 is made of PVDF or any other substantially transparent piezoelectric material. The layer of piezoelectric material 10 may be poled before assembling the first stack-up 106. Alternatively, the layer of piezoelectric material may be poled after assembling the first stack-up 106. The layer of piezoelectric material may be up to about 110 μm thick, and may be at least 0.5 μm or at least 1 μm thick. The second electrode 9 and the first electrodes 8 and/or third electrodes 26 may be used to produce a poling field. The dielectric layers 107, 108 may be PET or any other substantially transparent polymer. The dielectric layers 107, 108 may be between 10 μm and 100 μm thick, for example, around 20 to 25 μm thick. Preferably the dielectric layers 107, 108 are in the range of about 10-100 μm thick. The conductive regions providing the electrodes 8, 9, 26 may be ITO, IZO or any other substantially transparent conductive material. The conductive regions providing the electrodes 8, 9, 26 may be applied to the dielectric layers 107, 108 and/or the layer of piezoelectric material 10 using lithography, printing or other suitable methods. The shapes of the conductive regions providing the first, second and third electrodes 8, 9 26 may be any suitable electrode shape described in relation to one of the third to sixth apparatuses 74, 93, 101, 104. The sheet resistance of conductive regions providing electrodes may be between 1 and 200 Ω/sq. The sheet resistance may be below 10 Ω/sq. Preferably the sheet resistance is as low as is practical.

The assembly of the first display stack-up 106 has been described in a certain sequence. However, the elements of the first display stack-up may be bonded together in any other sequence resulting in the same ordering of layers 107, 108, 10. In particular, the first and second dielectric layers 107, 108 and the layer of piezoelectric material 10 may be bonded together using continuous roll-to-roll production methods before being bonded to the cover lens 77. When the cover lens 77 is a flexible material, the first display stack-up 106 may be fabricated entirely using continuous roll-to-roll processes.

The first display stack-up 106 does not require complex patterning of the layer of piezoelectric material 10 or of electrodes disposed on the layer of piezoelectric material 10. This allows fabrication of the first display stack-up to avoid complex multi-stage and/or duplex patterning of electrodes. As a result, fabrication of the first display stack-up 106 may be fast, efficient and cheap.

Figure 31A:
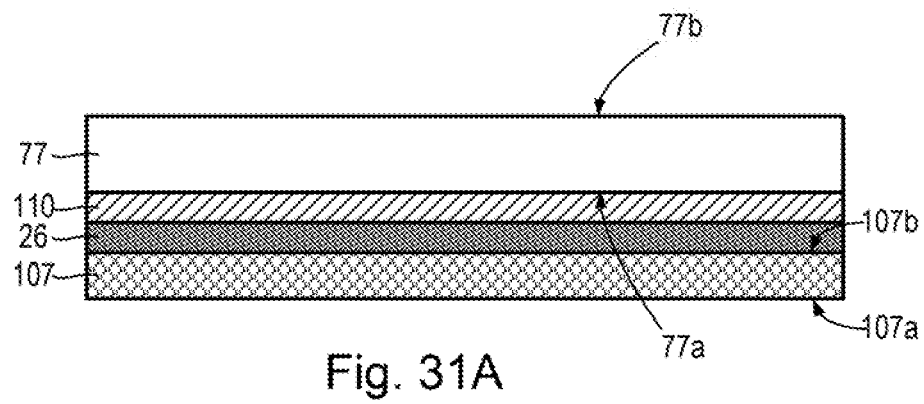
FIGS. 31A to 31C illustrate a second display stack-up at different stages during fabrication.
Figure 31B:
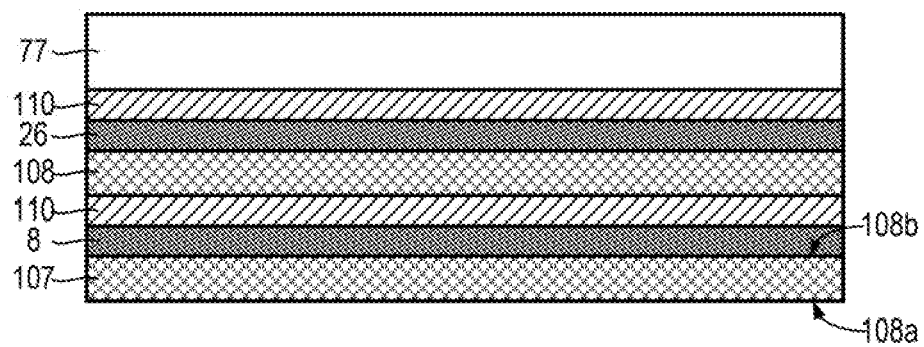
Figure 31C:
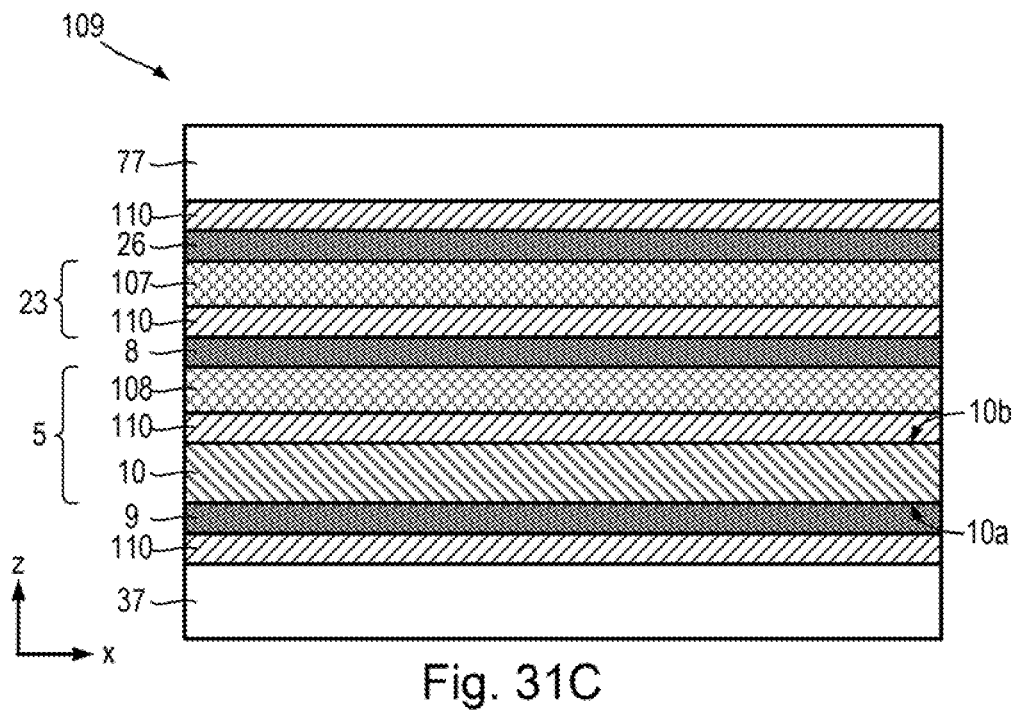

Second Display Stack Up:

Referring also to FIGS. 31A to 31C, a second display stack-up 109 and a method of fabricating the second display stack-up log will be explained.

The second display stack-up 109 is the same as the first display stack-up 109, except that elements of the second display stack-up 109 are bonded to one another using layers of pressure sensitive adhesive (PSA) material 110 extending in the first x and second y directions. For example, the cover lens 77 and the first dielectric layer 107 are arranged so that the first face 77a of the cover lens 77 is opposite to and separated from the second face 107b of the first dielectric layer 107. Pressure applied in the thickness direction z to bond the cover lens 77 and the first dielectric layer 107 together. Layers of PSA material 110 are used in the same way to bond the first and second dielectric layers 107, 108, to bond the second dielectric layer 108 to the layer of piezoelectric material 10 and to bond the second stack-up 109 overlying the display 37. Layers of PSA material 100 may be between 10 and 50 μm thick. Preferably, the layers of PSA material 110 are 25 μm thick.

The elements of the second display stack-up 109 are stacked in the thickness direction z from the display 37 to the cover lens 77. The layer structure 5 includes the second dielectric layer 108, the layer of piezoelectric material 10 and a layer of PSA material 110. The second layer structure 23 includes the first dielectric layer 107 and a layer of PSA material 110.

Figure 32A:
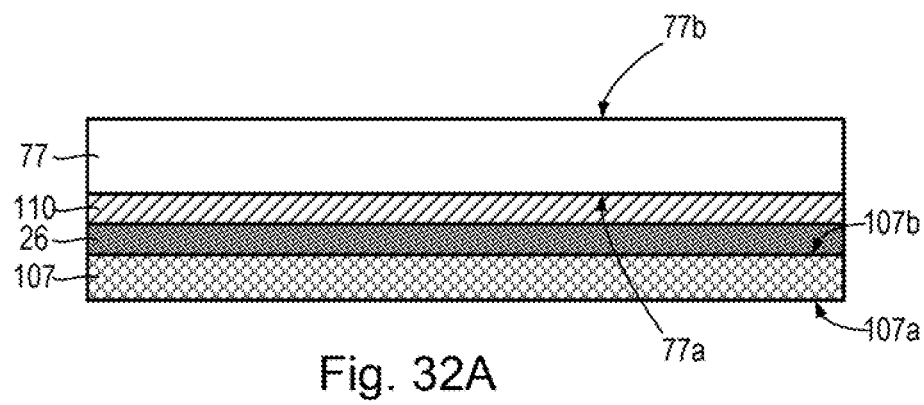
FIGS. 32A to 32C illustrate a third display stack-up at different stages during fabrication.
Figure 32B:
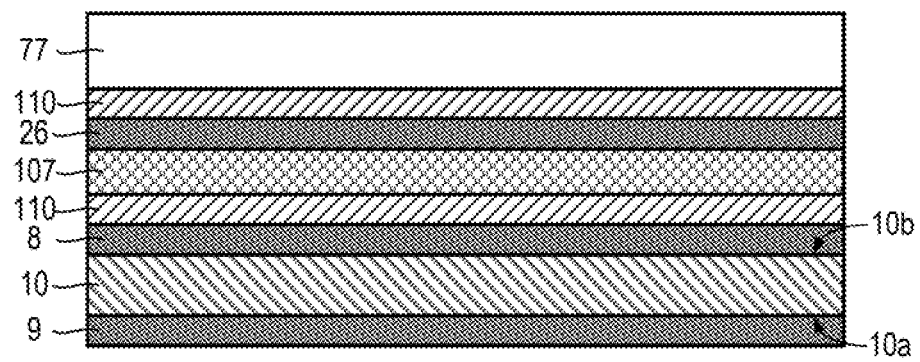
Figure 32C:
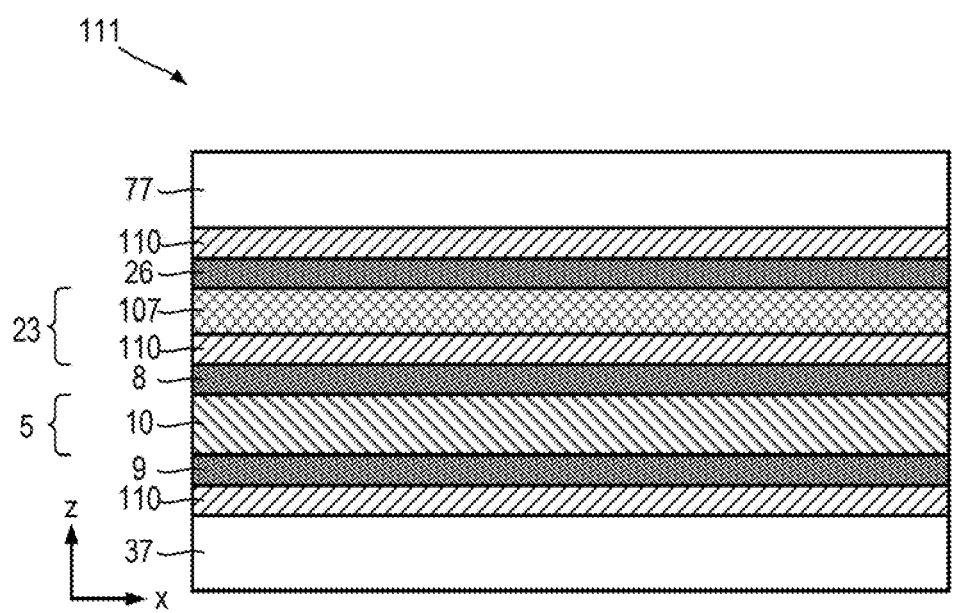

Third Display Stack-Up:

Referring also to FIGS. 32A to 32C, a third display stack-up 111 and a method of fabricating the third display stack-up 111 will be explained.

Referring in particular to FIG. 32A, the cover lens 77 is a transparent substrate extending in the first x and second y directions and having first 7a and second 77b opposite faces. A first dielectric layer 107 extends in the first x and second y directions and has first 107a and second 107b opposite faces. Third electrodes 26 in the form of a set of conductive regions extending in the first direction x and spaced apart in the second direction y are disposed on the second face 107b of the first dielectric layer 107. The second face 107b of the first dielectric layer 107 is bonded to the first face 77a of the cover lens 77 using a layer of PSA material 110.

Referring in particular to FIG. 32B, a layer of piezoelectric material 10 extends in the first x and second y directions and has first 10a and second 10b opposite faces. First electrodes 8 in the form of conductive regions extending in a second direction y and spaced apart in the first direction x are disposed on the second face 10b of the layer of piezoelectric material 10. A second electrode 9 in the form of a conductive material region is disposed on the first face 10a of the layer of piezoelectric material 10 such that, when assembled, the second electrode 9 at least partially overlaps each first electrode 8 and each third electrode 26. The second face 10b of the layer of piezoelectric material 10 may be bonded to the first face 107a of the first dielectric layer 107 using a layer of PSA material 110.

Referring in particular to FIG. 32C, the third display stack up 111 may be bonded overlying the display 37 using a layer of PSA material 110.

The elements of the third display stack-up 111 are stacked in the thickness direction z from the display 37 to the cover lens 77. The layer structure 5 includes the layer of piezoelectric material 10. The second layer structure 23 includes the first dielectric layer 107 and a layer of PSA material 110.

Fourth Display Stack-Up:

Referring also to FIGS. 33A to 33D, a fourth display stack-up 112 and a method of fabricating the fourth display stack-up 112 will be explained.

Figure 33A:
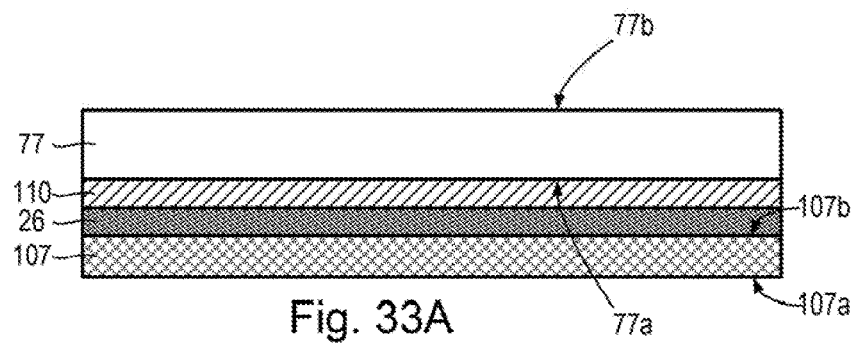
FIGS. 33A to 33D illustrate a fourth display stack-up at different stages during fabrication.

Referring in particular to FIG. 33A, the cover lens 77 is a transparent substrate extending in the first x and second y directions and having first 77a and second 77b opposite faces. A first dielectric layer 107 extends in the first x and second y directions and has first 107a and second 107b opposite faces. Third electrodes 26 in the form of a set of conductive regions extending in the first direction x and spaced apart in the second direction y are disposed on the second face 107b of the first dielectric layer 107. The second face 107b of the first dielectric layer 107 is bonded to the first face 77a of the cover lens 77 using a layer of PSA material 110.

Figure 33B:
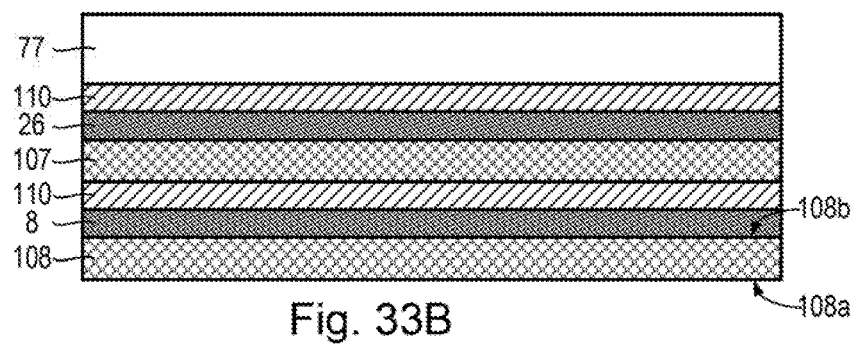

Referring in particular to FIG. 33B, a second dielectric layer 108 extends in the first x and second y directions and has first 108a and second 108b opposite faces. First electrodes 8 in the form of a set of conductive regions extending in the second direction y and spaced apart in the first direction x are disposed on the second face 108b of the second dielectric layer 108. The second face 108b of the second dielectric layer 108 is bonded to the first face 107a of the first dielectric layer 107 using a layer of PSA material 110.

Figure 33C:
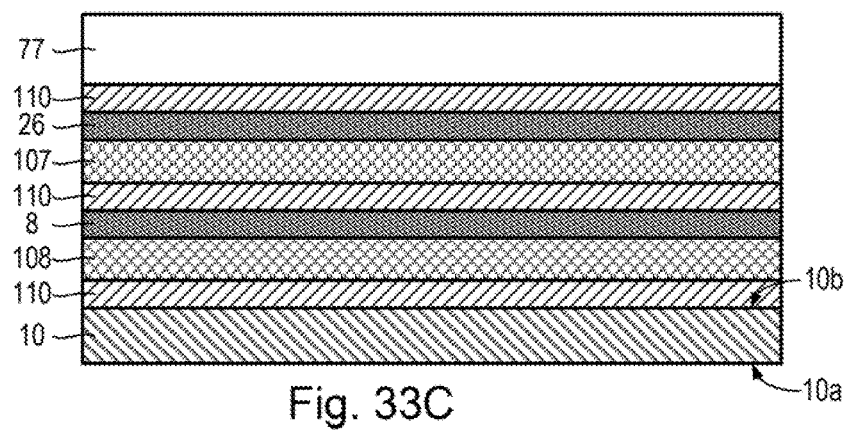

Referring in particular to FIG. 33C, a layer of piezoelectric material 10 extends in the first x and second y directions and has first 10a and second 10b opposite faces. The second face 10b of the layer of piezoelectric material 10 is bonded to the first face 108a of the second dielectric layer 108 using a layer of PSA material 110.

Figure 33D:
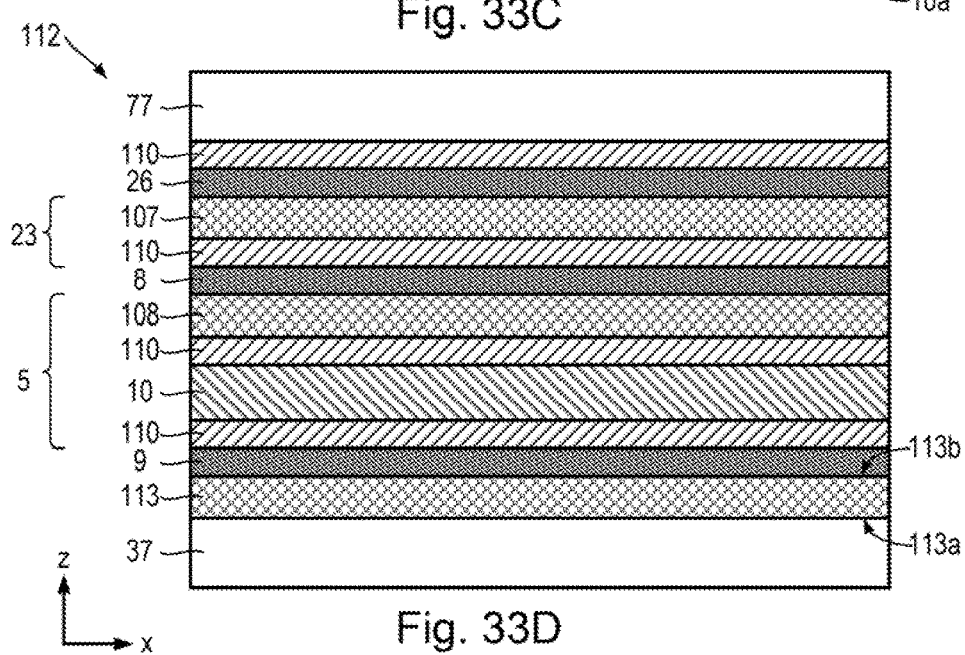

Referring in particular to FIG. 33D, a third dielectric layer 113 extends in the first x and second y directions and has first 113a and second 113b opposite faces. A second electrode 9 in the form of a conductive material region is disposed on the second face 113b of the layer third dielectric layer 113 such that, when assembled, the second electrode 9 at least partially overlaps each first electrode 8 and each third electrode 26 region. The third dielectric layer 113 is substantially the same as the first or second dielectric layers 107, 108. The second face 13b of third dielectric layer 113 is bonded to the first face 10a of the layer of piezoelectric material 10 using a layer of PSA material 110.

The fourth display stack-up 11 may be bonded overlying the display 37 of an electronic device 28. The elements of the fourth display stack-up 112 are stacked in the thickness direction z from the display 37 to the cover lens 77. The layer structure 5 includes the second dielectric layer 108, the layer of piezoelectric material 10 and two layers of PSA material 110. The second layer structure 23 includes the first dielectric layer 107 and a layer of piezoelectric material 110.

Thus, in the fourth display stack-up, the layer of piezoelectric material 10 does not have any electrodes disposed thereon. This simplifies the fabrication of the fourth stack-up substantially because processing steps to deposit electrodes on the layer of piezoelectric material 10 are not required. In a case when the layer of piezoelectric material 10 is PVDF, the fourth stack-up 112 can be fabricated by sandwiching a PVDF film providing the layer of piezoelectric material 10 between PET layers bearing patterned and unpatterned ITO electrodes. In this way, methods for manufacturing a regular projected capacitance touch panel may be quickly and easily adapted to allow production of combined pressure and capacitance touch panels.

Figure 34A:
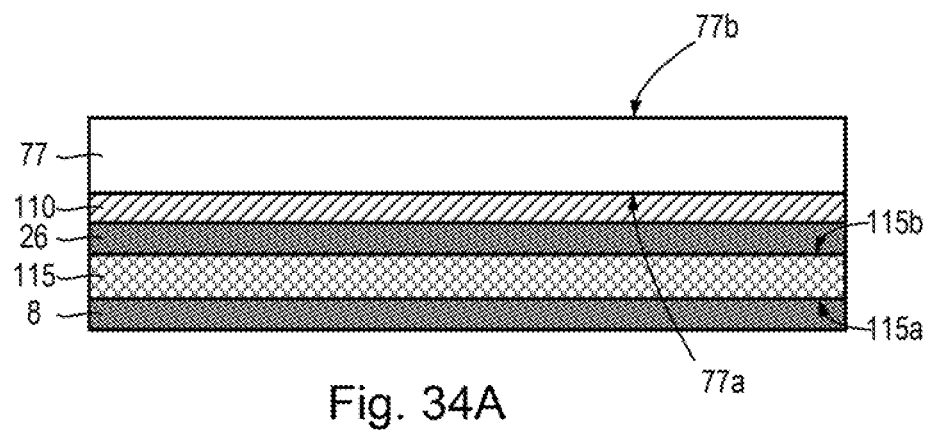
FIGS. 34A and 34B illustrate a fifth display stack-up at different stages during fabrication.
Figure 34B:
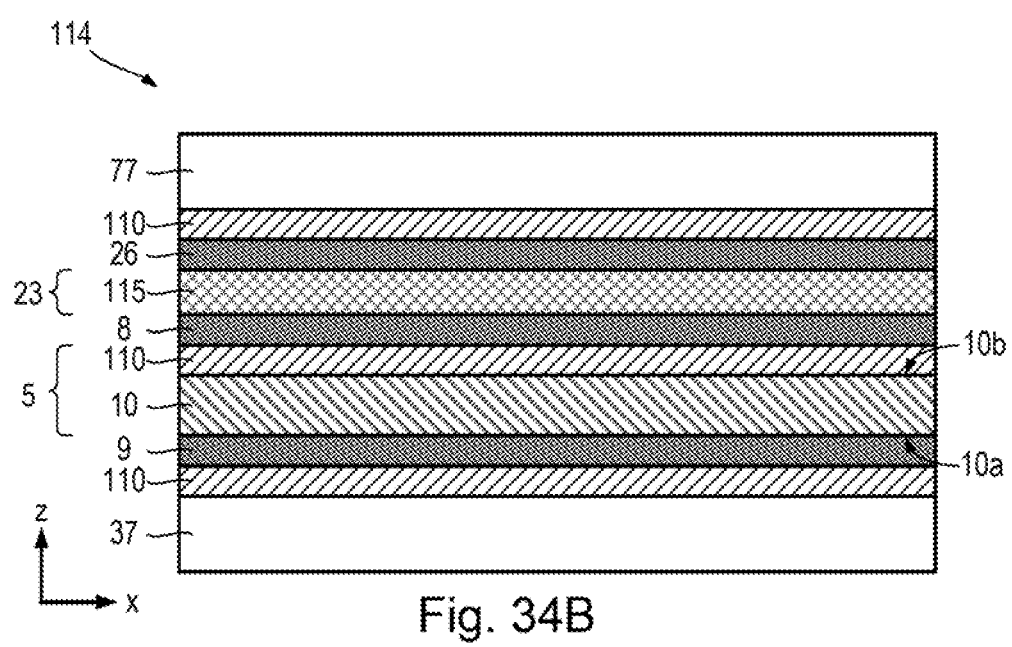

Fifth Display Stack-Up:

Referring also to FIGS. 34A and 34B, a fifth display stack-up 114 and a method of fabricating the fifth display stack-up 114 will be explained.

Referring in particular to FIG. 34A, the cover lens 77 is a transparent substrate extending in the first x and second y directions and having first 77a and second 77b opposite faces. A fourth dielectric layer 115 extends in the first x and second y directions and has first 115a and second 115b opposite faces. Third electrodes 26 in the form of a set of conductive regions extending in the first direction x and spaced apart in the second direction y are disposed on the second face 115b of the fourth dielectric layer 115. First electrodes 8 in the form of a set of conductive regions extending in the second direction y and spaced apart in the first direction x are disposed on the first face 115a of the fourth dielectric layer 115. The second face 115b of the fourth dielectric layer 115 is bonded to the first face 77a of the cover lens 77 using a layer of PSA material 110. The fourth dielectric layer 115 is substantially the same as the first, second or third dielectric layers 107, 108, 113.

Referring in particular to FIG. 34B, a layer of piezoelectric material 10 extends in the first x and second y directions and has first 10a and second 10b opposite faces. A second electrode 9 in the form of a conductive material region is disposed on the first face 10a of the layer of piezoelectric material 10 such that, when assembled, the second electrode 9 at least partially overlaps each first electrode 8 and each third electrode 26 region. The second face 10b of the layer of piezoelectric material 10 is bonded to the first face 115a of the fourth dielectric layer 115 using a layer of PSA material 110.

The fifth display stack-up 114 may be bonded overlying the display 37 of an electronic device 28 using a layer of PSA material 110. The elements of the fifth display stack-up 114 are stacked in the thickness direction z from the display 37 to the cover lens 77. The layer structure 5 includes the layer of piezoelectric material 10 and a layer of PSA material 110. The second layer structure 23 includes the fourth dielectric layer 115.

The second electrode 9 need not be disposed on the layer of piezoelectric material 10. Alternatively, the fifth display stack-up 114 may include the third dielectric layer 113 with the second face 113b of the third dielectric layer 113 bonded to the first face 10a of the layer of piezoelectric material 10 using a layer of PSA material 110.

Figure 35A:
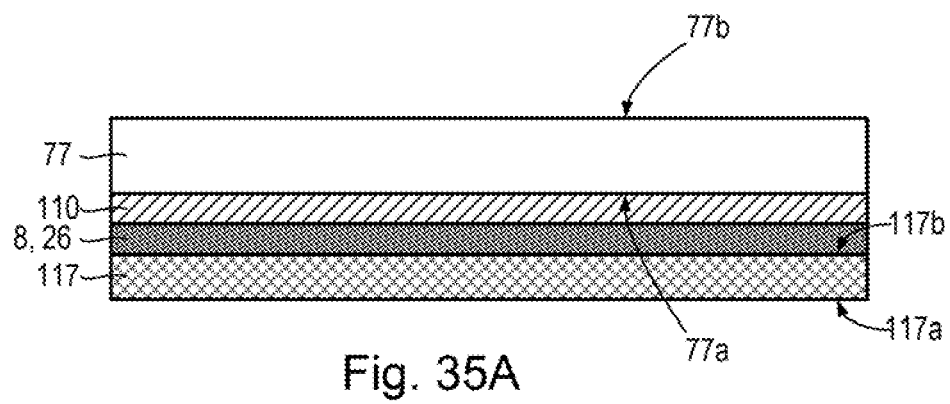
FIGS. 35A and 35B illustrate a sixth display stack-up at different stages during fabrication.
Figure 35B:
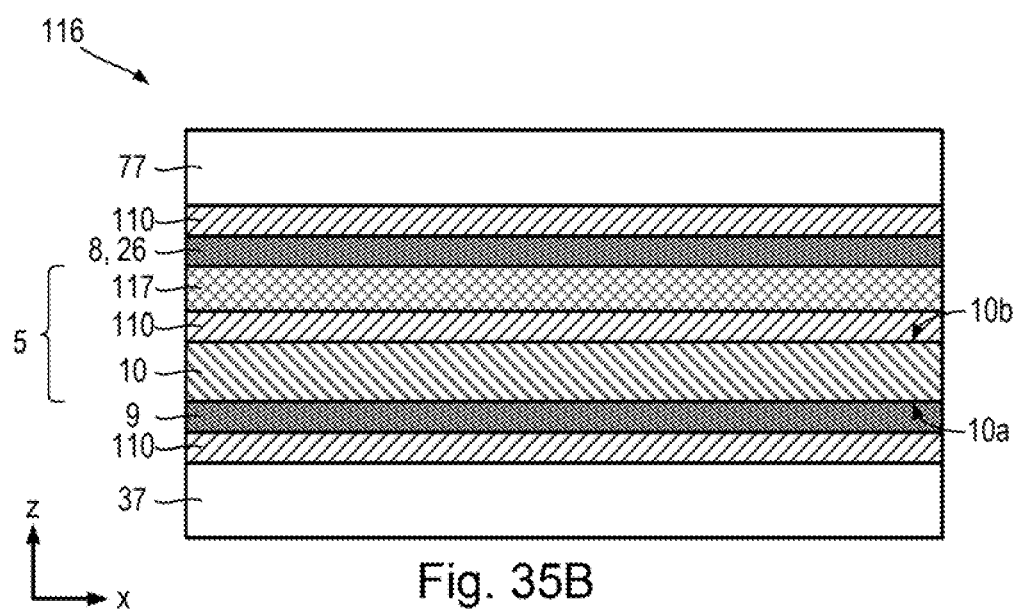

Sixth Display Stack-Up:

Referring also to FIGS. 35A and 35B, a sixth display stack-up 116 and a method of fabricating the sixth display stack-up 116 will be explained.

Referring in particular to FIG. 35A, the cover lens 77 is a transparent substrate extending in the first x and second y directions and having first 77a and second 77b opposite faces. A fifth dielectric layer 117 extends in the first x and second y directions and has first 117a and second 117b opposite faces. Third electrodes 26 in the form of a set of conductive regions extending in the first direction x and spaced apart in the second direction y are disposed on the second face 117b of the fifth dielectric layer 117. First electrodes 8 in the form of a set of conductive regions extending in the second direction y and spaced apart in the first direction x are disposed on the second face 117a of the fifth dielectric layer 117. The second face 117b of the fifth dielectric layer 117 is bonded to the first face 77a of the cover lens 77 using a layer of PSA material 110. The fifth dielectric layer 115 is substantially the same as the first, second, third of fourth dielectric layers 107, 108, 113, 115. Each first electrode 8 is a continuous conductive region and each third electrode is made up of a number of separate conductive regions connected by jumpers 100. Each jumper spans a portion of a conductive region belonging to a first electrode 8. The first and third electrodes 8, 26 may be substantially the same as the first and third electrodes 8, 26 of the third touch panel 98.

Referring in particular to FIG. 34B, a layer of piezoelectric material 10 extends in the first x and second y directions and has first 10a and second 10b opposite faces. A second electrode 9 in the form of a conductive material region is disposed on the first face 10a of the layer of piezoelectric material 10 such that, when assembled, the second electrode 9 at least partially overlaps each first electrode 8 and each third electrode 26 region. The second face 10b of the layer of piezoelectric material 10 is bonded to the fast face 117a of the fifth dielectric layer 117 using a layer of PSA material 110.

The sixth display stack-up 116 may be bonded overlying the display 37 of an electronic device 28 using a layer of PSA material 110. The elements of the sixth display stack-up 116 are stacked in the thickness direction z from the display 37 to the cover lens 77. The layer structure 5 includes the layer of piezoelectric material 10, a layer of PSA material 110 and the fifth dielectric layer 117.

The second electrode 9 need not be disposed on the layer of piezoelectric material 10. Alternatively, the sixth display stack-up 116 may include the third dielectric layer 113 with the second face 113b of the third dielectric layer 113 bonded to the first face 10a of the layer of piezoelectric material 10 using a layer of PSA material 110.

Figure 36A:
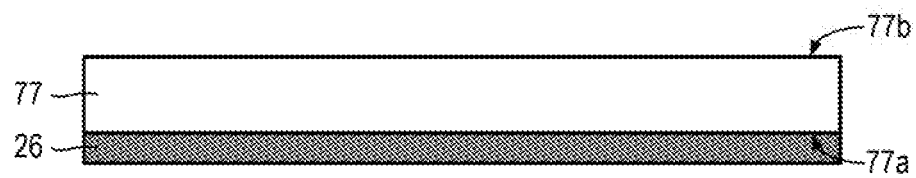
FIGS. 36A to 36C illustrate a seventh display stack-up at different stages during fabrication.
Figure 36B:
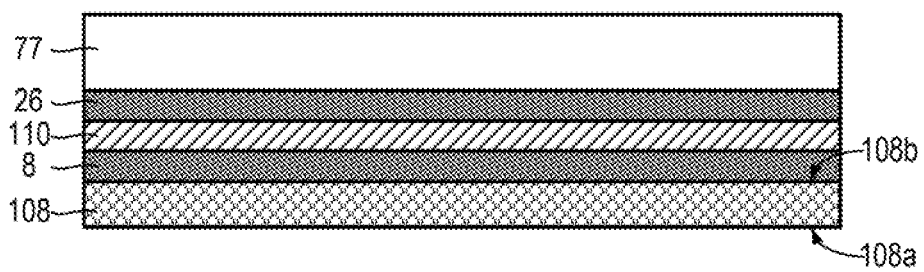
Figure 36C:
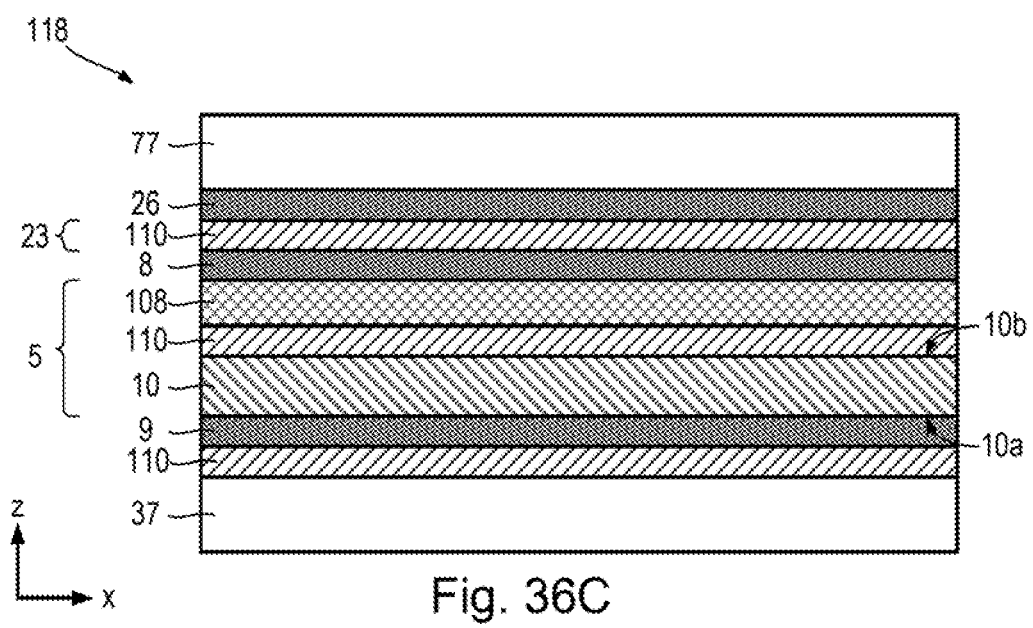

Seventh Display Stack-Up:

Referring also to FIGS. 36A to 36C, a seventh display stack-up 118 and a method of fabricating the seventh display stack-up 118 will be explained.

Referring in particular to FIG. 36A, the cover lens 77 is a transparent substrate extending in the first x and second y directions and having first 77a and second 77b opposite faces. Third electrodes 26 in the form of a set of conductive regions extending in the first direction x and spaced apart in the second direction y are disposed on the first face 77a of the cover lens 77.

Referring in particular to FIG. 36B, a second dielectric layer 108 extends in the first x and second y directions and has first 108a and second 108b opposite faces. First electrodes 8 in the form of a set of conductive regions extending in the second direction y and spaced apart in the first direction x are disposed on the second face 108b of the second dielectric layer 108. The second face 108b of the second dielectric layer 108 is bonded to the first face 77a of the cover lens 77 using a layer of PSA material 110.

Referring in particular to FIG. 36C, a layer of piezoelectric material 10 extends in the first x and second y directions and has first 10a and second 10b opposite faces. A second electrode 9 in the form of a conductive material region is disposed on the first face 10a of the layer of piezoelectric material 10 such that, when assembled, the second electrode 9 at least partially overlaps each first electrode 8 and each third electrode 26 region. The second face 10b of the layer of piezoelectric material 10 is bonded to the first face 108a of the second dielectric layer 108 using a layer of PSA material 110.

The seventh display stack-up 118 may be bonded overlying the display 37 of an electronic device 28 using a layer of PSA material 110. The elements of the seventh display stack-up 118 are stacked in the thickness direction z from the display 37 to the cover lens 77. The layer structure 5 includes the layer of piezoelectric material 10, a layer of PSA material 110 and the second dielectric layer 108. The second layer structure 23 includes a layer of PSA material 110.

The second electrode 9 need not be disposed on the layer of piezoelectric material 10. Alternatively, the seventh display stack-up 118 may include the third dielectric layer 113 with the second face 113b of the third dielectric layer 113 bonded to the first face 10a of the layer of piezoelectric material 10 using a layer of PSA material 110.

Eighth Display Stack-Up:

Referring also to FIGS. 37A to 37D, an eighth display stack-up 125 and a method of fabricating the eighth display stack-up 125 will be explained.

Figure 37A:
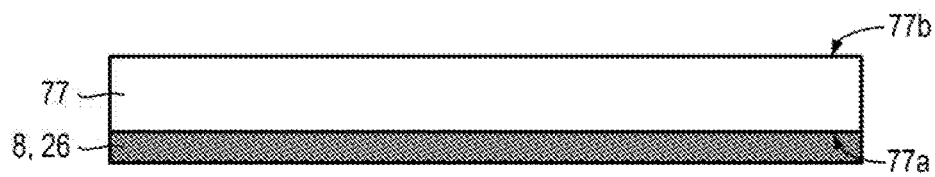
FIGS. 37A to 37D illustrate an eighth display stack-up at different stages during fabrication.

Referring in particular to FIG. 37A, the cover lens 77 is a transparent substrate extending in the first x and second y directions and having first 77a and second 77b opposite faces. First electrodes 8 in the form of a set of conductive regions extending in the second direction y and spaced apart in the first direction x are disposed on the first face 77a of the cover lens 77. Third electrodes 26 in the form of a set of conductive regions extending in the first direction x and spaced apart in the second direction y are also disposed on the first face 77a of the cover lens 77. Each first electrode 8 is a continuous conductive region and each third electrode is made up of a number of separate conductive regions connected by jumpers 100. Each jumper spans a portion of a conductive region belonging to a first electrode 8. The first and third electrodes 8, 26 may be substantially similar to the first and third electrodes 8, 26 of the third touch panel 98.

Figure 37B:
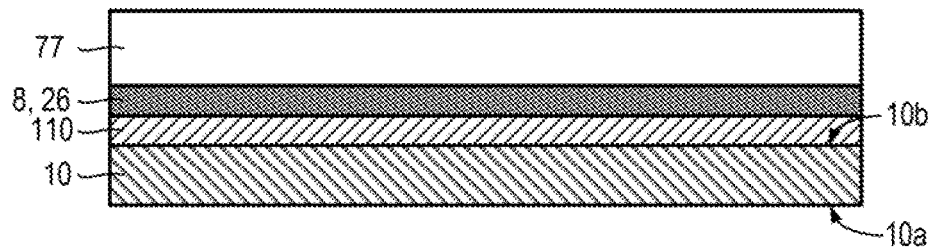

Referring in particular to FIG. 37B, a layer of piezoelectric material 10 extends in the first x and second y directions and has first 10a and second 10b opposite faces. The second face 10b of the layer of piezoelectric material 10 is bonded to the first face 77a of the cover lens 77 using a layer of PSA material 110.

Figure 37C:
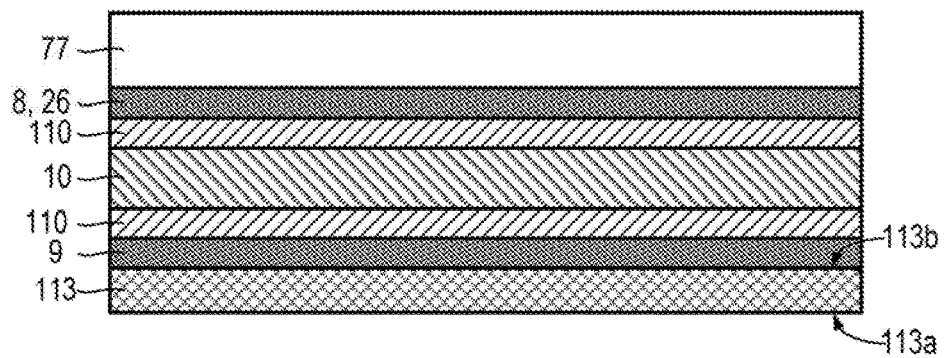

Referring in particular to FIG. 37C, a third dielectric layer 113 extends in the first x and second y directions and has first 113a and second 113b opposite faces. A second electrode 9 in the form of a conductive material region is disposed on the second face 113b of the third dielectric layer 113 such that, when assembled, the second electrode 9 at least partially overlaps each first electrode 8 and each third electrode 26 region. The second face 113b of third dielectric layer 113 is bonded to the first face 10a of the layer of piezoelectric material 10 using a layer of PSA material 110.

Figure 37D:
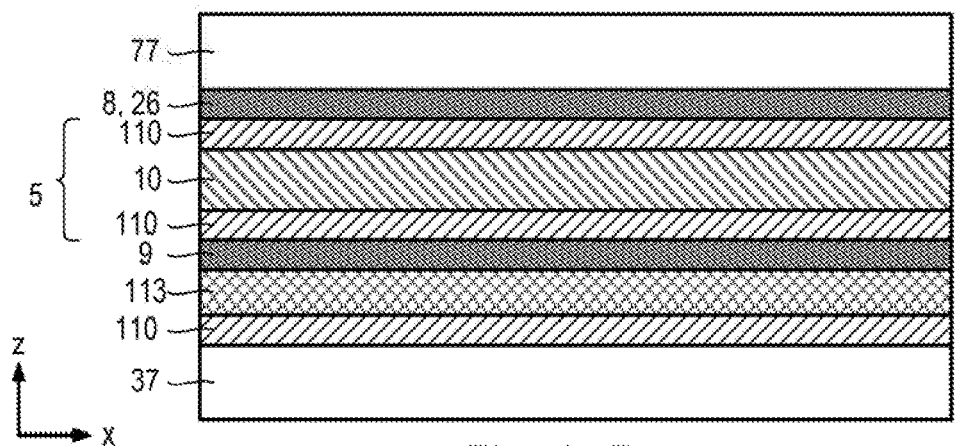

Referring in particular to FIG. 37D, the eighth display stack-up 125 may be bonded overlying the display 37 of an electronic device 28 using a layer of PSA material 110 to bond the first surface 113a of the third dielectric layer 113 to the display 37. The elements of the eighth display stack-up 125 are stacked in the thickness direction z from the display 37 to the cover lens 77. The layer structure 5 includes the layer of piezoelectric material 10 and two layers of PSA material 110.

The second electrode 9 need not be disposed on the third dielectric layer 113. Alternatively, the eighth display stack-up 125 may include a layer of piezoelectric material 10 having the second electrode 9 disposed onto the first face 10a of the layer of piezoelectric material 10.

Modifications

It will be appreciated that many modifications may be made to the embodiments hereinbefore described. Such modifications may involve equivalent and other features which are already known in the design, manufacture and use of projected capacitance touch panels and which may be used instead of or in addition to features already described herein. Features of one embodiment may be replaced or supplemented by features of another embodiment.

For example, touch panels 29, 92, 98, 103 and stack-ups 106, 109, 111, 112, 114, 16, 118, 125 have been described which overlie the display 37 of an electronic device 28. However, the apparatuses 1, 20, 74, 93, 101, 104 described herein may equally be used with other touch panels which are integrated into a display 37 such as, for example, an LCD display, an OLED display, a plasma display or an electrophoretic display.

Figure 38:
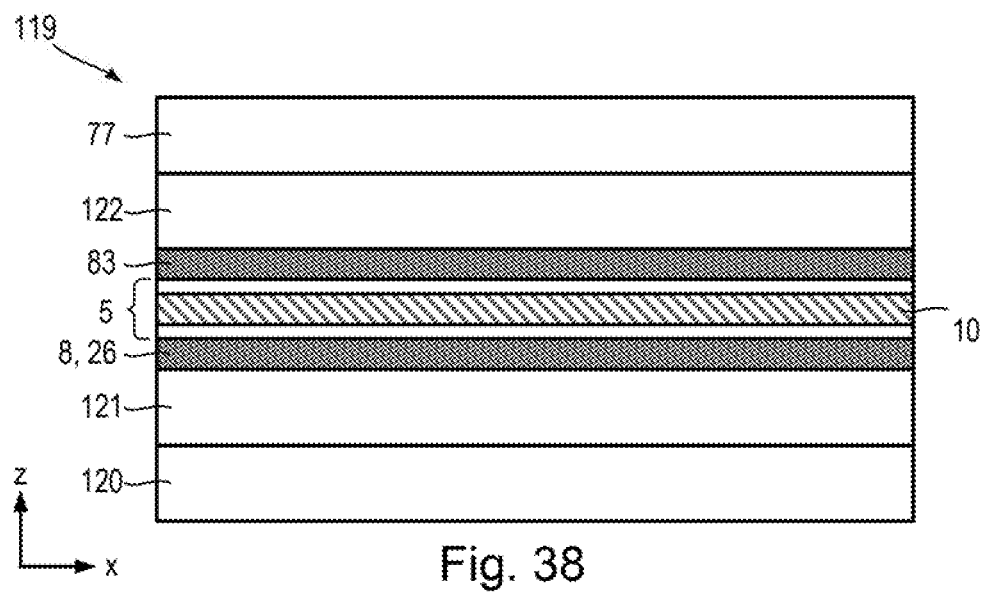
FIG. 38 illustrates a first embedded display stack-up.

Referring also to FIG. 38, a first embedded stack-up 119 includes a pixel array 120 of a display 37, a colour filter glass 121, first and third electrodes 8, 26, a layer structure 5, a patterned second electrode 83, a polariser 122 and a cover lens 77 stacked in the thickness direction from the pixel array 120 to the cover lens 77. The first and third electrodes 8, 26 are disposed on the same face of the layer structure 5 in substantially the same way as the third touch panel 98.

In this way, the first embedded stack-up 119 can be used in the fourth of fifth apparatuses 93, lot to provide a touch panel with combined capacitive and pressure sensing embedded within an LCD display. This may allow the total thickness of the display 37 and touch panel to be reduced compared to a touch panel overlying the display 37.

Figure 39:
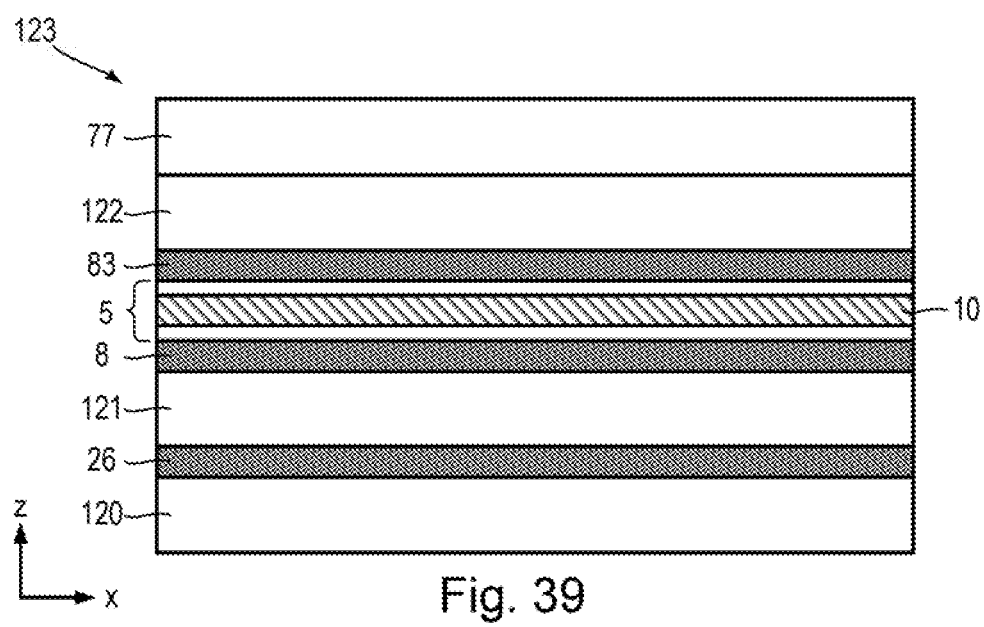
FIG. 39 illustrates a second embedded display stack-up.

Referring also to FIG. 39, a second embedded stack-up 123 includes a pixel array 120 of a display 37, third electrodes 26, a colour filter glass 121, first electrodes 8, a layer structure 5, a patterned second electrode 83, a polariser 122 and a cover lens 77 stacked in the thickness direction from the pixel array 120 to the cover lens 77. The first and third electrodes 8, 26 are disposed 5 in substantially the same way as the second touch panel 92, except that the first and third electrodes 8, 26 are disposed on opposite sides of the colour filter glass 121 instead of the second layer structure 23.

Figure 40:
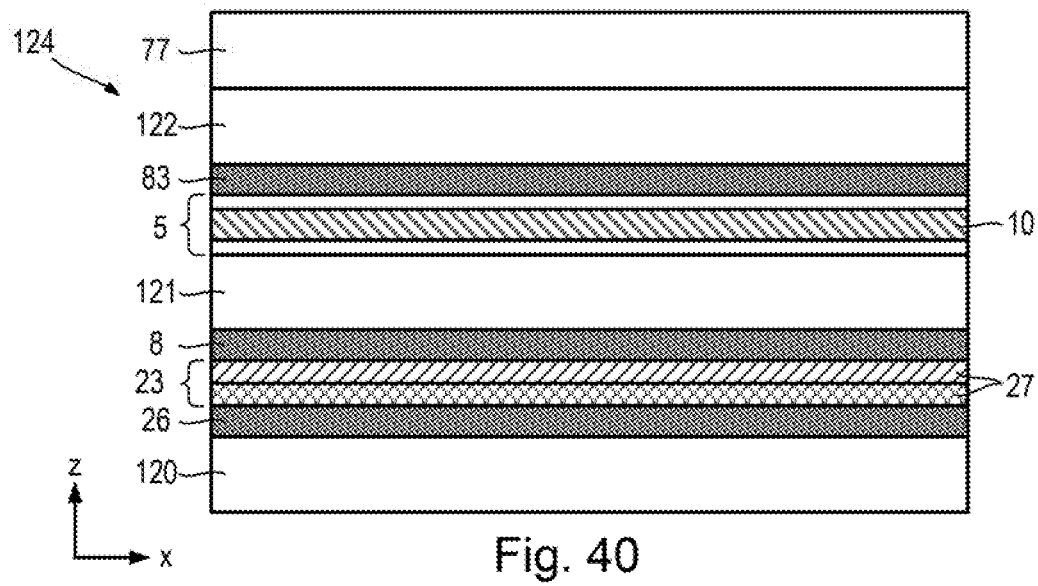
FIG. 40 illustrates a third embedded display stack-up.

Referring also to FIG. 40, a third embedded stack-up 124 includes a pixel array 120 of a display 37, third electrodes 26, a second layer structure 23, first electrodes 8, a colour filter glass 121, a layer structure 5, a patterned second electrode 83, a polariser 122 and a cover lens 77 stacked in the thickness direction from the pixel array 120 to the cover lens 77. The first and third electrodes 8, 26 are disposed in substantially the same way as the second touch panel 92.

In the third embedded stack-up 124, the first and third electrodes 8, 26 are separated by the second layer structure 23. However, the third embedded stack-up 124 may alternatively omit the second layer structure and include first and third electrodes 8, 26 disposed in substantially the same way as the third touch panel 98.

Figure 41:
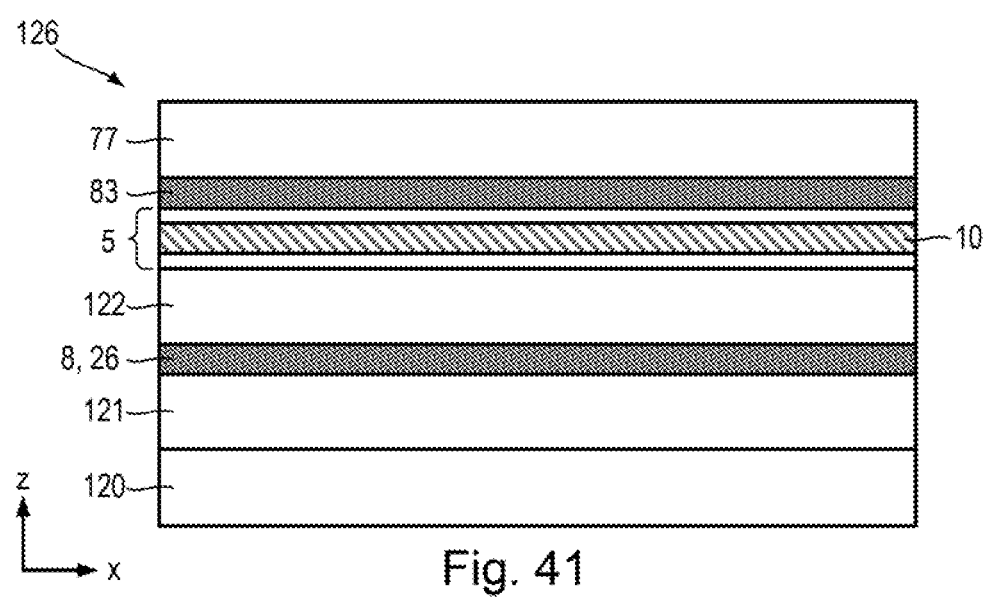
FIG. 41 illustrates a fourth embedded display stack-up.

Referring also to FIG. 41, a fourth embedded stack-up 126 includes a pixel array 120 of a display 37, a colour filter glass 121, first and third electrodes 8, 26, a polariser 122, a layer structure 5, a patterned second electrode 83, and a cover lens 77 stacked in the thickness direction from the pixel array 120 to the cover lens 77. The first and third electrodes 8, 26 are disposed on the same face of the layer structure 5 in substantially the same way as the third touch panel 98.

Figure 42:
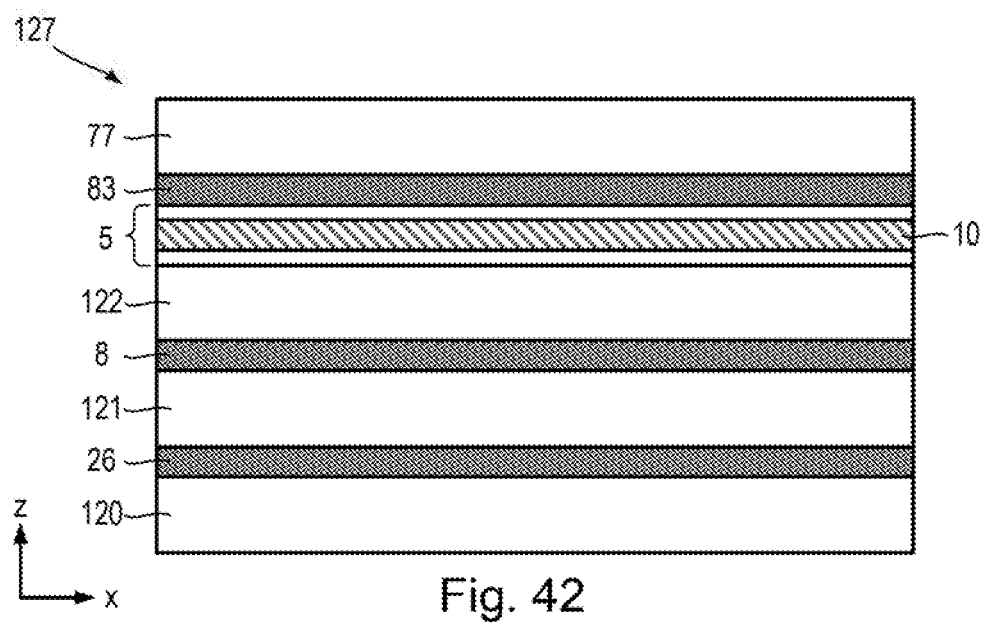
FIG. 42 illustrates a fifth embedded display stack-up.

Referring also to FIG. 42, a fifth embedded stack-up 127 includes a pixel array 120 of a display 37, third electrodes 26, a colour filter glass 121, first electrodes 8, a polariser 122, a layer structure 5, a patterned second electrode 83, and a cover lens 77 stacked in the thickness direction from the pixel array 120 to the cover lens 77. The first and third electrodes 8, 26 are disposed 5 in substantially the same way as the second touch panel 92, except that the first and third electrodes 8, 26 are disposed on opposite sides of the colour filter glass 121 instead of the second layer structure 23.

Figure 43:
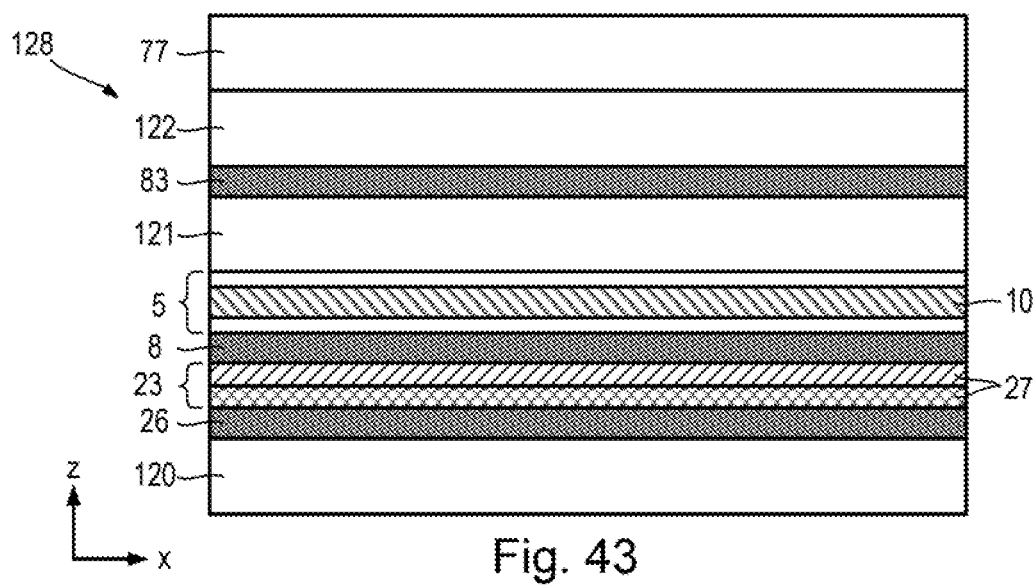
FIG. 43 illustrates a sixth embedded display stack-up.

Referring also to FIG. 43, a sixth embedded stack-up 128 includes a pixel array 120 of a display 37, third electrodes 26, a second layer structure 23, first electrodes 8, a layer structure 5, a colour filter glass 121, a patterned second electrode 83, a polariser 122 and a cover lens 77 stacked in the thickness direction from the pixel array 120 to the cover lens 77. The first and third electrodes 6, 26 are disposed in substantially the same way as the second touch panel 92.

Figure 44:
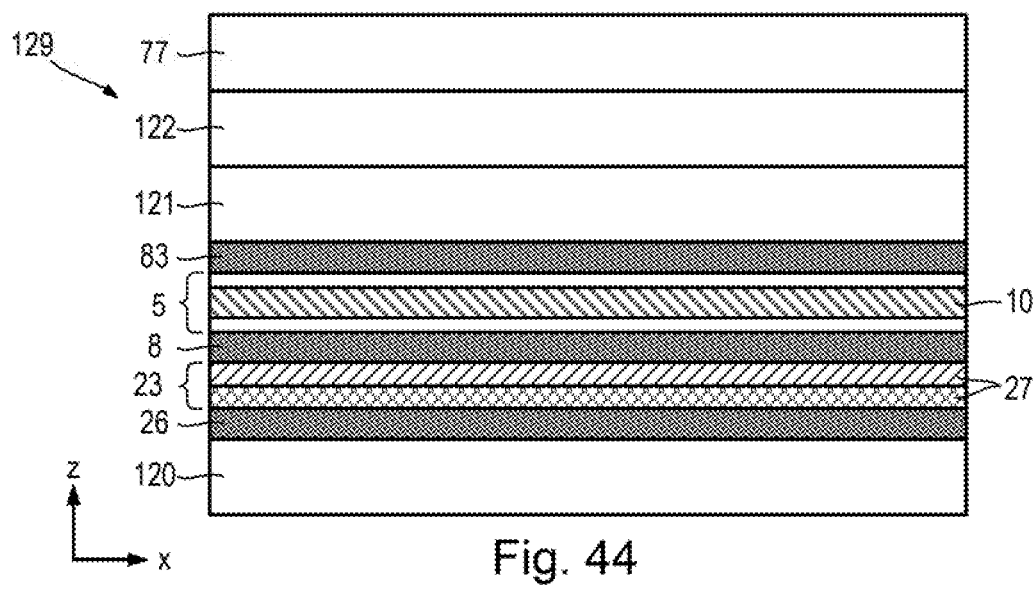
FIG. 44 illustrates a seventh embedded display stack-up.

Referring also to FIG. 44, a seventh embedded stack-up 129 includes a pixel array 120 of a display 37, third electrodes 26, a second layer structure 23, first electrodes 8, a layer structure 5, a patterned second electrode 83, a colour filter glass 121, a polariser 122 and a cover lens 77 stacked in the thickness direction from the pixel array 120 to the cover lens 77. The first and third electrodes 8, 26 are disposed in substantially the same way as the second touch panel 92.

Figure 45:
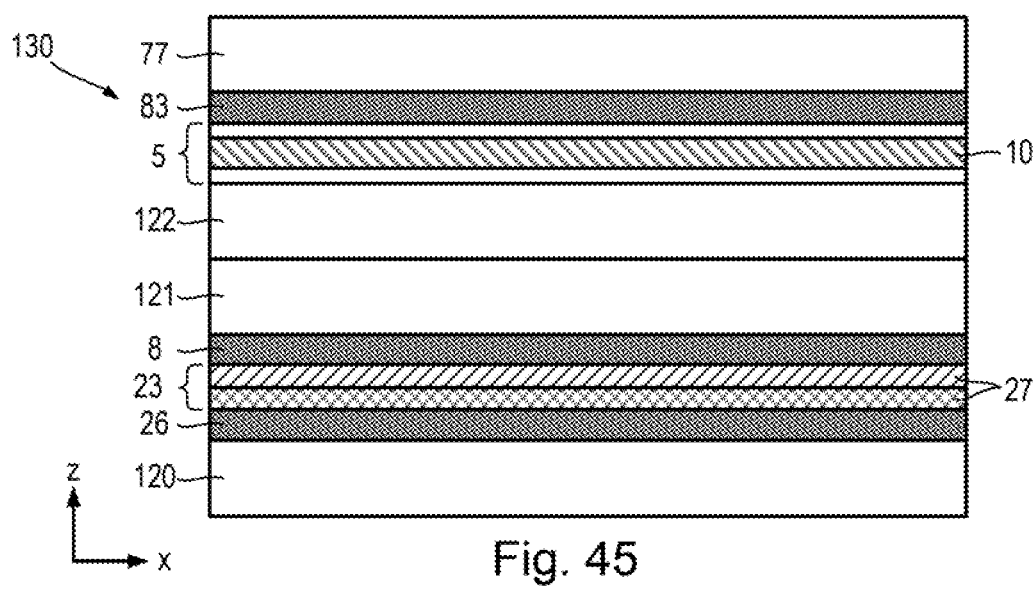
FIG. 45 illustrates an eighth embedded display stack-up.

Referring also to FIG. 45, an eighth embedded stack-up 130 includes a pixel array 120 of a display 37, third electrodes 26, a second layer structure 23, first electrodes 8, a colour filter glass 121, a polariser 122, a layer structure 5, a patterned second electrode 83 and a cover lens 77 stacked in the thickness direction from the pixel array 120 to the cover lens 77. The first and third electrodes 8, 26 are disposed in substantially the same way as the second touch panel 92.

The sixth, seventh and eighth embedded stack-ups 128, 129, 130 have been described with the first and third electrodes 8, 26 separated by the second layer structure 23. However, the sixth, seventh and eighth embedded stack-ups 128, 129, 130 may alternatively omit the second layer structure and include first and third electrodes 8, 26 disposed in substantially the same way as the third touch panel 98.

The first to eighth embedded stack-ups, 119, 123, 124, 126, 127, 128, 129, 130 have been described as including the patterned second electrode 83. However, the patterned second electrode 83 need not be used and the first to eighth embedded stack-ups, 119, 123, 124, 126, 127, 128, 129, 130 may instead include un-patterned second electrodes 9.

Figure 46:
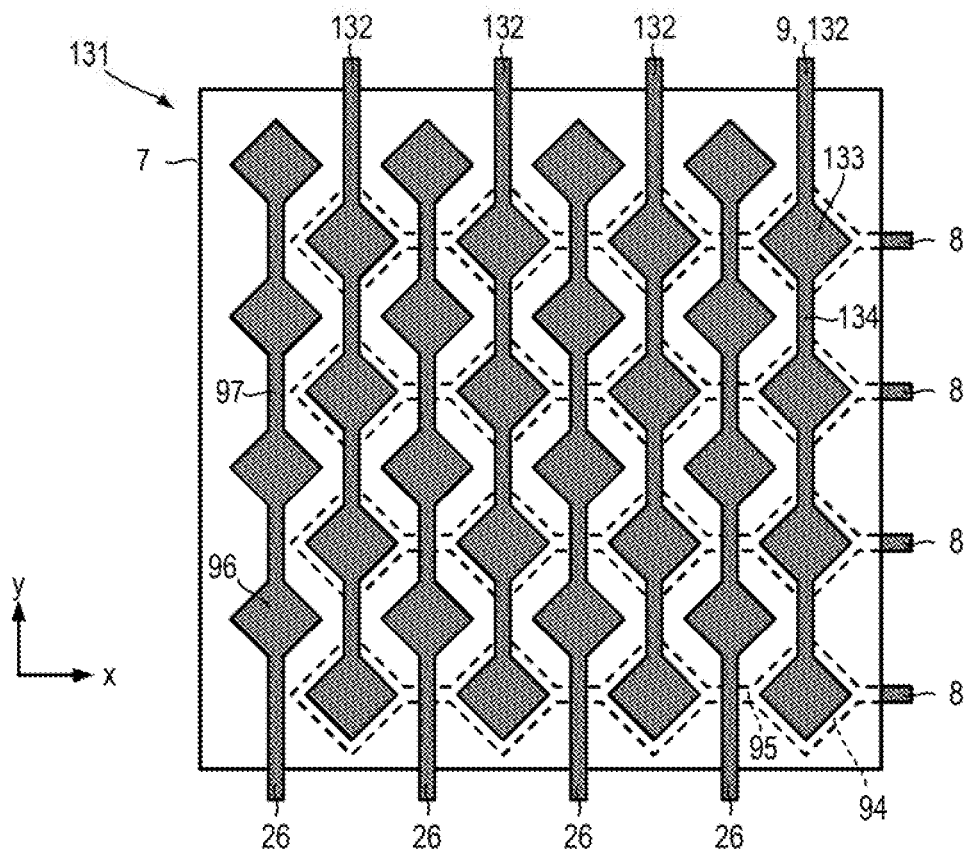
FIG. 46 is a plan view of an arrangement of electrodes for a fifth touch panel for combined capacitive and pressure sensing.
Figure 47:
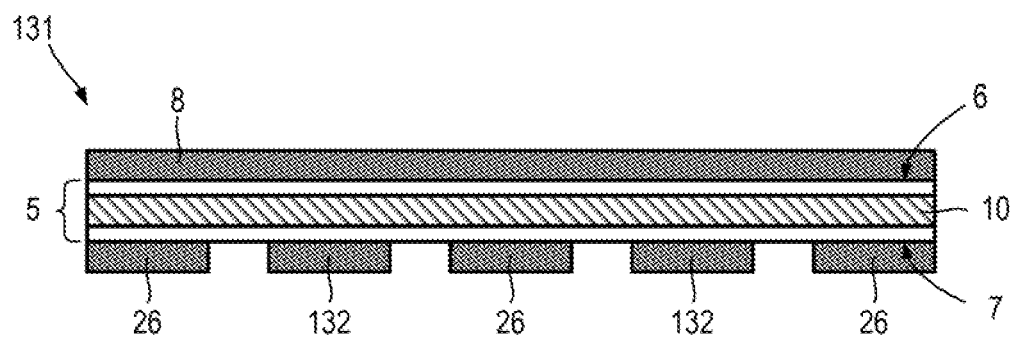
FIG. 47 is a cross-sectional view of the touch panel shown in FIG. 46.

Touch panels have been described in which first and third electrodes 8, 26 are separated from second, or bias, electrodes 9, 83 by the layer structure 5. However, other arrangements are possible. Referring to FIGS. 46 and 47, a fifth touch panel 131 includes a layer structure 5, a plurality of first electrodes 8 disposed on the first face 6 of the layer structure 5, a plurality of third electrodes 26 disposed on the second face 7 of the layer structure 5 and a plurality of second electrodes 9 disposed on the second face 7 of the layer structure 5 in the form of a plurality of separated second electrodes 132.

The first electrodes 8 extend in the first direction x and are spaced apart in the second direction y. The third electrodes 26 extend in the second direction y and are spaced apart in the first direction x. The separated second electrodes 132 extend in the second direction y are spaced apart in the first direction x. The separated second electrodes 132 and the third electrodes 26 are interleaved and do not contact one another. The separated second electrodes 132 and third electrodes 26 may be read using conductive traces (not shown) which exit the fifth touch panel 131 on different edges. Each first electrode 8 may take the form of several pad segments 94 evenly spaced in the first direction x and connected to one another in the first direction x by relatively narrow bridging segments 95. Similarly, each third electrode 26 may include several pad segments 96 evenly spaced in the second direction y and connected to one another in the second direction y by relatively narrow bridging segments 97. The pad segments 94 of the first electrodes 8 may be diamond shaped. The pad segments 96 and bridging segments 97 of the third electrodes 26 may have the same respective shapes and widths as the first electrodes 8. Each separated second electrode 9 may include several pad segments 133 evenly spaced in the second direction y and connected to one another in the second direction y by relatively narrow bridging segments 134. The pad segments 133 and bridging segments 134 of the separated second electrodes 132 may have the same respective shapes and widths as the first and third electrodes 8, 26. Alternatively, the pad segments 94 of the first electrodes 8 may be larger or smaller than the pad segments 133 of the separated second electrodes 132.

The first electrodes 8 and the third electrodes 26 are arranged such that the bridging segments 97 of the third electrodes 26 overlie the bridging segments 95 of the first electrodes 8. The first electrodes 8 and the third electrodes 26 are arranged such that the respective pad segments 94, 96 do not overlap. Instead, the separated second electrodes are arranged such that the pad segments 133 of the separated second electrodes 132 overlap the pad segments 94 of the first electrodes 8. The pad segments 94, 96, 133 need not be diamond shaped, and may instead be circular. The pad segments 94, 96, 133 may be a regular polygon such as a triangle, square, pentagon or hexagon.

The fifth touch panel may be used in, for example, the fourth of fifth apparatus 93, 101 to measure mutual capacitance between a pair of first and third electrodes 8, 26. The separated sensing electrodes 132 may be coupled to each another, for example using external traces (not shown) and addressed collectively to measure pressure values between a first electrode 8 and the separated sensing electrodes 132. Alternatively, the separated sensing electrodes 132 may be individually addressable to measure pressure values using a pair of first and separated second electrodes 8, 132.

The first to eighth display stack ups 106, 109, 111, 112, 114, 116, 118, 125 or the first to eighth embedded stack-ups, 119, 123, 124, 126, 127, 128, 129, 130 may be adapted to incorporate the fifth touch panel 131, or elements of the fifth touch panel 131 such as, for example, disposing the third electrodes 26 on the same surface as the separated second electrode 132. The separated second electrodes 132 need not be disposed on the same surface as the third electrode 26, and may alternatively be disposed on the same surface of the layer structure 5 as the first electrodes 8.

Touch panels and stack-ups have been described which are generally planar. However, touch panels and stack-ups need not be planar or flat and may provide curved or other non-planar surfaces for a user to interact with. Touch panels and stack-ups may be provided overlying or embedded within curved displays.

The signal processing module 4, 22, controller 79 or processor 32 may employ correlated double sampling methods to improve the signal to noise ratio of the pressure values 18 and/or the capacitance values 19. The signal processing module 4, 22, controller 79 or processor 32 may process the pressure values 18 and/or the capacitance values 19 as image data.

Touch sensors 2, 21 and touch panels 29, 92, 98, 103 have been generally described in relation to first, second and third directions x, y, z forming an orthogonal set. However, the first and second directions need not be perpendicular and may in general intersect at any angle between 1 degree and 90 degrees. Intersection of the first and second directions at 90, 60, 45 or 30 degrees is preferred.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

What is claimed is:

1. A touch panel for combined capacitance and pressure sensing, comprising:
   a pixel array of a display;
   a cover lens;
   a plurality of first electrodes disposed between the pixel array and the cover lens, wherein each first electrode extends in a first direction and the plurality of first electrodes are arrayed spaced apart perpendicular to the first direction;
   a plurality of third electrodes disposed between the pixel array and the cover lens, wherein each third electrode extends in a second direction and the plurality of third electrodes are arrayed spaced apart perpendicular to the second direction, wherein the first and second directions are different;
   a patterned second electrode disposed between the cover lens and the plurality of first electrodes and between the cover lens and the plurality of third electrodes, the patterned second electrode comprising a plurality of first struts extending in the first direction and a plurality of second struts extending in the second direction, wherein the first and second struts are joined where they intersect such that the patterned second electrode is formed of a single region of conductive material; and
   a layer structure disposed between the patterned second electrode and the plurality of first electrodes and between the patterned second electrode and the plurality of third electrodes, the layer structure comprising one or more layers, each layer extending perpendicularly to a thickness direction, the one or more layers including a layer of piezoelectric material, the layer structure having first and second opposite faces, and the one or more layers arranged between the first and second faces such that the thickness direction of each layer is perpendicular to the first and second faces;

wherein the patterned second electrode is substantially coextensive with the second face, wherein the patterned second electrode at least partially overlaps each first electrode of the plurality of first electrodes and the patterned second electrode at least partially overlaps each third electrode of the plurality of third electrodes.

2. The touch panel according to claim 1, further comprising a colour filter disposed between the pixel array and the cover lens.

3. The touch panel according to claim 2, wherein the colour filter is disposed between the plurality of first electrodes and the plurality of third electrodes.

4. The touch panel according to claim 1, wherein the plurality of first electrodes and the plurality of third electrodes are disposed on the same surface.

5. The touch panel according to claim 1, further comprising one or more dielectric layers disposed between the plurality of first electrodes and the plurality of third electrodes.

6. The touch panel according to claim 1, further comprising a polariser disposed between the pixel array and the cover lens.

7. The touch panel according to claim 6, wherein the polariser is disposed between the layer of piezoelectric material and the pixel array.

8. The touch panel according to claim 6, wherein the polariser is disposed between the layer of piezoelectric material and the cover lens.

9. A portable electronic device comprising the touch panel according to claim 1.

10. The apparatus according to claim 1, wherein the patterned second electrode is connected to a ground or a voltage bias source.

11. An apparatus comprising:
a touch panel comprising:
a pixel array of a display;
a cover lens;
a plurality of first electrodes disposed between the pixel array and the cover lens, wherein each first electrode extends in a first direction and the plurality of first electrodes are arrayed spaced apart perpendicular to the first direction;
a plurality of third electrodes disposed between the pixel array and the cover lens, wherein each third electrode extends in a second direction and the plurality of third electrodes are arrayed spaced apart perpendicular to the second direction, wherein the first and second directions are different;
a patterned second electrode disposed between the cover lens and the plurality of first electrodes and between the cover lens and the plurality of third electrodes, the patterned second electrode comprising a plurality of first struts extending in the first direction and a plurality of second struts extending in the second direction, wherein the first and second struts are joined where they intersect such that the patterned second electrode is formed of a single region of conductive material;

a layer structure disposed between the patterned second electrode and the plurality of first electrodes and between the patterned second electrode and the plurality of third electrodes, the layer structure comprising one or more layers, each layer extending perpendicularly to a thickness direction, the one or more layers including a layer of piezoelectric material, the layer structure having first and second opposite faces, and the one or more layers arranged between the first and second faces such that the thickness direction of each layer is perpendicular to the first and second faces wherein the patterned second electrode is substantially coextensive with the second face, wherein the patterned second electrode at least partially overlaps each first electrode of the plurality of first electrodes and the patterned second electrode at least partially overlaps each third electrode of the plurality of third electrodes; and a device for processing signals from the touch panel, the device configured, in response to receiving signals from a given first electrode or third electrode, to generate a pressure signal indicative of a pressure applied to the touch panel proximate to the given first or third electrode and a capacitance signal indicative of a capacitance of the given first electrode or third electrode.

12. The apparatus according to claim 11, further comprising a colour filter disposed between the pixel array and the cover lens.

13. The apparatus according to claim 11, further comprising a polariser disposed between the pixel array and the cover lens.

14. The apparatus according to claim 11, wherein the device comprises at least one signal splitter stage configured to split signals received from the touch panel into first and second signals, to pass the first signals to a first frequency dependent filter configured to reject the pressure signal and pass the capacitance signal, and to pass the second signals to a second frequency dependent filter configured to reject the capacitance signal and pass the pressure signal.

15. The apparatus according to claim 11, wherein the device is configured to receive signals from each first electrode and/or third electrode concurrently.

16. The apparatus according to claim 11, wherein the device is configured to receive signals from each first electrode and/or third electrode sequentially.

17. The apparatus according to claim 11, further comprising: a signal processor arranged to receive the pressure and capacitance signals and to calculate pressure values and capacitance values in dependence upon the pressure and capacitance signals.

18. A portable electronic device comprising the apparatus according to claim 11.

* * * * *